US012506662B2

(12) United States Patent
Yu et al.

(10) Patent No.: US 12,506,662 B2
(45) Date of Patent: Dec. 23, 2025

(54) SERVICE PROVISION METHOD, DEVICE, AND STORAGE MEDIUM

(71) Applicant: Alibaba Innovation Private Limited, Singapore (SG)

(72) Inventors: Xiaobo Yu, Hangzhou (CN); Changming Bai, Hangzhou (CN); Dapeng Liu, Hangzhou (CN)

(73) Assignee: Alibaba Innovation Private Limited, Singapore (SG)

( * ) Notice: Subject to any disclaimer, the term of this patent is extended or adjusted under 35 U.S.C. 154(b) by 270 days.

(21) Appl. No.: 17/729,851

(22) Filed: Apr. 26, 2022

(65) Prior Publication Data

US 2022/0353151 A1 Nov. 3, 2022

(30) Foreign Application Priority Data

Apr. 30, 2021 (CN) .......................... 202110484268.7

(51) Int. Cl.
*H04L 41/122* (2022.01)
*H04L 9/40* (2022.01)
(Continued)

(52) U.S. Cl.
CPC ........ *H04L 41/122* (2022.05); *H04L 41/0895* (2022.05); *H04L 63/102* (2013.01); *H04W 48/18* (2013.01)

(58) Field of Classification Search
CPC ... H04L 41/122; H04L 41/5048; H04L 41/50; H04L 41/0895; H04L 63/102;
(Continued)

(56) References Cited

U.S. PATENT DOCUMENTS 8,266,674 B2 9/2012 Huang et al.
8,275,356 B2 9/2012 Hickie
(Continued)

FOREIGN PATENT DOCUMENTS

CN 104080181 A 10/2014
CN 107872345 A 4/2018
(Continued)

OTHER PUBLICATIONS

Translated First Chinese Search Report for related Chinese Application No. 2021104842687, dated Mar. 29, 2023, 2 pages.
(Continued)

*Primary Examiner* — Alexander Lagor
*Assistant Examiner* — Taylor P Vu
(74) *Attorney, Agent, or Firm* — Lee & Hayes, P.C.

(57) ABSTRACT

Embodiments of the present disclosure provide a service provision method, a device, and a storage medium. In the embodiments of the present disclosure, a network management service user (such as a third-party server) can easily and quickly acquire a service related to a network management capability by performing capability exposure on a network management system in an operator network; further, in the process of exposing the network management capability, a permission access policy is added, so that the network management service user can only use a network management capability service with an access permission, which is favorable for reasonably exposing the network management service capability, so as to safely and efficiently provide the network management capability service, and improve the utilization efficiency of the network management capability in the operator network.

20 Claims, 26 Drawing Sheets

(51) Int. Cl.
*H04L 41/0895* (2022.01)
*H04W 48/18* (2009.01)

(58) Field of Classification Search
CPC . H04L 63/20; H04L 41/0806; H04L 41/0893; H04L 41/0894; H04W 48/18; H04W 12/08; H04W 24/02
See application file for complete search history.

(56) References Cited

U.S. PATENT DOCUMENTS

| | | | |
|---|---|---|---|
| 8,798,579 | B2 | 8/2014 | Hickie |
| 10,244,001 | B2 | 3/2019 | Smith |
| 10,411,964 | B2 * | 9/2019 | Zhang ............... H04L 41/044 |
| 10,609,042 | B2 | 3/2020 | Quinn et al. |
| 10,797,934 | B1 | 10/2020 | Akman et al. |
| 11,575,712 | B2 | 2/2023 | Kung et al. |
| 11,870,661 | B2 * | 1/2024 | Karapantelakis ....... H04L 41/40 |
| 2011/0029773 | A1 * | 2/2011 | Effenberger ....... H04Q 11/0067 713/168 |
| 2016/0366183 | A1 | 12/2016 | Smith et al. |
| 2017/0141973 | A1 * | 5/2017 | Vrzic ............... H04W 16/02 |
| 2017/0230350 | A1 | 8/2017 | Enrique Salpico |
| 2018/0220363 | A1 * | 8/2018 | Höglund ............... H04W 48/10 |
| 2019/0021010 | A1 | 1/2019 | Senarath et al. |
| 2019/0109768 | A1 * | 4/2019 | Senarath ............ H04L 41/5006 |
| 2019/0140971 | A1 * | 5/2019 | Guilbeault .......... H04L 41/0895 |
| 2019/0373443 | A1 | 12/2019 | Palaniappan et al. |
| 2020/0221369 | A1 * | 7/2020 | Adjakple ............... H04W 48/18 |
| 2021/0168053 | A1 * | 6/2021 | Xu ..................... H04L 41/5051 |
| 2021/0352534 | A1 * | 11/2021 | Tiwari ................ H04L 41/5009 |
| 2022/0217610 | A1 * | 7/2022 | Zheng ................. H04L 45/64 |

FOREIGN PATENT DOCUMENTS

| | | |
|---|---|---|
| CN | 109286602 A | 1/2019 |
| CN | 109391505 A | 2/2019 |
| CN | 109587187 A | 4/2019 |
| CN | 109600768 A | 4/2019 |
| CN | 109644143 A | 4/2019 |
| CN | 110247906 A | 9/2019 |
| CN | 110621045 A | 12/2019 |
| CN | 110679185 A | 1/2020 |
| CN | 110832827 A | 2/2020 |
| CN | 111385262 A | 7/2020 |
| CN | 112104468 A | 12/2020 |
| CN | 112152926 A | 12/2020 |
| CN | 112187545 A | 1/2021 |
| CN | 112205007 A | 1/2021 |
| CN | 112350856 A | 2/2021 |
| CN | 112449315 A | 3/2021 |
| CN | 114765787 A | 7/2022 |

OTHER PUBLICATIONS

3GPP, "3GPP TSG-SA5-212368, New SID on network slice management capability exposure," 3GPP TSG-SA5 Meeting #136e, e-meeting, Mar. 1-9, 2021, 4 pages.

Translated Chinese Office Action for related Chinese Patent Application No. 202110484268.7, dated Mar. 23, 2023, 19 pages.

Machine translation of Chinese Search Report for related Chinese Application No. 2021104842687, dated Sep. 1, 2023, 5 pages.

* cited by examiner

SERVICE PROVISION METHOD, DEVICE, AND STORAGE MEDIUM

CROSS REFERENCE TO RELATED APPLICATIONS

This application claims priority to Chinese patent application No. 202110484268.7 filed on 30 Apr. 2021 and entitled "SERVICE PROVISION METHOD, DEVICE, AND STORAGE MEDIUM," which is incorporated herein by reference in its entirety.

TECHNICAL FIELD

The present disclosure relates to the technical field of mobile communication, and, more particularly, to service provision methods, devices, and storage media.

BACKGROUND

With the development of mobile communication technology, mobile network provides more and more network capabilities, and has a key technology of network capability exposure. Network capabilities in a mobile network are used for network elements and applications within the communication network, and can also expose and provide diversified services for a third-party service provider so as to give full play to the capabilities of the mobile network.

In particular, with the advent of fifth-generation mobile communication technology (5G), a network has more and more capabilities that can be shared. Among them, network capabilities that can be shared in 5G networks comprise communication capabilities, context information, signing information, network slice capabilities, even network slice management capabilities, and the like. With the continuous exposure of network capabilities, operators need to rationalize the exposure of network capabilities so as to provide various network capability services safely and efficiently, and improve the utilization efficiency of network capability resources of an operator.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Various aspects of the present disclosure provide service provision methods, devices, and storage media, so as to rationalize the exposure of a network management capability in an operator network and improve the utilization efficiency of the network management capability in the operator network.

Embodiments of the present disclosure provide a service provision method applicable to a network management service provider in a network management system, and the method comprises: receiving a service request message sent by a network management service user, the service request message comprising a service parameter to request a target service from the network management system; determining whether a permission access policy corresponding to the network management service user has an access permission adapted to the target service; if so, providing, according to the service parameter, the target service for the network management service user, the target service comprising a network management capability service; and returning a response message to the network management service user, the response message carrying information of whether the network management system is capable to successfully provide the target service for the network management service user.

Embodiments of the present disclosure further provide a network entity that can be implemented as a network management service provider in a network management system, and the network entity comprises: a memory configured to store a computer program, and a processor coupled to the memory and configured to execute the computer program to implement the steps in the service provision method provided by the embodiments of the present disclosure.

Embodiments of the present disclosure further provide a computer-readable storage medium storing therein a computer program, wherein when the computer program is executed by a processor, the processor is enabled to implement the steps in the service provision method provided by the embodiments of the present disclosure.

Embodiments of the present disclosure further provide a computer program product comprising a computer program or instruction, wherein when the computer program or instruction is executed by a processor, the processor is enabled to implement the steps in the service provision method provided by the embodiments of the present disclosure.

In the embodiments of the present disclosure, a network management service user (such as a third-party server) easily and quickly acquires a service related to a network management capability by performing capability exposure on a network management system in an operator network; further, in the process of exposing the network management capability. A permission access policy is added, so that the network management service user only uses a network management capability service with an access permission, which is favorable for reasonably exposing the network management service capability, so as to safely and efficiently provide the network management capability service, and improve the utilization efficiency of the network management capability in the operator network.

BRIEF DESCRIPTION OF DRAWINGS

The accompanying drawings described herein are intended to provide a further understanding of the present disclosure, and constitute a part of the present disclosure. The illustrative embodiments of the present disclosure and the descriptions thereof are used to explain the present disclosure, and do not constitute an improper limitation to the present disclosure. In the drawings.

DESCRIPTION OF EMBODIMENTS

Figure 1A:
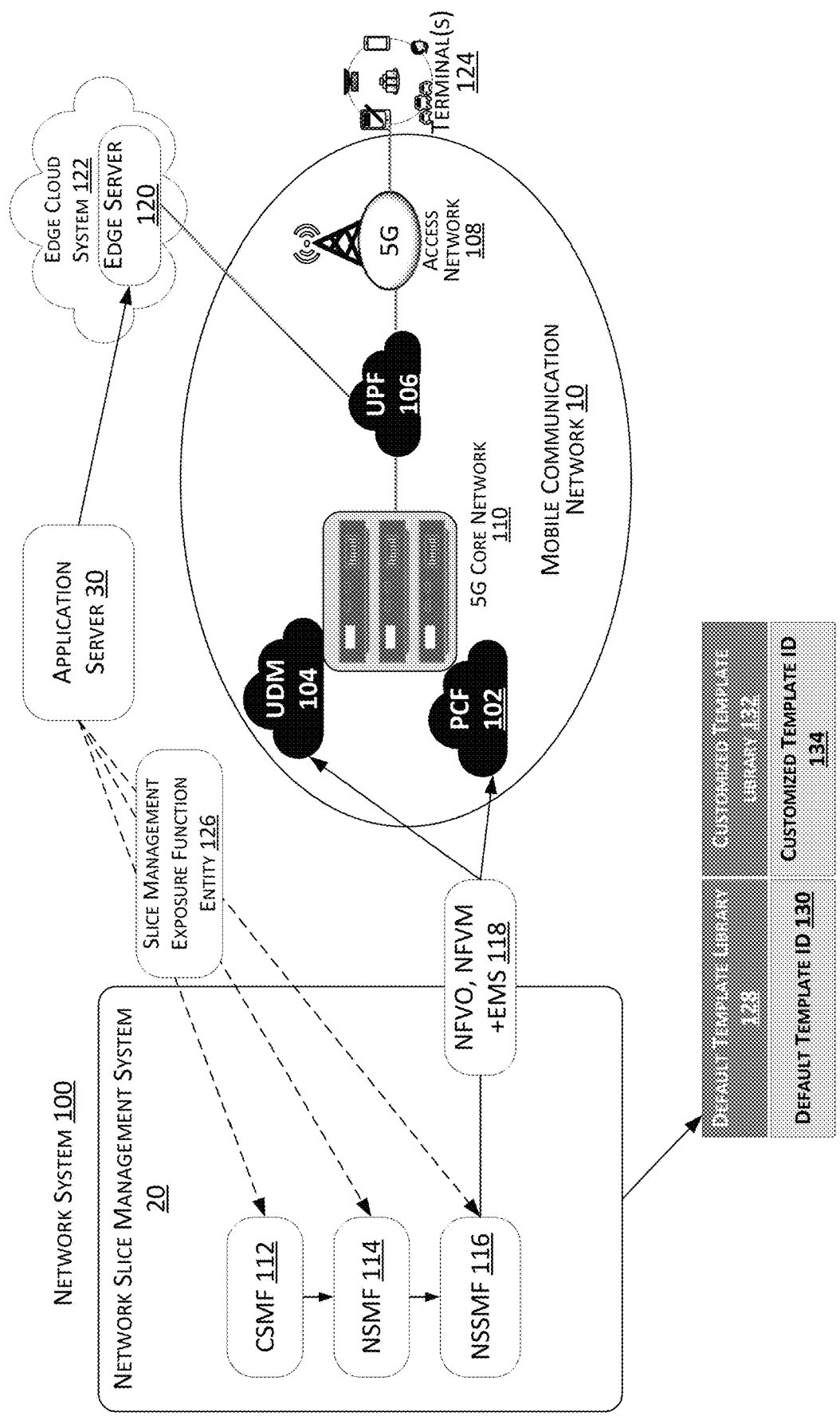
FIG. 1a shows a structural schematic diagram of a network system according to an embodiment of the present disclosure.

In order to make the objectives, technical solutions, and advantages of the present disclosure clearer, the technical solutions of the present disclosure will be clearly and completely described below in conjunction with the specific embodiments of the present disclosure and the corresponding accompanying drawings. Obviously, the described embodiments are only a part, not all, of the embodiments of the present disclosure. Based on the embodiments in the present disclosure, all other embodiments obtained by ordinary persons skilled in the art without creative efforts shall fall within the protection scope of the present disclosure.

A 5G network needs to meet different network requirements, such as large bandwidth, low latency, and multiple accesses, and the network slice technology is thus introduced. A network slice is a method of building the network based on needs. A Network Functions Virtualization (NFV) technology enables operators to separate multiple virtual end-to-end networks on a unified infrastructure, thus meeting requirements of network performance in different scenarios. In this way, a complete operator network system may be composed of a large number of network slices for serving different scenarios or meeting different network characteristics, which leads to problems of managing the network slices.

With regard to the management problems of the network slices, 3GPP SA5 defines a slice management system for network slicing for operators. The system mainly includes a communication service management function (CSMF), a network slice management function (NSMF), and a network slice subnet management function (NSSMF). The CSMF is mainly responsible for converting communication service requirements of a slice request party into network slice requirements; the NSMF is mainly responsible for management and coordination for network slice instances (NSI); and the NSSMF is mainly responsible for management and coordination for network subnet slice instances (NSSI). Subsequently, an NFV Orchestrator (NFVO) and an NFV Manager (NFVM) assist in generating slice network entities corresponding to the NSSI or the NSI.

Through the above slice management system, operators may provide network slice services for slice request parties in different application scenarios. In other words, the entire life cycle of creation, activation, updating, release, and the like of a network slice may be reasonably managed. However, at present, research and use have been focusing on capability of the slice management system in providing network slice services. As a result, slice management capabilities and resources of the slice management system are not fully used. The efficiency in using the slice management capabilities and resources of the slice management system is thus low. In view of this, the following embodiments of the present disclosure provide a network management system, so as to give full play to the slice management capabilities of the network slice management system.

FIG. 1a shows a structural schematic diagram of a network system provided by an embodiment of the present disclosure. As shown in FIG. 1a, the network system 100 includes: a network slice management system 20 and an application server 30 in a mobile communication network 10.

In the embodiment, the network architecture and the communication system adopted by the mobile communication network 10 are not limited. Any mobile communication network into which a network slice technology is introduced is applicable to the embodiment of the present disclosure. As shown in FIG. 1a, the mobile communication network 10 may be a 5G mobile communication network (referred to as 5G network for short), and additionally may also be a 4G network or a mobile communication network with a greater system that might appear in the future. Regardless of the system of the mobile communication network 10, the architecture thereof mainly includes, but is not limited to: a radio access network (RAN) and a core network (CN). A transmission network may further be included. Depending on different network systems, network elements contained in the access network and the core network of the mobile communication network 10 may also be different. Taking the 5G network as an example, the access network in the 5G network mainly includes 5G base stations. The 5G core network (5GC) includes, but is not limited to, the following network functions and entities: network elements such as an Authentication Server Function (AUSF), a User Plane Function (UPF), an Access and Mobility Management Function (AMF), a Unified Data Management (UDM), a Network Exposure Function (NEF), a Session Management Function (SMF), a Network Slice Selection Function (NSSF), an NF Repository Function (NRF), a Policy Control Function (PCF), and an Application Function (AF). Only the PCF 102, the UDM 104, and the UPF 106, the 5G access network 108, and the 5G core network 110 are illustrated in FIG. 1a.

In the embodiment, network slicing technology is introduced into the mobile communication network 10, which may architect multiple virtual end-to-end networks (i.e., network slices) on a unified infrastructure, thereby meeting different communication service requirements, such as high bandwidth requirements, low latency requirements, and multiple access requirements. The network slicing technology may be implemented in different parts of the mobile communication network 10, such as the access network, the core network, and the transmission network. For easy differentiation, network slices implemented in different parts (or different domains) of the mobile communication network 10 are considered as subnet slices. The subnet slices of one or more of the parts may be connected together to form a network slice capable of providing complete services to users. Each network slice is logically isolated from the access network to the transmission network, then to the core network.

The mobile communication network 10 supports the network slicing technology, allowing multiple network slices to be formed on the infrastructure thereof according to different communication servers. How to specifically form network slices on the infrastructure of the mobile communication network 10, however, depends on the network slice management system 20. As shown in FIG. 1a, the network slice management system 20 includes: network entities such as a CSMF 112, an NSMF 114, an NSSMF 116, etc. The CSMF 112 provides an interface for communicating with the NSMF 114; and the NSMF 114 provides an interface for communicating with the NSSMF 116. The CSMF 112 is responsible for receiving a communication service requirement sent by a scenario user, completing translating the communication service requirement of the user to a network slice requirement, and distributing the network slice requirement to the NSMF 114. The network slice requirement may be implemented as a Service Level Agreement (SLA) requirement. The NSMF 114 is mainly responsible for creating an NSI according to the network slice requirement, decomposing a network sub-slice requirement to each sub-slice, and distributing the network sub-slice requirement to the NSSMF 116 of each subnet. The NSSMF 116 is responsible for completing mapping from the NSI to an NSSI according to the received network sub-slice requirement, and calling the NFVO, the NFVM, an Element Management System (EMS) 118, and the like to assist in generating a slice network entity corresponding to the NSSI or the NSI, which means that the deployment of each subnet slice, computing, network, storage resources on which the subnet slices depend, and the like, is done on a Network Functions Virtualization Infrastructure (NFVI) of the mobile communication network 10.

Figure 1B:
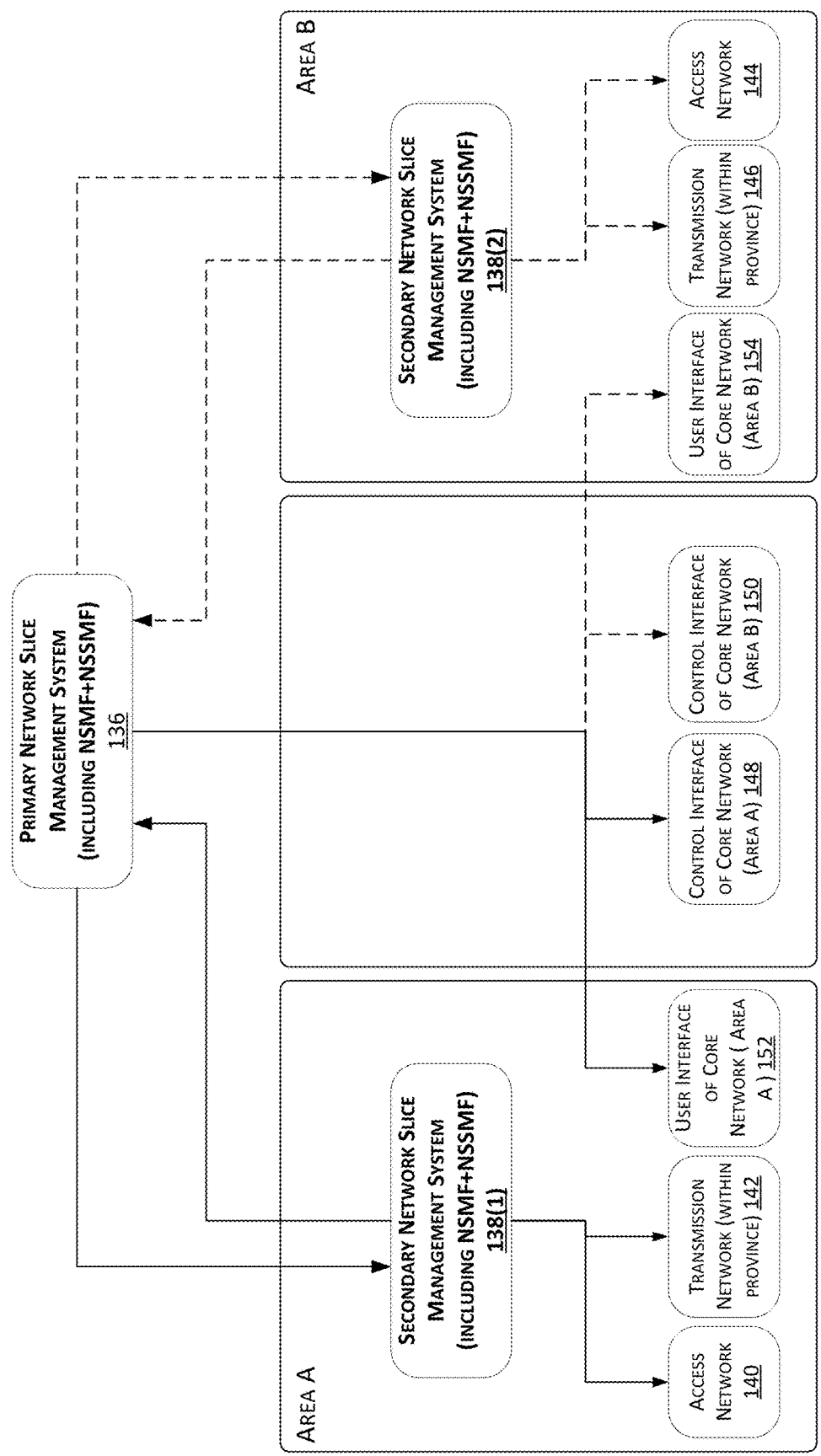
FIG. 1B shows an architecture schematic diagram of a network slice management system using two-level deployment according to an embodiment of the present disclosure.

In the embodiment, the deployment implementation of the network slice management system 20 is not limited. For example, the network slice management system 20 may be deployed at one level or multiple levels. In the case of deploying at multiple levels, the NSMF 114 is deployed at each level of the management system; one or more NSSMFs 23 are deployed below the NSMF 114. The NSMF 114 is responsible for managing and scheduling the NSI at the level. The NSSMF 116 is responsible for managing and scheduling the NSSI at the level. For example, an NSMF 114 at an upper level may interface with an NSMF 114 at a lower level to implement the interconnection between upper and lower management systems, which is not limited thereby. For example, NSSMFs 116 at two adjacent levels may be interfaced to implement the interconnection between the upper and lower management systems; or the NSMF 114 at the upper level and the NSSMF 116 at the lower level are interfaced to implement the interconnection between the upper and lower management systems. FIG. 1B shows an architecture schematic diagram of a network slice management system 20 using two-level deployment. The network slice management system 20 includes a primary network slice management system (including NSMF+NSSMF) 136 and secondary network slice management system (including NSMF+NSSMF) 138(1) and 138(2). The secondary network slice management system 138(1) communicates with the access network 140 and the transmission network within a certain area (such as within a province) 142. The secondary network slice management system 138(2) communicates with the access network 144 and the transmission network within a certain area (such as within a province) 146. The primary network slice management system 136 communicates with the control interface of network (area A) 148, the control interface of network (area A) 150, the user interface of core network (area A) 152, the user interface of core network (area B) 154.

In the network slice management architecture shown in FIG. 1B, the secondary management system 138(1) deployed in area A is responsible for the access network of area A and a sub-slice (such as NSI and/or NSSI) in the transmission network. For example, an NSMF 114 deployed in area A is responsible for the NSI; an NSSMF 116 deployed in area A is responsible for the NSSI. The secondary management system 138(2) deployed in area B is responsible for sub-slices in the access network and the transmission network of area B. For example, an NSMF 114 deployed in area B is responsible for the NSI; an NSSMF 116 deployed in area B is responsible for the NSSI. The primary management system 136 is responsible for sub-slices in the core network (including a user interface and a control interface) of areas A and B. For example, the network slice management system 20 may be deployed hierarchically by using regions as granularities. For example, the primary network slice management system 136 may be deployed in each province where one NSMF and multiple NSSMFs are correspondingly deployed in a province. Alternatively, the primary network slice management system 136 may be deployed across multiple provinces where one NSMF may be deployed across the provinces. The NSMF is responsible for scheduling and managing NSIs in these provinces. Multiple NSSMFs are deployed in each province and are responsible for scheduling and managing the NSSIs in each province.

In the embodiment, a scenario user refers to the application server 30. In other words, the mobile communication network 10 and the network slice management system 20 cooperate with each other to provide the application server 30 with services related to network slicing, thereby meeting the network performance requirements of the application server 30 in different scenarios. The application server 30 may be a third-party server, for example, an edge server 120 in an edge cloud system 122, but is not limited thereto. As shown in FIG. 1a, the application server 30 is illustrated as an edge server in an edge cloud system. One or multiple application servers 30 may be provided. In the case of multiple application servers 30, these multiple application servers 30 may be from the same third party or different third parties. Certainly, the application servers 30 may also be from an operator. An application server 30 from a third party and an application server 30 from an operator may have different permissions when using the services related to network slicing provided by the network slice management system 20. Each embodiment of the present disclosure focuses on the case that the application server 30 is from a third-party server, and the case that the application server 30 is from an operator will be described concisely. Multiple terminals 124 communicate with the mobile communication network 10.

In the embodiment, the network slice management system 20 may provide a management capability related to network slicing, referred to as the network slice management capability. In addition to the capability of providing a network slice service for the application server 30 according to a communication service requirement thereof, such management capability may also include managing templates related to network slicing and managing the network slice capability of the mobile communication network 10. The managing the network slice capability of the mobile communication network 10 refers to identifying whether the mobile communication network 10 has the network slice capability as well as managing information such as coverage and topology of the network slice capability when the communication network 10 has the network slice capability. In order to make full use of the network slice management capability of the network slice management system 20, the embodiment can fully expose the network slice management capability of the network slice management system 20 to the application server 30 by virtue of the capability exposure function of the mobile communication network 10. That is, the capabilities of the network slice management system 20 in providing the network slice service to the application server 30, managing the templates related to network slicing, and managing the network slice capability of the mobile communication network 10 are all exposed to the application server 30, thereby fully calling network slice management resources of the network slice management system 20, which in turn enhances the use efficiency of the network slice management resources.

The embodiment of the present disclosure focuses on the process of exposing the "capability of managing the template related to network slicing" and the "capability of managing the network slice capability of the mobile communication network 10" of the network slice management system 20. Based on the exposure of the two capabilities, the application server 30 may interact with the network entities in the network slice management system 20, requesting the network slice management system 20 to provide, in addition to the "network slice service," other services related to network slicing therefor, which are labeled as target services. In the embodiment of the application, the target services mainly refer to a network slice template service and a network slice capability service. Based on the exposure of the "capability in managing the templates related to network slicing" of the network slice management system 20, the application server 30 may request the network slice management system 20 to provide the network slice template service therefor. Based on the exposure of the "capability in managing the network slice capability of the mobile communication network 10" of the network slice management system 20, the application server 30 may request the network slice management system 20 to provide the network slice capability service therefor.

For example, the application server 30 sends a service request message to the network entity in the network slice management system 20. The service request message includes a service parameter, which is configured to request the network slice management system 20 to provide a target service therefor. The target service includes a network slice template service or a network slice capability service, which are different from the network slice service. The network entity in the network slice management system 20 receives the service request message sent by the application server 30, provides the target service for the application server 30 according to the service parameter in the service request message, and returns a response message regarding the service request message to the application server 30. The application server 30 receives the response message returned by the network entity in the network slice management system 20, and the response message carries information of whether the network slice management system 20 is capable of successfully providing the target service for the application server 30.

Figure 2:
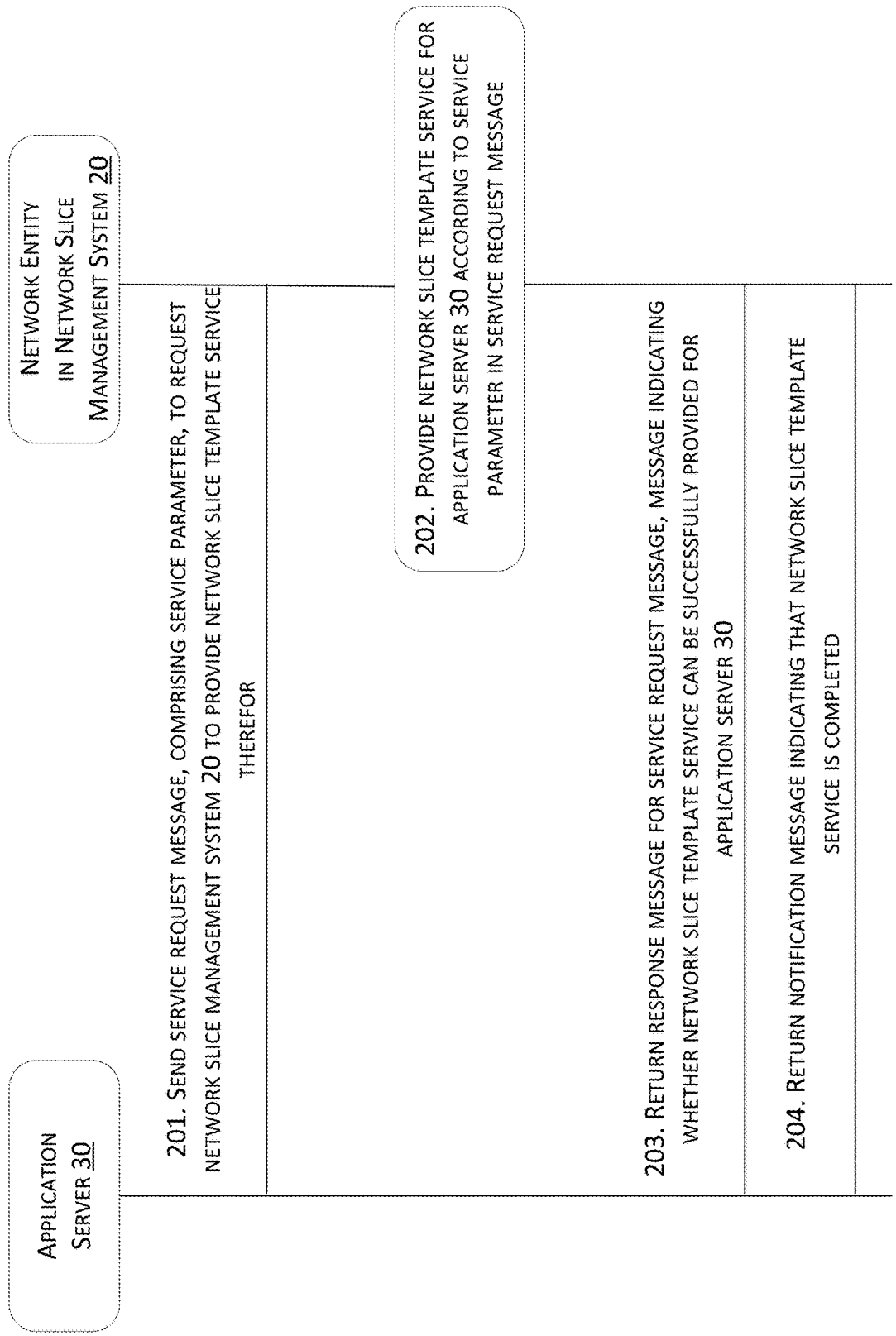
FIG. 2 shows a schematic flow diagram of an application server requesting a network slice template service from a network slice management system according to an embodiment of the present disclosure.

One scenario: the application server 30 may interact with the network entity in the network slice management system 20 and request the network slice management system 20 to provide a service related to the template of network slicing, referred to as the network slice template service. In other words, the target service may be implemented as the network slice template service. For easy differentiation and description, the template related to network slicing is referred to as a slice template for short. The slice template includes a Network Slice Template (NST) and/or a Network Slice Subnet Template (NSST). As shown in FIG. 2, the interaction process of the application server 30 requesting, from the network slice management system 20, the network slice template service includes the following steps:

201. The application server 30 sends a service request message to the network entity in the network slice management system 20, wherein the service request message comprises a service parameter, which is configured to request the network slice management system 20 to provide the network slice template service therefor.

202. After receiving the service request message, the network entity in the network slice management system 20 provides the network slice template service for the application server 30 according to the service parameter in the service request message.

203. The network entity in the network slice management system 20 returns to the application server 30 a response message for the service request message, wherein the response message carries information of whether the network slice management system 20 can successfully provide the network slice template service for the application server 30.

For example, after receiving the service request message, the network slice management system 20 may judge whether the network slice template service can be successfully provided for the application server 30 according to the service parameter. If the network slice template service can be successfully provided for the application server 30, a confirmation message is returned to the application server 30 as the response message for the service request, indicating that the network slice management system 20 is capable of successfully providing the network slice template service for the application server 30. If the network slice template service cannot be successfully provided for the application server 30, a service request error message is returned to the application server 30 as the response message, indicating that the network slice management system 20 is not able to successfully provide the network slice template service for the application server 30. Furthermore, in the case that the service request error message is returned to the application server 30 as the response message, the response message may also carry an error cause or cause code for unavailability of the network slice template service. The error cause may be any one of the following: 1. the application server 30 does not have the permission to customize the slice template; and the permission here may mean that an operator and a manufacturer to which the application server belongs have not signed an SLA about slice template management, etc.; and 2. the core network resources of the operator fail to support the generation of a customized slice template meeting requirements of the application server 30.

Further for example, in the case that the network slice management system 20 is capable of successfully providing the network slice template service for the application server 30, considering that the network slice management system 20 provides the network slice template service for the application server 30 asynchronously, which means that after the application server requests the network slice management system 20 to provide the slice template, it might take some time to receive a notification message that the network slice management system 20 confirms completing the generation of the slice template, then, as shown in FIG. 2, the method further includes the following after step 203.

204. The network entity in the network slice management system 20 returns to the application server 30 a notification message indicating that the network slice template service is completed.

In the embodiment, the network slice management system 20 may provide a default slice template for the application server 30. Regardless of whether the application server 30 comes from a third party or an operator, the application server 30 may request to use a default slice template provided by the network slice management system 20. The default slice template includes a default NST and/or a default NSST. That is, the network slice template service may include a service in which the application server 30 requests to use the default NST and/or default NSST provided by the operator. However, a default slice template provided by the network slice management system 20 is fixed, and resources instantiated according to the default slice template are thus fixed. As such, the requirements of the application server 30 may not be met, especially in the case that the application server 30 is from a third party. For example, the application server 30 requires the deployment of the UPF to sink into a DN domain, and requires the UPF to have a Deep Packet Inspection (DPI) function and the like. A default slice template, however, cannot meet the requirement. In view of this, the network slice management system 20, in addition to providing a default slice template for the application server 30, further allows the application server 30 from a third party to customize the slice template according to the application requirements thereof. Customized slice templates include a customized NST and/or a customized NSST. For example, an operator may maintain two template libraries, namely a default template library 128 with a default template ID 130 and a customized template library 132 with a customized template ID 134 in that the default template library is configured to store the default slice template provided by the operator and the customized template library is configured to store a customized slice template triggered and generated by a third-party server (e.g. the application server 30 from a third party). Customized slice templates may be used alone by any service manufacturer S. For example, some dedicated slice templates are mainly used by the service manufacturer S. However, the service manufacturer S may also share some general slice templates with or authorize their use to other service manufacturers. In addition to a template identifier (ID) for identifying a customized slice template, for example, a third-party server identifier or an identifier that can represent the third party may also be managed, which is not limited thereby. For example, an identification field of a customization manufacturer may be added to the ID of a customized slice template to carry the identifier of the customization manufacturer. If the application server 30 is from a service manufacturer requesting to customize a slice template, after the network slice management system 20 generates the customized slice template for the application server 30, an identifier of the application server 30 may further be stored in the identification field of the customization manufacturer in the ID of the customized slice template, thereby establishing an association relationship among the ID of the customized slice template, the identifier of the customization manufacturer, and the identifier of the application server 30. Of course, the ID of the customized slice template may not carry the identifier of the customization manufacturer. Instead, the network slice management system 20 is responsible for associating the ID of the customized slice template with the identifier of the customization manufacturer and the identifier of the application server 30, and maintaining the association relationship among the three.

Furthermore, the network slice management system 20 also allows the application server 30 to modify a slice template customized by itself at any time according to application requirements, and allows the application server 30 to delete a slice template customized by itself according to application requirements. The application server 30 from a third party has the permission to modify or delete a slice template customized by itself. The application server deployed by an operator can modify or delete a system defaulted slice template. In view of this, when receiving a request to delete a slice template from the application server 30 from a third party, the network slice management system 20 may determine whether the slice template to be deleted is a system defaulted slice template or a customized slice template. If the slice template to be deleted is a customized slice template, the ID of the customization manufacturer may be acquired from the ID of the customized slice template to be deleted, or the ID of the customization manufacturer corresponding to the customized slice template to be deleted is acquired from the maintained association relationship between the ID of the customized slice template and the ID of the customization manufacturer. Then, whether the ID of the customization manufacturer matches with the ID of the application server 30 initiating the deletion request is determined, which means that whether the application server 30 has a permission to delete the customized slice template is determined. If the two match, it indicates that the application server 30 has the permission to delete the customized slice template, then the operation of deleting the customized slice template is performed. If the two do not match, an error is reported, for example, by outputting deletion error information to notify that the application server does not have the permission to delete the customized slice template. In addition, if the slice template to be deleted is a system defaulted slice template, an error may also be reported to notify that the application server 30 acting as a third-party server does not have the permission to delete the system defaulted slice template. For example, a customized template and a default template may also be placed under the same template library.

That is, the requested network slice template service made by the application server 30 from a third party to the network slice management system 20 includes, but is not limited to: requesting the network slice management system 20 to customize and create a slice template therefor, requesting the network slice management system 20 to modify the slice template therefor, and requesting the network slice management system 20 to delete the slice template therefor. It should be noted that for different network slice template services, the service parameters contained in the service requests may be different accordingly. In the case of requesting the network slice management system 20 to generate a customized slice template, the service parameter contained in the service request message may include a first parameter set required for creating the customized slice template. The first parameter set includes at least one of a quality of service (QoS) parameter, a network capacity parameter, a network element configuration parameter, an application-related parameter, a geographic location of a DN, and a deployment mode of a UPF. Further, the QoS parameter may also be referred to as a network KPI parameter, examples of this include, but are not limited to end-to-end delay, rate, bandwidth, uplink and downlink throughput, network jitter, packet loss rate, etc. Of such, the rate includes an uplink Guaranteed Bit Rate (GBR), a downlink GBR, an uplink Aggregate Maximum Bit Rate (AMBR) and a downlink AMBR, and may additionally include parameters or description information related to application types; the network capacity parameter includes, but is not limited to: the maximum number of users or the maximum number of terminal accesses, the number of activated users, the established number of the maximum Protocol Data Unit (PDU) session, area capacity, user density, etc.; and the application-related parameter includes, but is not limited to: access types, billing requirements, coverage areas, isolation, mobility support, reliability indicators, security, etc. In the case of requesting the network slice management system 20 to modify the slice template, the service parameter contained in the service request message may include: a template identifier (ID) for identifying a slice template to be modified, and a first parameter set required for modifying a template. The first parameter set required for modifying the template is identical as or similar to the first parameter set required for creating the template. Reference may be made to the previous description, and details will not be elaborated herein again. In the case of requesting the network slice management system 20 to delete a customized slice template, the service parameter contained in the service request message may include: a template identifier (ID) for identifying a slice template to be deleted.

In the process of generating a customized slice template for the application server, a customized NST may be generated for the application server and the customized NST may be associated with the NSST. The NSST associated with the customized NST may include at least one NSST customized by a service manufacturer corresponding to the application server, or may include at least one NSST customized by the service manufacturer corresponding to the application server and at least one system defaulted NSST. Additionally, the NSST may all be system defaulted NSSTs.

In the process of modifying a customized slice template for the application server, the modifying may only apply to a customized NST. For example, NST A customized by a service manufacturer P1 corresponding to the application server may be modified to NST B customized by the service manufacturer P1; and the NSST associated with the customized NST A is directly associated with the customized NST B. Alternatively, the modifying may only apply to an NSST customized by the service manufacturer P1. For example, NSST A_1 customized by the service manufacturer P1 and associated with NST A customized by the service manufacturer P1 may be modified to NSST C_1 customized by another service manufacturer P2 and authorized to the service manufacturer P1. In this case, NSST A_1 associated with NST A may be modified to NSST C_1, and the mapping relationship between NST A and NSST A_1 is modified to the mapping relationship between NST A and NSST C_1. Of course, the NST and the NSST customized by the service manufacturer P1 may also be modified at the same time. The application server may indicate whether it is the NST or the NSST or both the NST and the NSST that need to be modified through the template identifier contained in the service parameter. That is, a slice template to be modified may be the NST and/or the NSST. Accordingly, the template identifier contained in the service parameter may be an NST identifier and/or an NSST identifier.

In the process of deleting a customized slice template for the application server, the NST customized by the service manufacturer P1 corresponding to the application server and the NSST associated therewith and customized by the service manufacturer P1 may be deleted. For example, the NST A customized by the service manufacturer P1 may be deleted; and at this time point, the NSST customized by the service manufacturer P1 and associated with the customized NST A needs to be deleted. The customized NST A and the mapping relationship between the NST A and all NSSTs would also need to be deleted. It should be noted that if the customized NST A is also associated with a system defaulted NSST or NSSTs authorized by other service manufacturers, only the mapping relationships between the customized NST A and the NSSTs need to be deleted, but not the NSSTs. Alternatively, the deleting may only apply to the NSST customized by the service manufacturer P1. For example, NSST A_1 customized by the service manufacturer P1 and associated with the NST A customized by the service manufacturer P1 may be deleted. Accordingly, NSST A_1 associated with the NST A may be deleted; and the mapping relationship between the NST A and NSST A_1 may be deleted. The application server may indicate whether it is the NST or the NSST or both the NST and the NSST that need to be deleted through the template identifier contained in the service parameter. That is, a slice template to be deleted may be the NST and/or the NSST. Accordingly, the template identifier contained in the service parameter may be an NST identifier and/or an NSST identifier.

As explained herein, in the case of only modifying or deleting the NSST, the network slice management system 20 can send a query message to the application server to query whether the application server needs to modify or delete a corresponding NST. A further processing is implemented according to the response message returned by the application server regarding the query message. If the response message returned by the application server indicates that a corresponding NST does not need to be modified or deleted, then only the NSST is modified or deleted. If the response message returned by the application server indicates that a corresponding NST needs to be modified or deleted, the NST and NSST are modified or deleted at the same time.

Further for example, when the application server requests to specifically use a customized template that does not belong to a corresponding service manufacturer of the application server, or relevant parameters in a parameter set sent by the application server have been mentioned by other third-party manufacturers and a customized template ID has been successfully generated, then the network slice management system 20 may request authorization from the manufacturer of the customized slice template. After the manufacturer of the customized slice template confirms the authorization, the ID of the customized slice template is sent to the application server; and the permission is exposed to the application server to enable the application server to specifically use a customized slice template. The ID of a customized slice template may be associated with multiple application service manufacturers to provide slice template services therefor.

Figure 3:
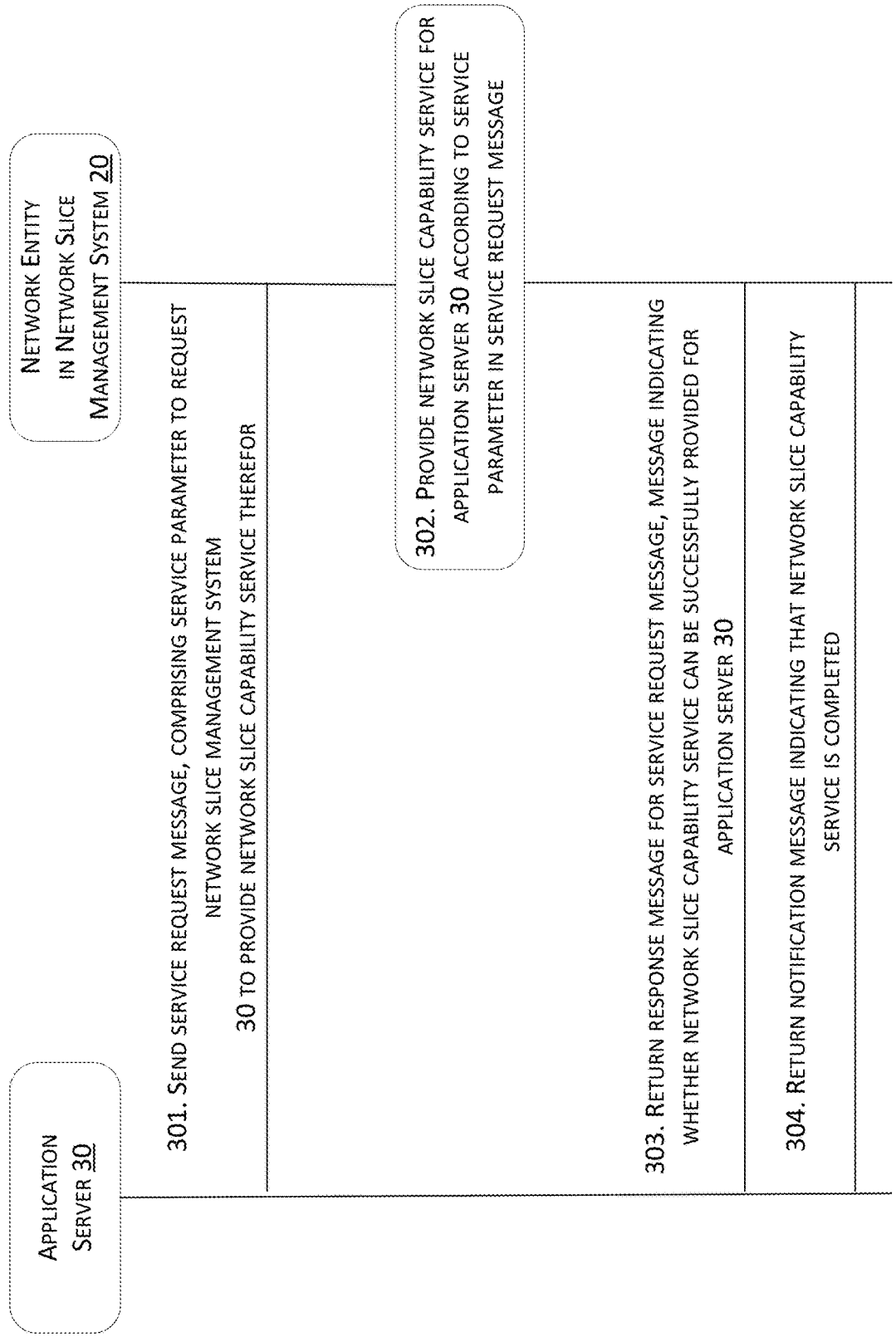
FIG. 3 shows a schematic flow diagram of an application server requesting a network slice capability service from a network slice management system according to an exemplary embodiment of the present disclosure.

Another scenario: the application server 30 may interact with the network entity in the network slice management system 20 and request the network slice management system 20 to provide a service related to the network slice capability of the mobile communication network 10 therefor. Such a service is referred to as the network slice capability service for short, i.e., a target server may be implemented as the network slice capability service. As shown in FIG. 3, the interaction process of the application server 30 requesting the network slice capability service from the network slice management system 20 includes the following steps.

301. The application server 30 sends a service request message to the network entity in the network slice management system 20, wherein the service request message comprises a service parameter, which is configured to request the network slice management system 20 to provide the network slice capability service therefor.

302. After receiving the service request message, the network entity in the network slice management system 20 provides the network slice capability service for the application server 30 according to the service parameter in the service request message.

303. The network entity in the network slice management system 20 returns to the application server 30 a response message for the service request message, wherein the response message carries information of whether the network slice management system 20 can successfully provide the network slice capability service for the application server 30.

For example, after receiving the service request message, the network slice management system 20 may judge whether the network slice capability service can be successfully provided for the application server 30 according to the service parameter. If the network slice capability service can be successfully provided for the application server 30, a confirmation message is returned to the application server 30 as the response message for the service request, indicating that the network slice management system 20 is capable of successfully providing the network slice capability service for the application server 30. If the network slice capability service cannot be successfully provided for the application server 30, a service request error message is returned to the application server 30 as the response message, indicating that the network slice management system 20 is not able to successfully provide the network slice capability service for the application server 30. Furthermore, in the case that the service request error message is returned to the application server 30 as the response message, the response message may also carry an error cause or cause code for unavailability of the network slice capability service. The error cause may be any one of the following: 1. the application server 30 does not have the permission to perform operations related to the slice capability; and 2. the network resources of an operator in a relevant area cannot fulfill the network slice function (except for a branch requesting to deploy the network slice capability).

Further for example, in the case that the network slice management system 20 is capable of successfully providing the network slice capability service for the application server 30, considering that the network slice management system 20 provides the network slice capability service for the application server 30 asynchronously, which means that after the application server requests the network slice management system 20 to provide the slice capability service request, it might take some time to receive a notification message that the network slice management system 20 confirms the network slice capability service, then, as shown in FIG. 3, the method further includes the following after step 303.

304. The network entity in the network slice management system 20 returns to the application server 30 a notification message indicating that the network slice capability service is completed.

In the embodiment, the network slice management system 20 may manage the network slice capability of the mobile communication network 10. For example, whether the mobile communication network 10 has the network slice capability may be identified. In the case that the mobile communication network 10 has the network slice capability, information such as coverage, deployment, and topology structures of the network slice capability of the mobile communication network 10 may further be managed. The mobile communication network 10 may not be equipped with the network slice capability, may only be equipped with a static network slice capability, may only be equipped with a dynamic network slice capability, or may be equipped with both the static network slice capability and the dynamic network slice capability. The static network slice capability refers to the network slices that are present and deployed in advance in the mobile communication network 10. The number of these network slices and the corresponding resources and the like are fixed. A terminal may select a corresponding static slice through a preset slice identifier (Single-Network Slice Selection Assistance Information, S-NSSAI). Or a corresponding static slice identifier may be acquired through the NSSF. The dynamic network slice capability refers to the capability of dynamically deploying the network slices in the mobile communication network 10 according to the application requirements. For example, an operator may perform slice management according to relevant management function network elements (such as a CSMF, an NSMF, and an NSSMF) of the slice management system, which may comprise slice generation, slice modification, slice resource release, etc.

Whether the mobile communication network 10 is equipped with the dynamic network slice capability can be determined by judging whether the network slice management system 20 is deployed in the mobile communication network 10. If the network slice management system 20 is deployed therein, it is considered that the mobile communication network 10 is equipped with the dynamic network slice capability or is to have the dynamic network slice capability. For example, whether the mobile communication network 10 is equipped with the dynamic network slice capability may further be determined by taking into account of whether core network resources of an operator support the generation of new slices. Furthermore, information such as the coverage, deployment, and topology structures of the network slice capability of the mobile communication network 10 are mainly affected by the deployment architecture of the network slice management system 20. Thus, deployment architecture information of the network slice management system may be acquired. For example, information such as how many levels of management systems are deployed, how many NSMF and NSSMF are deployed in each level of the management system, and where these NSMF and NSSMF are deployed may be acquired. These pieces of information are then used to identify information such as the coverage, deployment, and topology structures of the network slice capability of the communication network 10. In the embodiment, the mobile communication network 10 equipped with the dynamic network slice capability is used as an example for description.

In addition to the above determination method, whether a network entity of the Network Slice Selection Function (NSSF) is deployed in the mobile communication network 10 may further be determined. The NSSF is mainly responsible for selecting network slices for terminals accessing the mobile communication network. If the NSSF is deployed, it indicates that the mobile communication network 10 is equipped with the network slice capability. If the NSSF is not deployed, it indicates that the mobile communication network 10 is not equipped with the network slice capability. Whether the mobile communication network 10 is equipped with the dynamic network slice capability or the static network slice capability may be identified by determining whether the NSSF is deployed in the mobile communication network 10.

By exposing the network slice capability of the mobile communication network 10, the application server 30 may query whether the mobile communication network 10 is equipped with the network slice capability through the network slice management system 20 before deploying the network slice, and may also query information such as the coverage, deployment, and topology structures of the network slice capability of the mobile communication network 10, so as to determine whether the network slice is deployed in the mobile communication network, thereby providing a good preparation for successfully deploying the network slice. In addition, with the passage of time and the development of technologies, the network slice capability of the mobile communication network 10 may change, which should also be taken into account. For example, an operator may deploy the network slice capability in some areas where no network slice capability is available previously. Another example is that an operator may integrate the network slice capabilities in some areas or even stop the network slice capabilities in some areas, etc. Thus, in order to timely understand the changes of the network slice capability of the mobile communication network 10, the application server 30 may also subscribe, from the network slice management system 20, an updating notification service for network slice capability information, which means that when a change occurs in the network slice capability of the mobile communication network 10, the network slice management system 20 provides information for the network slice capability change to the application server 30. The information may be, for example, the network slice capability information after the change or an amount of change of the network slice capability information. For example, it may be at least one of the two cases: a slice management system is added or an NSSF is added to the core network element. In addition, the network slice capability deployed by an operator in the mobile communication network 10 may not meet the network slice requirement of the application server 30. For example, the application server 30 might need to deploy the network slice in area D; the current network slice capability of the mobile communication network 10, however, does not cover area D. In this case, the application server 30 may also request the network slice management system 20 to deploy therefor the network slice capability in area D.

That is, the network slice capability service that the application server 30 may request from the network slice management system 20 includes, but is not limited to: requesting the network slice management system 20 to query the network slice capability information of the mobile communication network 10 therefor, requesting the network slice management system 20 to deploy the network slice capability in the mobile communication network 10 therefor, and subscribing, from the network slice management system 20, the updating notification service for the network slice capability information. In the case that the network slice capability service is requested, the service parameter in the service request message includes a second parameter set, which is used for the network slice management system 20 in providing the network slice capability service. It should be noted that for different network slice capability services, second parameter sets contained in the service request messages are different. In the case that the network slice management system 20 is requested to query the network slice capability information of the mobile communication network 10, the second parameter set contained in the service request message may include designated area information, indicating that the network slice capability information of the mobile communication network 10 in the designated area needs to be queried. For example, the second parameter set may also be null, indicating that by default global network slice capability information of the mobile communication network 10 is queried. For example, the global network slice capability information may be network slice capability information of 5G networks deployed by an operator in various provinces and cities across the country. In the case that the network slice management system 20 is requested to deploy the network slice capability in the mobile communication network 10, the second parameter set contained in the service request message may include the designated area information, indicating that the network slice management system 20 is required to deploy the network slice capability in the designated area. In the case that the updating notification service for the network slice capability information is subscribed from the network slice management system 20, the second parameter set contained in the service request message may include the designated area information, indicating that the information about the change in the network slice capability of the mobile communication network 10 (such as the 5G network) in the designated area needs to be learned. For example, the second parameter set may also be null, indicating that by default the information about the change in the global network slice capability of the mobile communication network 10 needs to be learned. For example, the global network slice capability may refer to the comprehensive information about network slice capabilities of operators in various provinces and cities across the country.

In some embodiments of the present disclosure, regardless of the scenarios, the network entity in the network slice management system 20 may directly expose the capabilities thereof, then the network entity in the network slice management system 20, which interfaces with the application server 30, may be CSMF 112, NSMF 114, or NSSMF 116. That is, the application server 30 may request the network slice template service or the network slice capability service from the network slice management system 20 through CSMF 112, NSMF 114, or NSSMF 116.

In addition to the above, in other embodiments of the present disclosure, as shown in FIG. 1*a*, the network system 100 may further include: a function entity responsible for exposing the slice management capability of the network slice management system 20, which is referred to as a slice management exposure function entity 126 for short, and the name of the function entity is not limited by the embodiment. In an example embodiment, each network entity in the network slice management system 20 exposes the capabilities thereof to other objects, such as the application server 30, through the slice management exposure function entity. On such basis, the application server 30 may communicate with CSMF 112, NSMF 114, or NSSMF 116 in the network slice management system 20 through the slice management exposure function entity, so as to request the network slice template service or the network slice capability service from the network slice management system 20. For example, when requesting the network slice template service or the network slice capability service from the network slice management system 20, the application server 30 may send the service request message to the slice management exposure function entity, and the slice management exposure function entity sends the service request message to the network entity in the network slice management system 20, such as CSMF 112, NSMF 114, or NSSMF 116. Furthermore, in the embodiment shown in FIG. 2 or FIG. 3, details of step 201 or 301 are: the application server 30 sends a service request message to the network entity in the network slice management system 20 through the slice management exposure function entity; details of step 203 or 303 are: the network entity in the network slice management system 20 returns the response message to the application server 30 through the slice management exposure function entity; and details of step 204 or 304 are: the network entity in the network slice management system 20 sends the notification message to the application server 30 through the slice management exposure function entity. It should be noted that the application server 30 may directly send the service request message to the slice management exposure function entity, and the slice management exposure function entity forwards the service request message to the network entity in the network slice management system 20. Or, the application server 30 and the slice management exposure function entity may also agree upon which message transmission format to use; and the service request message or the response message between the application server 30 and the network entity in the network slice management system 20 is encapsulated and transmitted per the message transmission format.

Depending on network entities in the network slice management system 20 that interface with the application server 30, processes in which the application server 30 requests various network slice template services from the network slice management system 20 and requests various network slice capability services from the network slice management system 20 are also different. In some embodiments below, lthe application server 30 directly interfacing with CSMF 112, NSMF 114, or NSSMF 116 is used as an example, or the application server 30 interfacing with CSMF 112, NSMF 114, or NSSMF 116 through the slice management exposure function entity is used as an example. The processes of the application server 30 requesting the network slice template service or the network slice capability service from the network slice management system 20 are respectively described using detailed interactive flow charts.

Figure 4A:
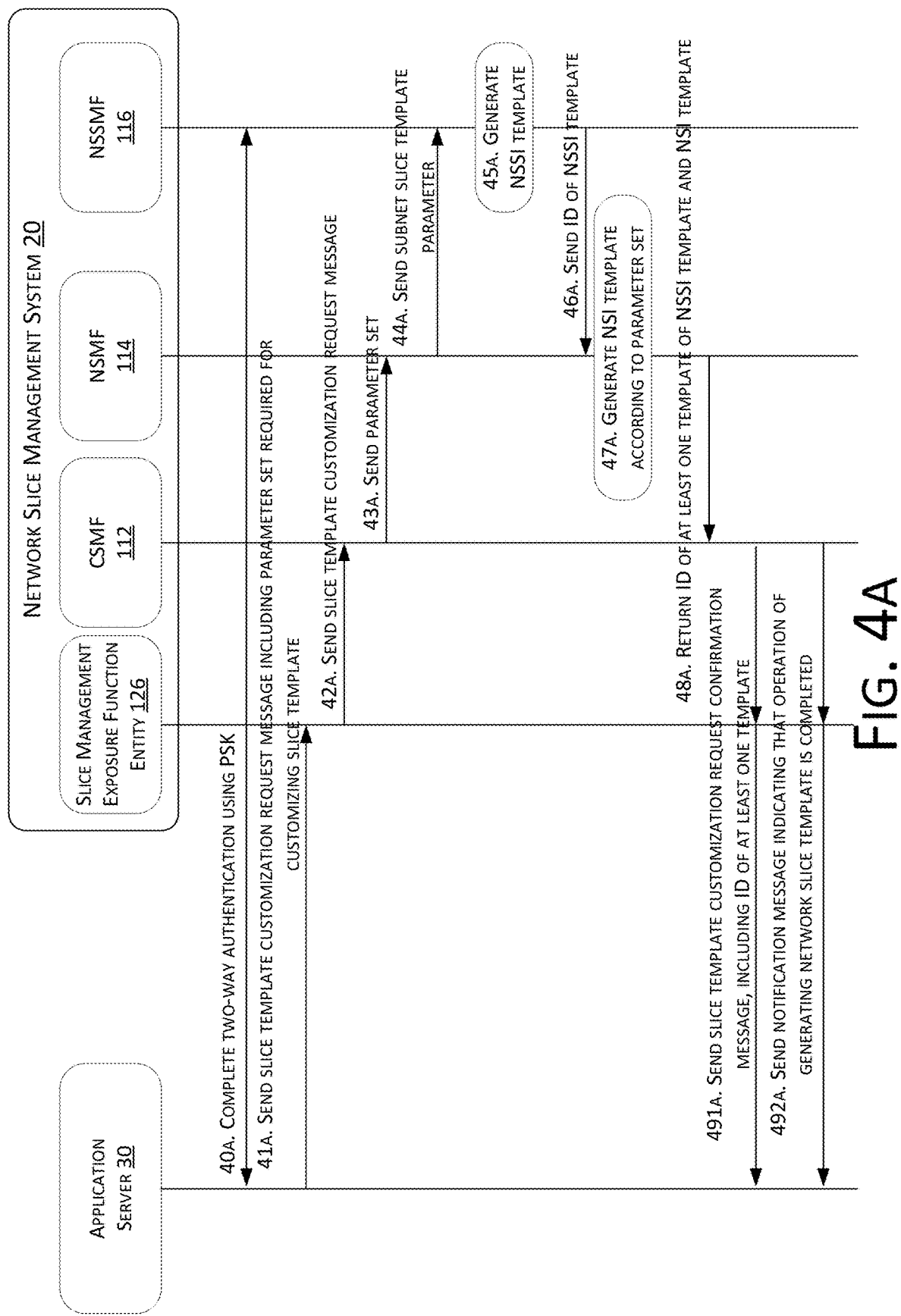
FIGS. 4a-4c show schematic flow diagrams of requesting a service of customizing a slice template respectively through CSMF, NSMF, and NSSMF according to an embodiment of the present disclosure.
Figure 4B:
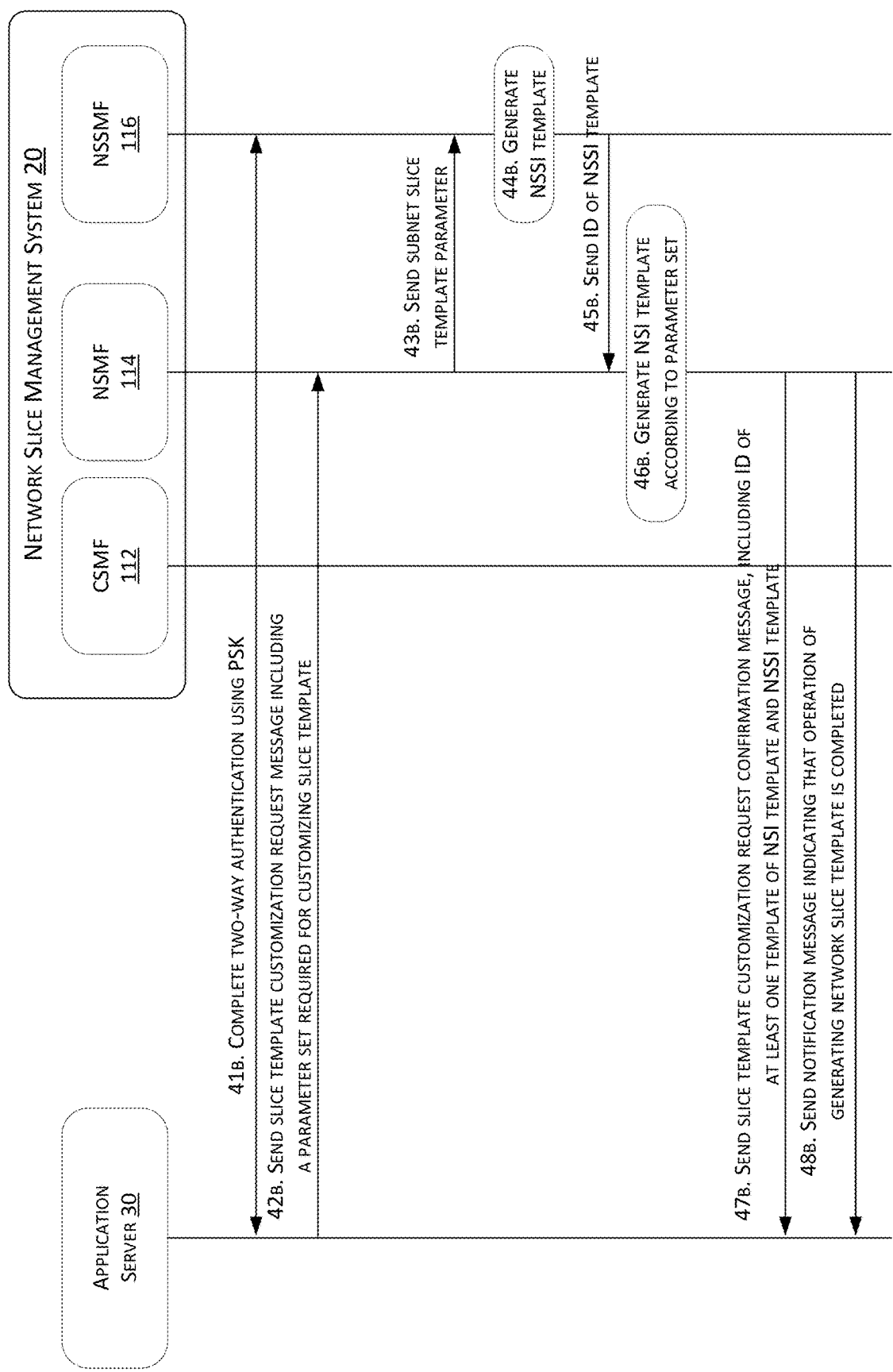
Figure 4C:
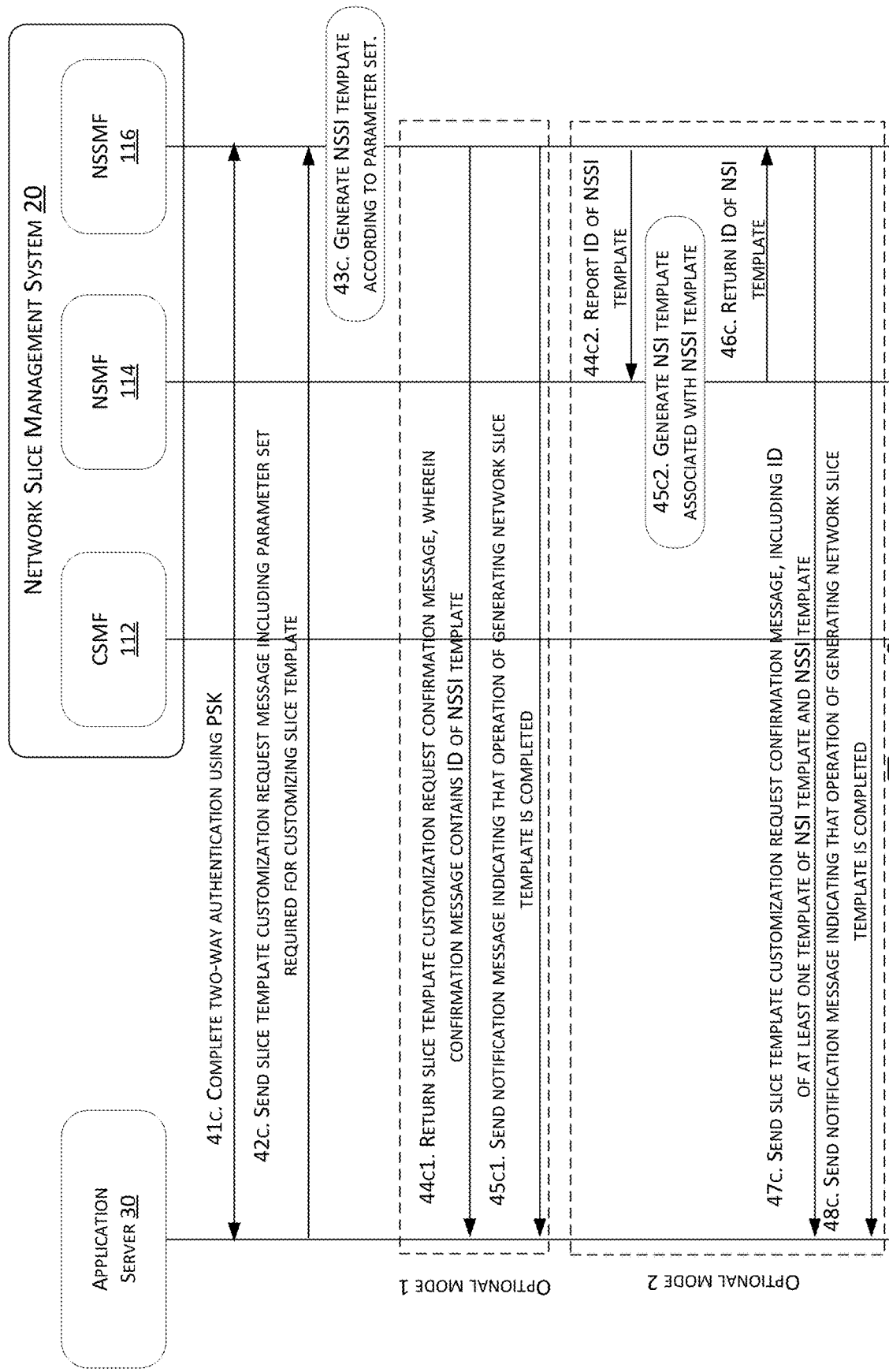

FIGS. 4*a*-4*c* show the process of requesting the service of customizing the slice template:

Exemplary embodiment A1: the process of the application server 30 interfacing with the CSMF 112 through the slice management exposure function entity and requesting the service of customizing the slice template from the network slice management system 20 is shown in FIG. 4*a*, including the following steps.

40*a*. Two-way authentication between the application server and the network slice management system is completed using PSK and the like.

41*a*. The application server sends a slice template customization request message to the slice management exposure function entity to request the slice management exposure function entity to send the request message to the CSMF in the network slice management system.

42*a*. The slice management exposure function entity sends the slice template customization request message from the application server to the CSMF in the network slice management system, wherein the request message comprises a parameter set required for customizing the slice template.

It should be noted that the application server may also directly interface with the CSMF and may directly send the slice template customization request message to the CSMF in the network slice management system.

For example, the parameter set includes at least one of the network KPI parameter, the application-related parameter, the network capacity parameter, the network element configuration parameter, the geographic location of the DN, and the deployment mode of the UPF. The deployment mode of the UPF may include sinking to the DN or being deployed in an operator domain.

43*a*. After receiving the slice template customization request message, the CSMF sends relevant parameters in the parameter set to a corresponding NSMF.

For example, the application server may need to deploy network slices in the designated area, and in such case, a customized slice template may be generated in advance in that designated area. In this application scenario, the slice template customization request message sent by the application server may further carry the designated area information. For example, the area information may be used as a parameter in the parameter set. Accordingly, the CSMF may select an NSMF covering a designated area corresponding to the area information according to the designated area information in the slice template customization request message, and send the area information and the relevant parameters in the parameter set to the selected NSMF.

44*a*. The NSMF decomposes the relevant parameters in the parameter set into subnet slice template parameters required for generating an NSST, and sends the subnet slice template parameters to the selected NSSMF for the NSSMF to generate the NSST accordingly.

For example, the NSMF may send demand parameters related to a radio access (e.g., a delay requirement of a radio) to an NSSMF that manages radio sub-slices. The NSMF may also send demand parameters related to a core network (e.g., a 5G QoS indicator translated using a delay demand and an Allocation and Retention Priority (ARP)) to an NSSMF that manages core network sub-slices.

For example, in the case that the designated area information sent by the CSMF is received, the NSMF may select the NSSMF according to the area information, for example, selecting the NSSMF deployed in a designated area corresponding to the area information. Examples of the NSSMF might be the NSSMF that manages the radio sub-slices and/or the NSSMF that manages the core network sub-slices.

For example, the NSMF determines subnet slice template parameters according to the relevant parameters in the parameter set and a decomposition strategy of these relevant parameters. The decomposition strategy is configured to decompose relevant parameters corresponding to NST (i.e., the relevant parameters in the parameter set) into subnet slice template parameters corresponding to at least one NSST. The second case may be that the NSMF decomposes the relevant parameters corresponding to NST (i.e., the relevant parameters in the parameter set) into subnet slice template parameters corresponding to at least one NSST according to the decomposition strategy carried in the NST. The decomposed subnet slice template parameters include at least one of a core network slice template parameter, a transmission network slice template parameter, and an access network slice template parameter. Each subnet slice template parameter may be sent to an NSSMF in a corresponding subnet.

45a. The NSSMF generates the NSST required by the application server according to the received subnet slice template parameters.

46a. The NSSMF returns an ID of the NSST to the NSMF after generating the NSST.

47a. The NSMF generates an NST associated with the NSST according to the relevant parameters in the parameter set, and associates an ID of the NST with the ID of the NSST returned by the NSSMF to form a mapping relationship between the NST and the NSST.

Further for example, the slice template customization request message includes a customization identifier, which is used to indicate that customizing a template is requested. The CSMF may further send the customization identifier to the NSMF. On such basis, the NSMF may generate a customized NST for the application server 30 according to the customization identifier in the request message, and instruct the NSSMF to generate a corresponding NSST for the application server. Alternatively, a set of third-party server identifiers with the permission to customize the slice template may be maintained in advance. On such basis, the NSMF may judge whether an identifier of the application server 30 belongs to the set of the third-party server identifiers. In the case that the identifier of the application server 30 belongs to the set of the third-party server identifiers, the NSMF may generate the customized NST for the application server 30, and instruct the NSSMF to generate the corresponding NSST for the application server. Identifiers of the third-party server may be at least one of DNN, an IP address, and FQDN.

It should be noted that the NST may be associated with multiple customized NSSTs, or may be associated with at least one default NSST and at least one customized NSST. In other words, the NSSTs associated with the NST can all be customized NSSTs, or some can be customized NSSTs and some can be default NSSTs.

A further note is that in the embodiment, the sequence in which the application server generates the NSST and the NST is not limited. As shown in FIG. 4a, the NSST is generated by the NSSF first and then the NST associated with the NSST is generated by the NSMF, which is used as an example for illustration. The sequence, however, is not limited thereby. In addition, the NSMF may first generate an NST or quote an existing NST, and then instruct the NSSMF to generate the NSST associated with the NST. Alternatively, the NSMF and the NSSMF may also perform the operation of generating templates in parallel. The NSMF finally establishes the mapping relationship between the NST and the NSST.

48a. The NSMF maintains the mapping relationship between the NSST and the NST, and sends the ID of at least one template in the NSST and the NST to the CSMF for the CSMF to feed back the ID of the at least one template to the application server through the slice management exposure function entity.

491a. After receiving the ID of the at least one template returned by the NSMF, the CSMF returns a slice template customization request confirmation message to the application server through the slice management exposure function entity, wherein the confirmation message contains the ID of at least one template.

492a. After the operation of generating the slice template is completed, the CSMF sends a notification message indicating that the operation of generating the slice template is completed to the application server through the slice management exposure function entity.

For example, if the operation of generating the slice template by the NSMF or the NSSMF fails, the CSMF may send to the application server a slice template customization request error message; and the error message includes a cause or cause code for the slice template generation error.

Exemplary embodiment A2: the process of the application server 30 directly interfacing with the NSMF and requesting the service of customizing a slice template from the network slice management system 20 is shown in FIG. 4b, including the following steps.

41b. Two-way authentication between the application server and the network slice management system is completed using PSK and the like.

42b. The application server sends a slice template customization request message to the NSMF in the network slice management system, wherein the request message comprises a parameter set required for customizing the slice template.

For example, the application server may also send to the slice management exposure function entity a slice template customization request message, and the slice management exposure function entity sends the slice template customization request message to the NSMF in the network slice management system.

43b. The NSMF decomposes the relevant parameters in the parameter set into subnet slice template parameters required for generating an NSST, and sends the subnet slice template parameters to the selected NSSMF for the NSSMF to generate the NSST accordingly.

For example, the slice template customization request message sent by the application server may further include the designated area information. For example, the area information may be used as a parameter in the parameter set. On such basis, the NSMF may select the NSSMF according to the area information, for example, selecting the NSSMF deployed in the designated area corresponding to the area information.

Reference for the detailed description of decomposing the relevant parameters in the parameter set into subnet slice template parameters may be made to the embodiment shown in FIG. 4a, which is not elaborated herein again.

44b. The NSSMF generates the NSST required by the application server according to the received subnet slice template parameters.

45b. The NSSMF returns an ID of the NSST to the NSMF after generating the NSST.

46b. The NSMF generates an NST associated with the NSST according to the relevant parameters in the parameter set, and associates an ID of the NST with the ID of the NSST returned by the NSSMF to form a mapping relationship between the NST and the NSST.

Further for example, the slice template customization request message includes a customization identifier, which is used to indicate that customizing a template is requested. On such basis, the NSMF may generate a customized NST for the application server 30 according to the customization identifier in the request message, and instruct the NSSMF to generate a corresponding NSST for the application server.

Alternatively, the NSMF may also maintain a set of third-party server identifiers with the permission to customize the slice template in advance. On such basis, after receiving the slice template customization request message, the NSMF may judge whether an identifier of the application server 30 belongs to the set of the third-party server identifiers. In the case that the identifier of the application server 30 belongs to the set of the third-party server identifiers, the NSMF may generate the customized NST for the application server 30, and instruct the NSSMF to generate the corresponding NSST for the application server.

It should be noted that the NST may be associated with multiple customized NSSTs, or may be associated with at least one default NSST and at least one customized NSST. In other words, the NSSTs associated with the NST can all be customized NSSTs, or some can be customized NSSTs and some can be default NSSTs.

A further note is that in the embodiment, the sequence in which the application server generates the NSST and the NST is not limited. As shown in FIG. 4b, the NSST is generated by the NSSF first and then the NST associated with the NSST is generated by the NSMF, which is used as an example for illustration. The sequence, however, is not limited thereby. In addition, the NSMF may first generate an NST or quote an existing NST, and then instruct the NSSMF to generate the NSST associated with the NST. Alternatively, the NSMF and the NSSMF may also perform the operation of generating templates in parallel. The NSMF finally establishes the mapping relationship between the NST and the NSST.

- 47b. The NSMF maintains the mapping relationship between the NSST and the NST, and returns a slice template customization request confirmation message to the application server, wherein the confirmation message contains the ID of at least one template of the NSST and the NST.
- 48b. After the operation of generating the slice template is completed, the NSMF sends a notification message indicating that the operation of generating the slice template is completed to the application server.

For example, if the operation of generating the slice template by the NSMF or the NSSMF fails, the NSMF may send to the application server a slice template customization request error message; and the error message includes a cause or cause code for the slice template generation error.

Exemplary embodiment A3: the process of the application server 30 directly interfacing with the NSSMF and requesting the service of customizing a slice template from the network slice management system 20 is shown in FIG. 4c, including the following steps.

- 41c. Two-way authentication between the application server and the network slice management system is completed using PSK and the like.
- 42c. The application server sends a slice template customization request message to the NSSMF in the network slice management system, wherein the request message comprises a parameter set required for customizing the slice template.

For example, the application server may also send to the slice management exposure function entity a slice template customization request message, and the slice management exposure function entity sends the slice template customization request message to the NSSMF in the network slice management system.

- 43c. After receiving the slice template customization request message, the NSSMF generates an NSST required by the application server according to relevant parameters in the parameter set.

It should be noted that the NSST generated by the NSSMF can all be customized NSSTs, or some can be customized NSSTs and some can be default NSSTs.

Further for example, the slice template customization request message includes a customization identifier, which is used to indicate that customizing a template is requested. On such basis, the NSSMF may generate a customized NSST for the application server 30 according to the customization identifier in the request message. Alternatively, the NSSMF may also maintain a set of third-party server identifiers with the permission to customize the slice template in advance. On such basis, after receiving the slice template customization request message, the NSMF may judge whether an identifier of the application server 30 belongs to the set of the third-party server identifiers. In the case that the identifier of the application server 30 belongs to the set of the third-party server identifiers, the NSMF may generate the customized NSST for the application server 30.

In an example embodiment, as shown in step 44c1, the NSSMF may directly return to the application server a slice template customization request confirmation message after generating the NSST, the confirmation message containing the ID of the NSST. Furthermore, as shown in step 45c1, after determining that the operation of generating the slice template is completed, the NSSMF sends to the application server a notification message indicating that the operation of generating the slice template is completed. At this point, the service of customizing the slice template is completed. In the example embodiment, the service manufacturer is allowed to only customize the required NSST.

In another example embodiment, as shown in step 44c2, the NSSMF reports an identifier of the generated NSST to the corresponding NSMF for the NSMF to generate the NST corresponding to the NSST; and the process proceeds to step 45c2.

- 45c2. The NSMF generates the NST associated with the NSST according to the received identifier of the NSST, and associates an ID of the NST with the ID of the NSST returned by the NSSMF to form a mapping relationship between the NST and the NSST.
- 46c. After generating the NST, the NSMF returns the ID of the NST to the NSSMF; and the process proceeds to step 47c.
- 47c. The NSSMF returns a slice template customization request confirmation message to the application server, wherein the confirmation message contains the ID of at least one template of the NSST and the NST; and the process proceeds to step 48c.
- 48c. After determining that the operation of generating the slice template is completed, the NSSMF sends a notification message indicating that the operation of generating the slice template is completed to the application server. At this point, the service of customizing the slice template is completed.

A further note is that in the embodiment, the sequence in which the application server generates the NSST and the NST is not limited. As shown in FIG. 4c, the NSST is generated by the NSSF first and then the NST associated with the NSST is generated by the NSMF, which is used as an example for illustration. The sequence, however, is not limited thereby. In addition, the NSMF may first generate an NST or quote an existing NST, and then instruct the NSSMF to generate the NSST associated with the NST. Alternatively, the NSMF and the NSSMF may also perform the operation of generating templates in parallel. The NSMF finally establishes the mapping relationship between the NST and the NSST.

For example, regardless of the scenarios described above, if the operation of generating the slice template by the NSMF or the NSSMF fails, the NSSMF may send to the application server a slice template customization request error message; and the error message includes a cause or cause code for the slice template generation error.

Figure 4D:
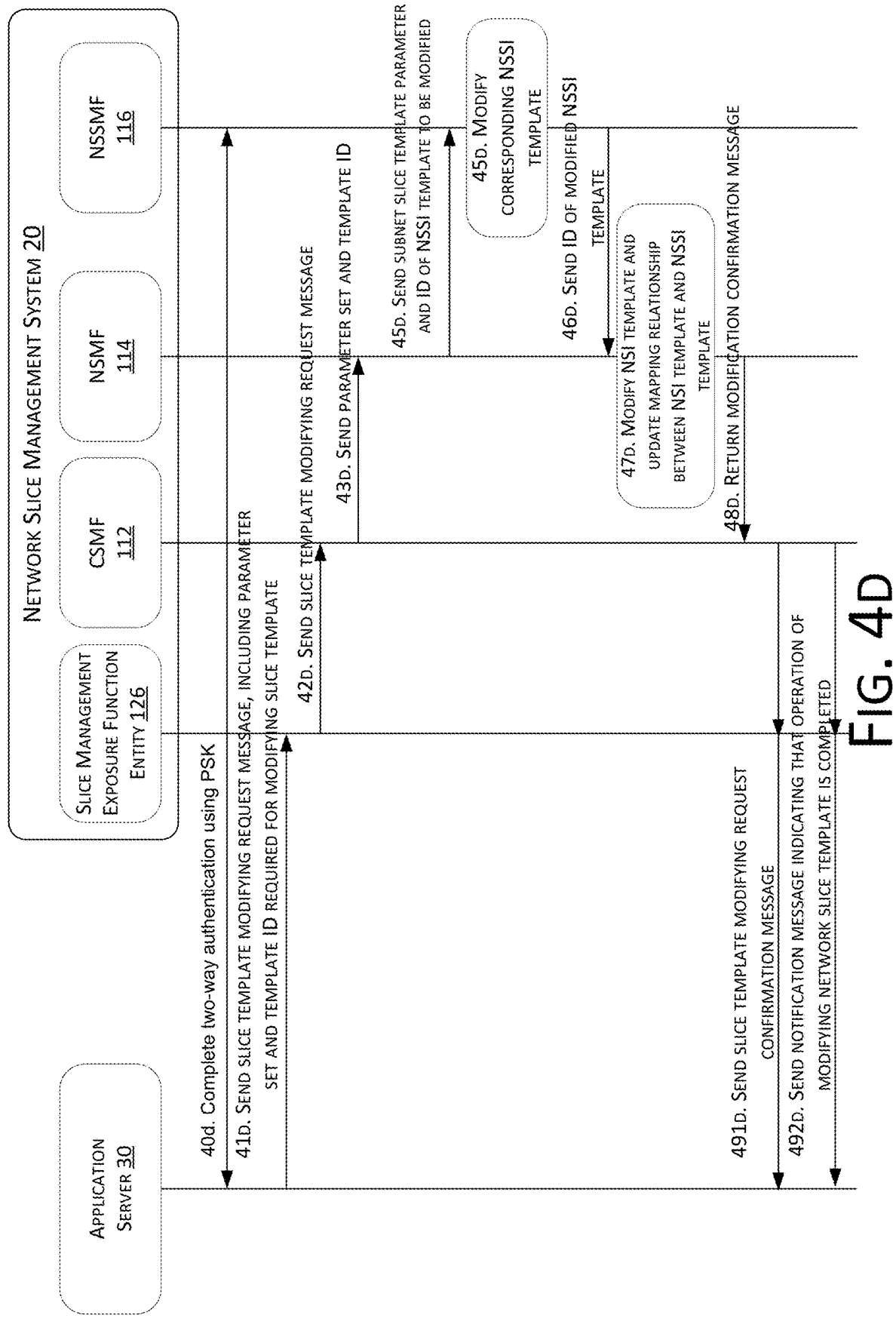
FIGS. 4d-4f show schematic flow diagrams of requesting a service of modifying a slice template respectively through CSMF, NSMF, and NSSMF according to an embodiment of the present disclosure.
Figure 4E:
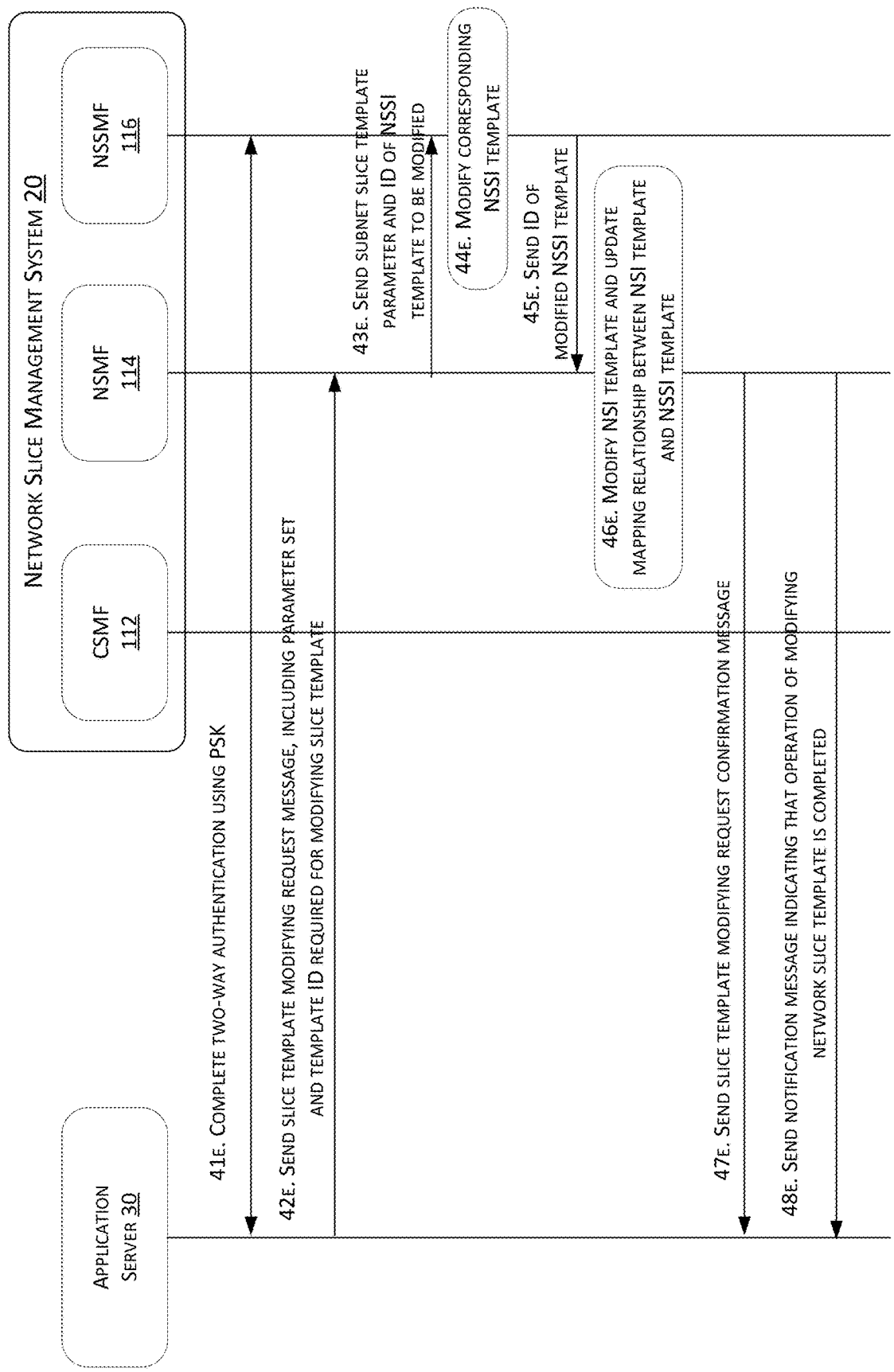
Figure 4F:
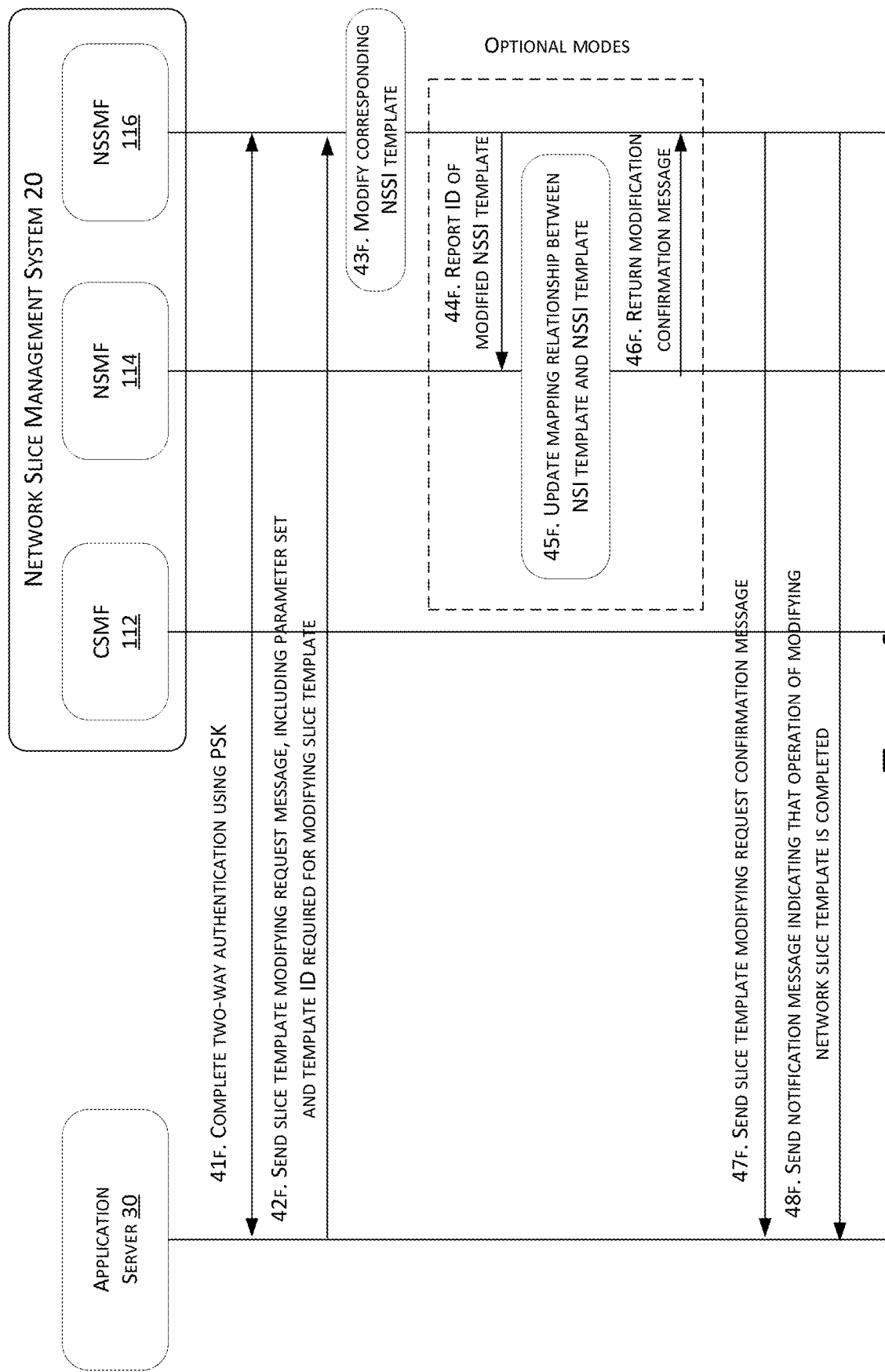

FIGS. 4d-4f show the process of requesting the service of modifying the slice template:

Exemplary embodiment A4: the process of the application server 30 interfacing with the CSMF through the slice management exposure function entity and requesting the service of modifying the slice template from the network slice management system 20 is shown in FIG. 4d, including the following steps.

40d. Two-way authentication between the application server and the network slice management system is completed using PSK and the like.

41d. The application server sends a slice template modifying request message to the slice management exposure function entity to request the slice management exposure function entity to send the request message to the CSMF in the network slice management system.

42d. The slice management exposure function entity sends the slice template modifying request message from the application server to the CSMF in the network slice management system, wherein the request message comprises a template ID indicating the slice template to be modified and a parameter set required for modifying the slice template.

It should be noted that the application server may also directly interface with the CSMF and may directly send the slice template modifying request message to the CSMF in the network slice management system.

The template ID indicating the slice template to be modified may be the NST ID or the NSST ID, or may include both the NST ID and the NSST ID at the same time. In the case that the template ID is the NSST ID, the template ID may indicate that the NSST is to be modified. In the case that the template ID includes both the NST ID and the NSST ID, the template ID may indicate that the NST and the corresponding NSST are to be modified simultaneously. In the case that the template ID is the NST ID, the template ID may indicate that the NST and the corresponding NSST are all to be modified.

For example, the parameter set required for modifying the slice template includes at least one of the network KPI parameter, the application-related parameter, the network capacity parameter, the network element configuration parameter, the geographic location information of the DN, and the deployment mode of the UPF. The deployment mode of the UPF may include sinking to the DN or being deployed in an operator domain.

43d. After receiving the slice template modifying request message, the CSMF sends relevant parameters in the parameter set and the template ID indicating the slice template to be modified to the NSMF.

For example, the application server may need to modify the slice template in the designated area. In this case, the slice template modifying request message may also include the designated area information. For example, the designated area information may be used as a parameter in the parameter set. Accordingly, the CSMF may select an NSMF covering the designated area corresponding to the area information according to the designated area information carried in the slice template modifying request message, and send the area information and the relevant parameters in the parameter set to the selected NSMF.

44d. When determining that the NST and the NSST associated therewith need to be modified according to the template ID indicating the slice template to be modified, the NSMF decomposes the relevant parameters in the parameter set into the subnet slice template parameters required for modifying the NSST, and sends the subnet slice template parameters and the ID of the NSST to be modified to the selected NSSMF, so as to instruct the NSSMF to modify the NSST.

For example, in the case that the designated area information sent by the CSMF is received, the NSMF may select the NSSMF according to the area information, for example, selecting the NSSMF deployed in a designated area corresponding to the area information.

In the embodiment, the NST ID being the template ID indicating the slice template to be modified, and learning that the NST and the NSST associated therewith need to be modified through the NST ID are used as an example. In the case that it is determined that the NST and the NSST associated therewith need to be modified, the NSMF, on the one hand, queries the maintained mapping relationship between the NST and the NSST to obtain the ID of the NSST to be modified, and on the other hand, decomposes the relevant parameters in the parameter set into subnet slice template parameters required for modifying the NSST; and then the subnet slice template parameters are sent to the NSSMF together with the ID of the NSST to be deleted, so as to indicate to the NSSMF that a corresponding NSST is to be modified. For example, the NSSMF may delete an original NSST and regenerate a new NSST according to a new subnet slice template parameter, or may change the original NSST according to the new subnet slice template parameter.

Reference for the detailed description of decomposing the relevant parameters in the parameter set into subnet slice template parameters may be made to the embodiment shown in FIG. 4a, which is not elaborated herein again.

45d. The NSSMF modifies the corresponding NSST according to the received subnet slice template parameters and the ID of the NSST to be modified.

46d. After modifying the NSST, the NSSMF returns the ID of the modified NSST to the NSMF.

47d. The NSMF modifies the NST corresponding to the NST ID according to the received ID of the modified NSST, then updates the mapping relationship between the NST and the NSST, and returns a modification confirmation message to the CSMF, as shown in step 48d.

Furthermore, in the case that the application server is a third-party server, before the NSST is modified, whether the NST or NSST to be modified is a customized NST or a customized NSST may further be determined according to the template ID indicating the slice template to be modified. If the NST or the NSST to be modified is a customized NST or a customized NSST, an identifier of the corresponding customization manufacturer may be acquired from the template ID indicating the slice template to be modified; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of modifying the customized NST or the customized NSST associated therewith and the mapping relationship between the NST and the NSST is performed. If the two do not match, a modification error message is outputted. Of course, if the NST or NSST to be modified is a system defaulted NST or a system defaulted NSST, the modification error message may also be outputted as the application server 30 does not have the permission to modify the system defaulted NST or the system defaulted NSST. The identifier of the application server and the identifier of the customization manufacturer may be in one-to-one correspondence by means of the mapping relationship. For example, identifiers of the third-party application server may be at least one of DNN, an IP address, and FQDN. The identifier of a customization manufacturer may be represented by several bits. For example, if the identifier of an application manufacturer A is 01011, and the identifier of an application server thereof is marked as IP address 1, then the 01011 and the IP address 1 form a mapping relationship. In this way, when the IP address of the application server is 1 and the identifier of the customization manufacturer is 01011, the two match; otherwise, the two do not match.

The mapping relationship between the NST and the NSST is updated. For example, the updating may be changing from a customized NST corresponding to a default NSST1 and a customized NSST1 to the customized NST corresponding to a customized NSST1 and a customized NSST2, or the updating may be changing the customized NSTA corresponding to a default NSST1 and a customized NSST1 to a customized NSI template B corresponding to a default NSST1, a customized NSST1, and a customized NSST2. These are examples of updating the mapping relationship between the NST and the NSST.

It should be noted that if the slice template customized by the service manufacturer corresponding to the application server only contains the NSST, the NSMF may directly return the modification confirmation message to the CSMF after receiving the ID of the modified NSST without performing the operation of updating the mapping relationship between the NST and the NSST.

491d. After receiving the modification confirmation message returned by the NSMF, the CSMF returns a slice template modifying request confirmation message to the application server through the slice management exposure function entity.

492d. After determining that the operation of modifying the slice template is completed, the CSMF sends a notification message indicating that the operation of modifying the slice template is completed to the application server through the slice management exposure function entity.

For example, if the operation of modifying the slice template fails, the CSMF may send to the application server a slice template modifying request error message; and the error message includes a cause or cause code for the slice template modification error.

In the embodiment shown in FIG. 4d, the ID of the NST being the template ID indicating the slice template to be modified, and the NST and the NSST associated therewith needing to be modified are used as an example to illustrate the process of modifying the slice template. In the process of modifying the slice template, modifying the NST or the NSST first is not limited. FIG. 4d shows an illustration of using the NSST being modified first by the NSSMF, and the NSMF modifying the NST and updating the mapping relationship between the NST and the NSST later as an example. In addition, the NSMF may also modify the NST first. After the NSSMF is instructed to modify the NSST and the NSST is modified, the NSMF updates the mapping relationship between the NST and the NSST. Alternatively, the NSMF and the NSSMF may also perform the modifying operation in parallel. The NSMF finally updates the mapping relationship between the NST and the NSST.

In an example embodiment, when the template ID of the slice template to be modified is the NST ID and only the NST needs to be modified, then in the embodiment shown in FIG. 4d, after receiving the relevant parameters in the parameter set and the NST ID, the NSMF may modify the NST corresponding to the NST ID according to the relevant parameters in the parameter set, and update the mapping relationship between the NST and the NSST after the NST is modified. For example, if the original NST A is modified to a new NST B, the ID of the NST A in the mapping relationship between the NST and the NSST needs to be modified to the ID of the NST B. Furthermore, the ID of the new NST B may also be sent to the NSSMF, such that the NSSMF may learn that the NST associated with the NSST is modified and learn about the ID of the new NST B after the modification. After updating the mapping relationship between the NST and the NSST, the NSMF may return a modification confirmation message to the CSMF.

In another example embodiment, when the template ID of the slice template to be modified is the NSST ID, it means that the NSST needs to be modified. Then in the embodiment shown in FIG. 4d, after receiving the relevant parameters in the parameter set and the NST ID, the NSMF decomposes the relevant parameters in the parameter set into subnet slice template parameters required for modifying the NSST, and sends the subnet slice template parameters and the NSST ID to the selected NSSMF to enable the NSSMF to modify the NSST. The NSSMF modifies the corresponding NSST according to the subnet slice template parameters and the NSST ID. For example, NSST A_1 is modified to NSST A_2; the ID of the modified NSST A_2 is returned to the NSMF; the NSMF updates the mapping relationship between the NST and the NSST according to the received ID of the modified NSST, i.e., the ID of the original NSST A_1 in the mapping relationship is updated to the ID of the NSST A_2 after the modification. After updating the mapping relationship between the NST and the NSST, the NSMF may return a modification confirmation message to the CSMF.

Similarly, in the two example embodiments, in the case that the application server is a third-party server, before modifying the NST or NSST, whether the NST or NSST to be modified is a customized NST or customized NSST may further be determined. If the NST or NSST to be modified is a customized NST or customized NSST, an identifier of the customization manufacturer may be acquired. Whether the identifier of the application server and the identifier of the customization manufacturer match is determined. If the two match, the operation of modifying the customized NST or the customized NSST and the mapping relationship between the NST and the NSST is performed. If the two do not match, a modification error message is outputted.

Exemplary embodiment A5: the process of the application server 30 directly interfacing with the NSMF and requesting the service of modifying a slice template from the network slice management system 20 is shown in FIG. 4e, including the following steps.

41e. Two-way authentication between the application server and the network slice management system is completed using PSK and the like.

42e. The application server sends a slice template modifying request message to the NSMF in the network slice management system, wherein the request message comprises a template ID indicating the slice template to be modified and a parameter set required for modifying the slice template.

For example, the application server may also send to the slice management exposure function entity a slice template modifying request message, and the slice management exposure function entity sends the slice template modifying request message to the NSMF in the network slice management system.

The template ID indicating the slice template to be modified may be the NST ID or the NSST ID, or may include both the NST ID and the NSST ID at the same time. In the case that the template ID is the NSST ID, the template ID may indicate that the NSST is to be modified. In the case that the template ID includes both the NST ID and the NSST ID, the template ID may indicate that the NST and the corresponding NSST are to be modified simultaneously. In the case that the template ID is the NST ID, the template ID may indicate that the NST and the corresponding NSST are all to be modified.

For example, the parameter set required for modifying the slice template includes at least one of the network KPI parameter, the application-related parameter, the network capacity parameter, the network element configuration parameter, the geographic location information of the DN, and the deployment mode of the UPF. The deployment mode of the UPF may include sinking to the DN or being deployed in an operator domain.

43e. When determining that the NST and the NSST associated therewith need to be modified according to the template ID indicating the slice template to be modified, the NSMF decomposes relevant parameters in the parameter set into subnet slice template parameters required for modifying the NSST, and sends the subnet slice template parameters and an ID of the NSST to be modified to the selected NSSMF, so as to instruct the NSSMF to modify the NSST.

For example, the application server may need to modify the slice template in the designated area. In this case, the slice template modifying request message may also include the designated area information. For example, the designated area information may be used as a parameter in the parameter set. Accordingly, the NSMF may select the NSSMF according to the area information, for example, selecting the NSSMF deployed in the designated area corresponding to the area information.

In the embodiment, the NST ID being the template ID of the slice template to be modified, and learning that the NST and the NSST associated therewith need to be modified through the NST ID are used as an example. In the case that it is determined that the NST and the NSST associated therewith need to be modified, the NSMF, on the one hand, queries the maintained mapping relationship between the NST and the NSST to obtain the ID of the NSST to be modified, and on the other hand, decomposes the relevant parameters in the parameter set into subnet slice template parameters required for modifying the NSST; and then the subnet slice template parameters are sent to the NSSMF together with the ID of the NSST to be deleted, so as to indicate to the NSSMF that a corresponding NSST is to be modified. For example, the NSSMF may delete an original NSST and regenerate a new NSST according to a new subnet slice template parameter, or may change the original NSST according to the new subnet slice template parameter.

44e. The NSSMF modifies the corresponding NSST according to the received subnet slice template parameters and the ID of the NSST to be modified.

45e. After modifying the NSST, the NSSMF returns an ID of the modified NSST to the NSMF.

46e. The NSMF modifies the NST corresponding to the NST ID according to the received ID of the modified NSST, then updates the mapping relationship between the NST and the NSST, and returns the slice template modifying request confirmation message to the application server, which can be shown in step 47e.

Furthermore, in the case that the application server is a third-party server, before the NSST is modified, whether the NST or NSST to be modified is a customized NST or a customized NSST may further be determined according to the template ID indicating the slice template to be modified. If the NST or the NSST to be modified is a customized NST or a customized NSST, an identifier of the corresponding customization manufacturer may be acquired from the template ID indicating the slice template to be modified; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of modifying the customized NST or the customized NSST associated therewith and the mapping relationship between the NST and the NSST is performed. If the two do not match, a modification error message is outputted. Of course, if the NST or NSST to be modified is a system defaulted NST or a system defaulted NSST, the modification error message may also be outputted as the application server 30 does not have the permission to modify the system defaulted NST or the system defaulted NSST.

The mapping relationship between the NST and the NSST is updated. For example, the updating may be changing from a customized NST corresponding to a default NSST1 and a customized NSST1 to the customized NST corresponding to a customized NSST1 and a customized NSST2, or the updating may be changing the customized NSTA corresponding to a default NSST1 and a customized NSST1 to a customized NSTB corresponding to a default NSST1, a customized NSST1, and a customized NSST2. These are examples of updating the mapping relationship between the NST and the NSST.

It should be noted that if the slice template customized by the service manufacturer corresponding to the application server only contains the NSST, the NSMF may directly return the slice template modifying request confirmation message to the application server after receiving the ID of the modified NSST without performing the operation of updating the mapping relationship between the NST and the NSST.

48e. After determining that the operation of modifying the slice template is completed, the NSMF sends a notification message indicating that the operation of modifying the slice template is completed to the application server.

For example, if the operation of modifying the slice template fails, the NSMF may send to the application server a slice template modifying request error message; and the error message includes a cause or cause code for the slice template modification error.

In the embodiment shown in FIG. 4e, the ID of the NST being the template ID indicating the slice template to be modified, and the NST and the NSST associated therewith needing to be modified are used as an example to illustrate the process of modifying the template. In the process of modifying the template, modifying the NST or the NSST first is not limited. FIG. 4e shows an illustration of using the NSST being modified first by the NSSMF, and the NSMF modifying the NST and updating the mapping relationship between the NST and the NSST later as an example. In addition, the NSMF may also modify the NST first. After the NSSMF is instructed to modify the NSST and the NSST is modified, the NSMF updates the mapping relationship between the NST and the NSST. Alternatively, the NSMF and the NSSMF may also perform the modifying operation in parallel. The NSMF finally updates the mapping relationship between the NST and the NSST.

In an example embodiment, when the template ID indicating the slice template to be modified is the NST ID and only the NST needs to be modified, then in the embodiment shown in FIG. 4e, after receiving the slice template change request message, the NSMF may modify the NST corresponding to the NST ID according to the relevant parameters in the parameter set included in the request message, and update the mapping relationship between the NST and the NSST after the NST is modified. For example, if the original NST A is modified to the new NST B, the ID of the NST A in the mapping relationship between the NST and the NSST needs to be modified to the ID of the NST B. Furthermore, the ID of the new NST B may also be sent to the NSSMF, such that the NSSMF may learn that the NST associated with the NSST is modified and learn about the ID of the new NST B after the modification. After updating the mapping relationship between the NST and the NSST, the NSMF returns the slice template modifying request confirmation message to the application server.

In another example embodiment, when the template ID of the slice template to be modified is the NSST ID, it means that the NSST needs to be modified. Then in the embodiment shown in FIG. 4e, after receiving the slice template modifying request message, the NSMF decomposes the relevant parameters in the parameter set included in the request message into subnet slice template parameters required for modifying the NSST, and sends the subnet slice template parameters and the NSST ID to the selected NSSMF to enable the NSSMF to modify the NSST. The NSSMF modifies the corresponding NSST according to the subnet slice template parameters and the NSST ID. For example, NSST A_1 is modified to NSST A_2; the ID of the modified NSST A_2 is returned to the NSMF; the NSMF updates the mapping relationship between the NST and the NSST according to the received ID of the modified NSST, i.e., the ID of the original NSST A_1 in the mapping relationship is updated to the ID of the NSST A_2 after the modification. After updating the mapping relationship between the NST and the NSST, the NSMF returns the slice template modifying request confirmation message to the application server.

Similarly, in the two example embodiments, in the case that the application server is a third-party server, before modifying the NST or NSST, whether the NST or NSST to be modified is a customized NST or customized NSST may further be determined. If the NST or NSST to be modified is a customized NST or customized NSST, an identifier of the customization manufacturer may be acquired. Whether the identifier of the application server and the identifier of the customization manufacturer match is determined. If the two match, the operation of modifying the customized NST or the customized NSST and the mapping relationship between the NST and the NSST is performed. If the two do not match, a modification error message is outputted.

Exemplary embodiment A6: the process of the application server 30 directly interfacing with the NSSMF and requesting the service of modifying a slice template from the network slice management system 20 is shown in FIG. 4f, including the following steps.

41f Two-way authentication between the application server and the network slice management system is completed using PSK and the like.

42f. The application server sends a slice template modifying request message to the NSMF in the network slice management system, wherein the request message comprises a template ID indicating the slice template to be modified and a parameter set required for modifying the slice template.

For example, the application server may also send to the slice management exposure function entity a slice template modifying request message, and the slice management exposure function entity sends the slice template modifying request message to the NSSMF in the network slice management system.

The template ID indicating the slice template to be modified may be the NST ID or the NSST ID, or may include both the NST ID and the NSST ID at the same time. In the case that the template ID is the NSST ID, the template ID may indicate that the NSST is to be modified. In the case that the template ID includes both the NST ID and the NSST ID, the template ID may indicate that the NST and the corresponding NSST are to be modified simultaneously. In the case that the template ID is the NST ID, the template ID may indicate that the NST and the corresponding NSST are all to be modified.

For example, the parameter set required for modifying the slice template includes at least one of the network KPI parameter, the application-related parameter, the network capacity parameter, the network element configuration parameter, the geographic location information of the DN, and the deployment mode of the UPF. The deployment mode of the UPF may include sinking to the DN or being deployed in an operator domain.

43f. The NSSMF determines whether the NSST needs to be modified according to the template ID indicating the slice template to be modified. For example, in the case that the template ID is the NSST ID, the corresponding NSST needing to be modified is determined. Then, the NSST corresponding to the NSST ID is modified according to the relevant parameters in the parameter set.

In the embodiment shown in FIG. 4f, NSST needing to be modified is used as an example. For example, if the template ID indicating the slice template to be modified contains the NSST ID, the NSSMF may directly use the contained NSST ID as the ID of the NSST to be modified, and modify the corresponding NSST accordingly. Alternatively, if the template ID indicating the slice template to be modified contains only the NST ID, and it is indicated that the NST and the NSST associated therewith need to be modified at the same time, then the NSSMF may report the NST ID to the NSMF. The NSMF may query the maintained mapping relationship between the NST and the NSST according to the NST ID, so as to acquire the ID of the NSST to be modified and return the ID to the NSSMF. The NSSMF then modifies the corresponding NSST accordingly.

44f After modifying the corresponding NSST, the NSSMF may further report an ID of the modified NSST to the NSMF to enable the NSMF to update the mapping relationship between the NST and the NSST according to the ID of the modified NSST.

45f. The NSMF updates the mapping relationship between the NST and the NSST according to the ID of the modified NSST reported by the NSSMF. For example, when the NSSMF modifies NSSTA_1 to NSSTA_2, then the NSMF may update the ID of NSSTA_1 in the mapping relationship to the ID of NSSTA_2.

46f After updating the mapping relationship between the NST and the NSST, the NSMF returns a modification confirmation message to the NSSMF.

For example, if only the NSST needs to be modified, for example, in the case that the template ID indicating the slice template to be modified is the NSST ID, the NSMF only needs to modify the mapping relationship between the NST and the NSST after receiving the ID of the modified NSST reported by the NSSMF. Further for example, if not only the NSST but also the NST need to be modified, for example, in the case that the template ID indicating the slice template to be modified is the NST ID or includes both the NSST ID and the NST ID, then in addition to modifying the corresponding NSST according to the relevant parameters in the parameter set and the template ID, the NSSMF further needs to report the parameter set and the template ID to the corresponding NSMF. The NSMF needs to modify the corresponding NST according to the relevant parameters in the parameter set and he template ID, and then further updates the mapping relationship between the NST and the NSST. For example, when the NSSMF modifies NSST A_1 to NSST B_1 and the NSMF modifies NST A to NST B, the mapping relationship between the NST A and NSST A_1 needs to be updated to the mapping relationship between the NST B and NSST B_1.

Furthermore, in the case that the application server is a third-party server, before the NST or NSST is modified, whether the NST or NSST to be modified is a customized NST or a customized NSST may further be determined according to the template ID. If the NST or the NSST to be modified is a customized NST or a customized NSST, an identifier of the corresponding customization manufacturer may be acquired from the template ID; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of modifying the customized NST or the customized NSST and the mapping relationship between the NST and the NSST is performed. If the two do not match, a modification error message is outputted. Of course, if the NST or NSST to be modified is a system defaulted NST or a system defaulted NSST, the modification error message may also be outputted as the application server 30 does not have the permission to modify the system defaulted NST or the system defaulted NSST. Refer to the previous embodiments for the mapping between the identifier of the application server and the identifier of the customization manufacturer.

The mapping relationship between the NST and the NSST is updated. For example, the updating may be changing the customized NST corresponding to a default NSST1 and a customized NSST1 to the customized NST corresponding to a customized NSST1 and a customized NSST2. These are examples of updating the mapping relationship between the NST and the NSST.

47f After receiving the modification confirmation message returned by the NSMF, the NSSMF returns the slice template modifying request confirmation message to the application server.

48f After determining that the operation of modifying the slice template is completed, the NSSMF sends a notification message indicating that the operation of modifying the slice template is completed to the application server.

For example, if the operation of modifying the slice template fails, the NSSMF may send to the application server a slice template modifying request error message; and the error message includes a cause or cause code for the slice template modification error.

In the embodiment shown in FIG. 4f, detailed description of only modifying the NSST or modifying both the NSST and the NST is provided. In an example embodiment, when the template ID indicating the slice template to be modified is the NST ID and only the NST needs to be modified, then in the embodiment shown in FIG. 4f, after receiving the slice template modifying request message, the NSSMF may report the parameter set in the request message and the NST ID to the NSMF for the NSMF to modify the corresponding NST and update the mapping relationship between the NST and the NSST after the NST is modified. After the NSMF receives the parameter set and the NST ID, the NST corresponding to the NST ID is modified according to the relevant parameters in the parameter set. For example, if the original NST A is modified to the new NST B, the ID of the NST A in the mapping relationship between the NST and the NSST needs to be modified to the ID of the NST B. Furthermore, the ID of the new NSTB may be sent to the NSSMF through the modification confirmation message, such that the NSSMF may learn that the NST associated with the NSST is modified and learn about the ID of the new NST B after the modification. After receiving the modification confirmation message returned by the NSMF, the NSSMF returns the slice template modifying request confirmation message to the application server.

Similarly, in the example embodiment, in the case that the application server is a third-party server, before modifying the NST, whether the NST to be modified is a customized NST may further be determined. If the NST to be modified is a customized NST, an identifier of the customization manufacturer may be acquired. Whether the identifier of the application server and the identifier of the customization manufacturer match is determined. If the two match, the operation of modifying the customized NST and the mapping relationship between the NST and the NSST is performed. If the two do not match, a modification error message is outputted.

In the embodiment shown in FIG. 4f, in the case that the NST and the NSST associated with the NST need to be modified, modifying the NST or the NSST first is not limited. FIG. 4f shows an illustration of using the NSST being modified first by the NSSMF, and the NSMF modifying the NST and updating the mapping relationship between the NST and the NSST later as an example. In addition, the NSSMF may also request the NSMF to modify the NST first, and then the NSSMF modifies the NSST. Further, the NSMF updates the mapping relationship between the NST and the NSST after the NSST is modified. Alternatively, the NSMF and the NSSMF may also perform the modifying operation in parallel. The NSMF finally updates the mapping relationship between the NST and the NSST.

Figure 4G:
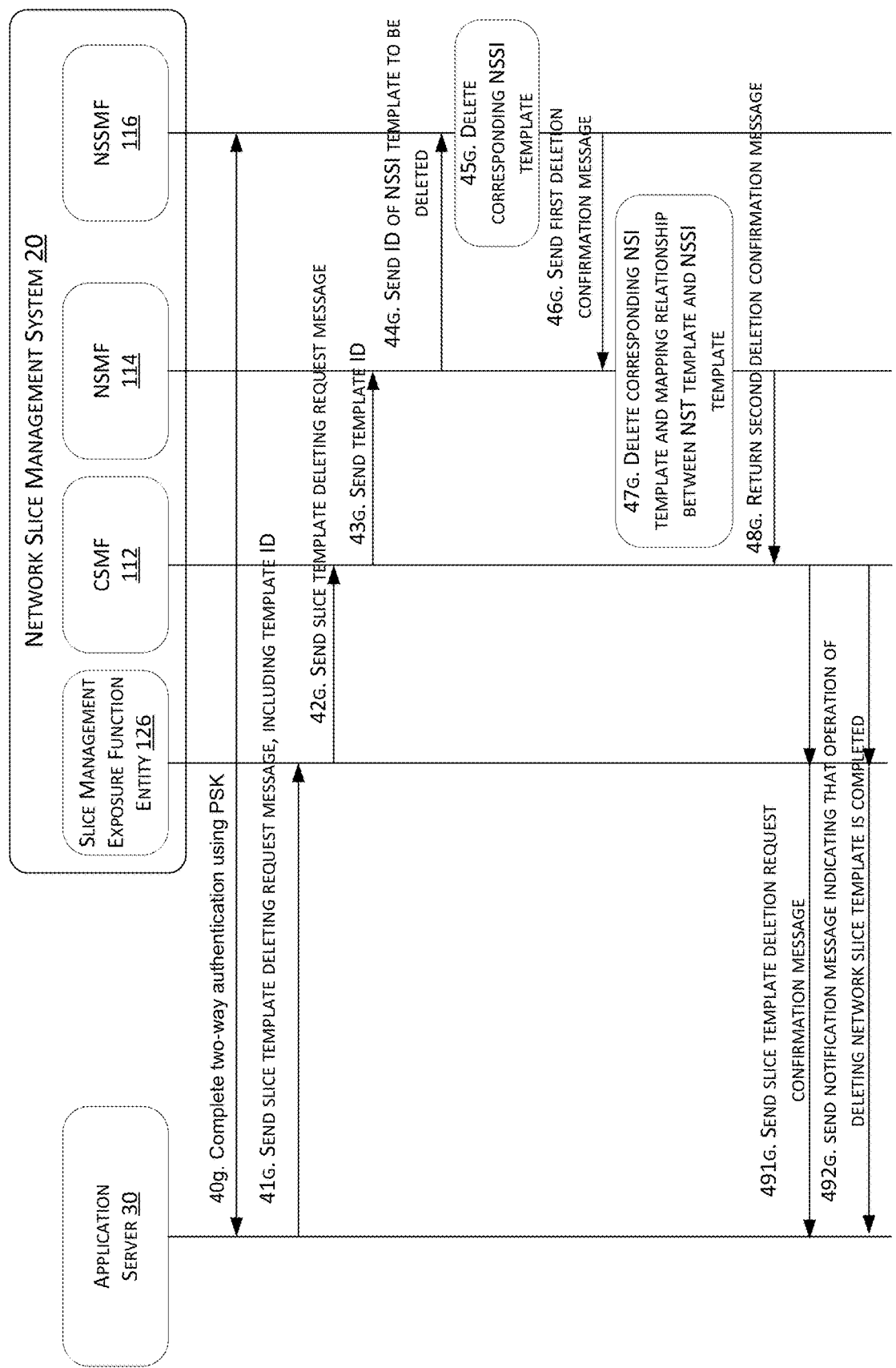
FIGS. 4g-4i show schematic flow diagrams of requesting a service of deleting a slice template respectively through CSMF, NSMF, and NSSMF according to an embodiment of the present disclosure.
Figure 4H:
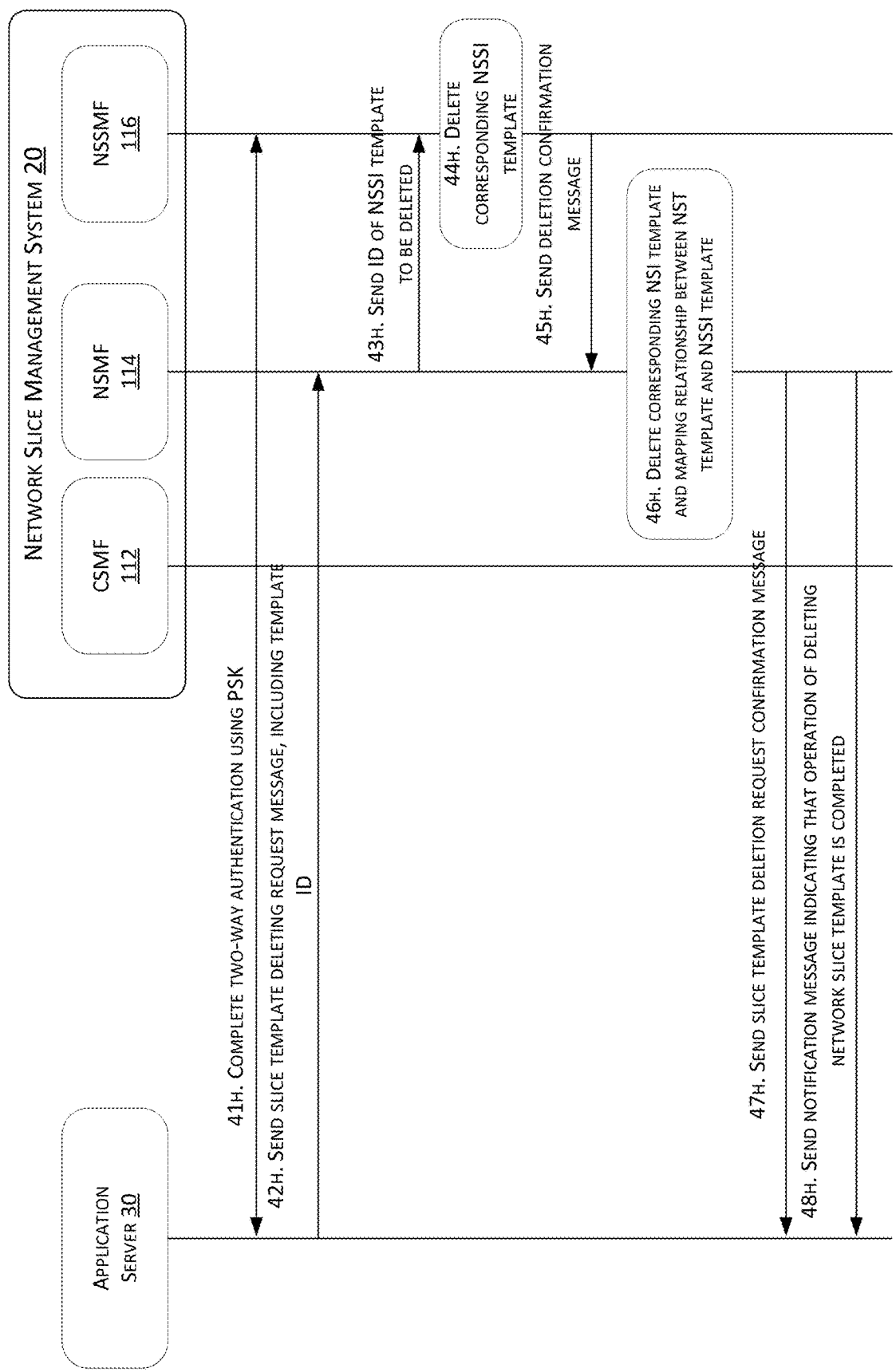
Figure 4I:
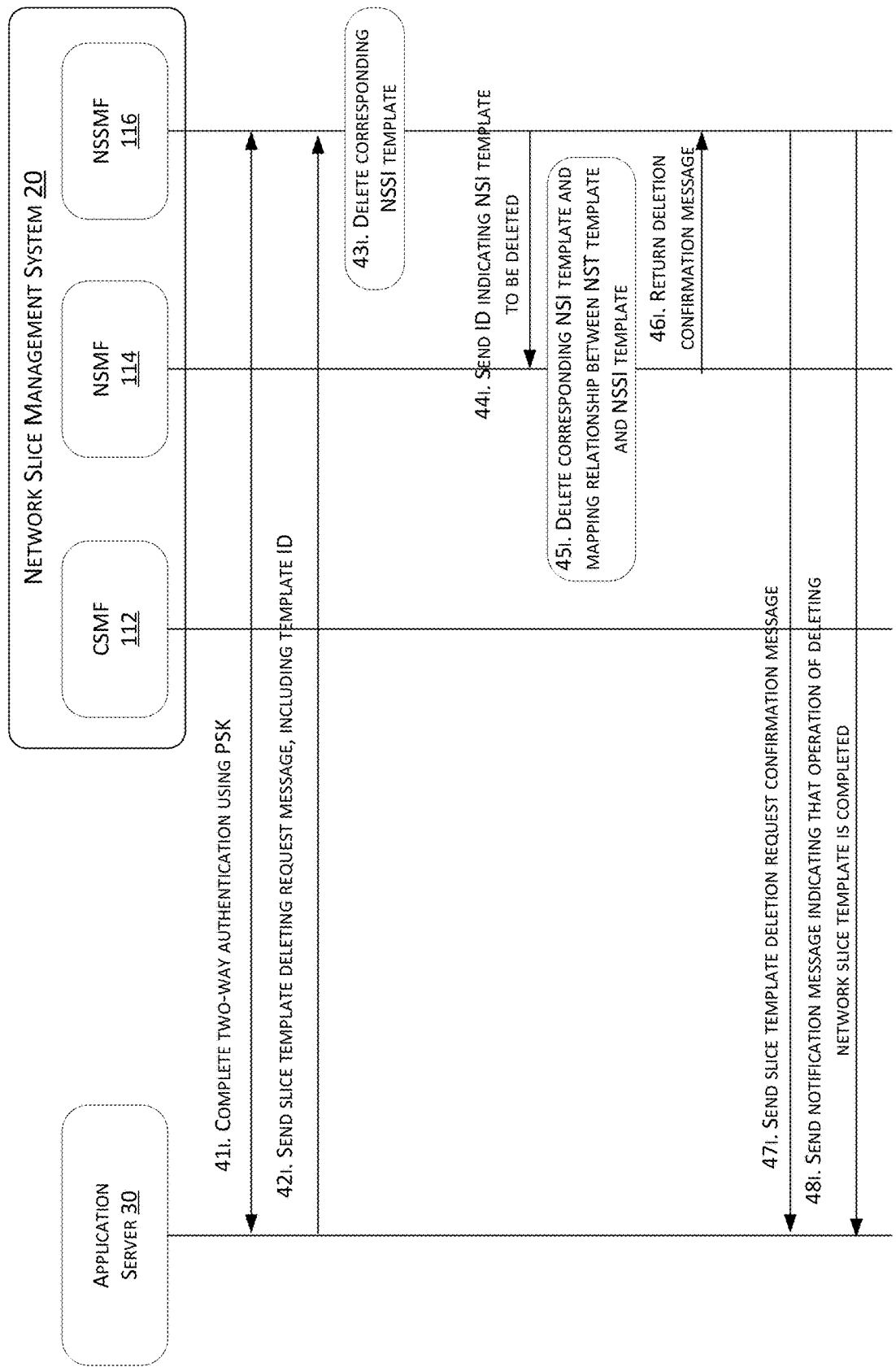

FIGS. 4g-4i show the process of requesting the service of deleting the slice template:

Exemplary embodiment A7: the process of the application server 30 interfacing with the CSMF through the slice management exposure function entity and requesting the service of deleting the slice template from the network slice management system 20 is shown in FIG. 4g, including the following steps.

40g. Two-way authentication between the application server and the network slice management system is completed using PSK and the like.

41g. The application server sends a slice template deleting request message to the slice management exposure function entity to request the slice management exposure function entity to send the request message to the CSMF in the network slice management system.

42g. The slice management exposure function entity sends the slice template deleting request message from the application server to the CSMF in the network slice management system, wherein the request message comprises a template ID indicating a slice template to be deleted.

It should be noted that the application server may also directly interface with the CSMF and may directly send the slice template deleting request message to the CSMF in the network slice management system.

The template ID indicating the slice template to be deleted may be the NST ID or the NSST ID, or may include both the NST ID and the NSST ID at the same time. In the case that the template ID is the NSST ID, the template ID may indicate that the NSST is to be deleted. In the case that the template ID includes both the NST ID and the NSST ID, or simply includes the NST ID, the template ID may indicate that the NST and the corresponding NSST are to be deleted simultaneously. In addition, in the case that the template ID includes only the NST ID, the template ID may only indicate that the NST is to be deleted. For example, in the case that all NSTs customized by a service manufacturer corresponding to the application server are associated with system defaulted NSSTs and/or NSSTs customized by other service manufacturers, the service manufacturer corresponding to application server does not have the permission to delete system defaulted NSSTs and/or NSSTs customized by other service manufacturers. In this case, only the NST customized by itself and the mapping relationship between the NST and the NSST may be deleted, falling into the scenario where only the NST may be deleted.

Furthermore, in the case that the application server 30 is a third-party server, the slice template deletion request from the application server 30 may only request to delete the customized NST and the customized NSST, but cannot delete the system defaulted NST or the default NSST. In such case, the template ID indicating the slice template to be deleted may be a customized NST ID and/or a customized NSST ID. Of course, if the application server 30 is from an operator, the application server 30 may then delete the system defaulted NST and the system defaulted NSST. That is, different application servers have different template deletion permissions. Each embodiment of the present disclosure focuses on the case that the application server 30 is a third-party server.

In the embodiment, the NSST indicating to delete the NST and the NSST associated with the NST simultaneously is taken as the example to illustrate the deletion process. For example, the template ID indicating the slice template to be deleted may be the NST ID or may include both the NST ID and the NSST ID.

43g. After receiving the slice template deleting request message, the CSMF sends the template ID indicating the slice template to be deleted to the NSMF.

For example, the application server may need to delete the slice template in the designated area. In this case, the slice template deleting request message may also include the designated area information. Accordingly, the CSMF may select an NSMF covering the area information according to the designated area information in the request message, and send the area information and the template ID to the selected NSMF.

44g. The NSMF selects the NSSMF and sends an ID of the NSST to be deleted to the selected NSSMF to instruct the selected NSSMF to delete the corresponding NSST.

For example, in the case that the designated area information sent by the CSMF is received, the NSMF may select the NSSMF according to the area information, for example, selecting the NSSMF deployed in a designated area corresponding to the area information.

For example, if the template ID indicating the slice template to be deleted contains the NSST ID, the contained NSST ID may be directly sent to the NSSMF as the ID of the NSST to be deleted. If the template ID indicating the slice template to be deleted only contains the NST ID, the maintained mapping relationship between the NST and the NSST may be queried according to the contained NST ID, so as to acquire the ID of the NSST to be deleted. The ID is then sent to the NSSMF.

45g. The NSSMF deletes the corresponding NSST according to the received ID of the NSST to be deleted, and returns a first deletion confirmation message to the NSMF, as shown in step 46g.

In the embodiment, the network slice management system may provide a default NSST; and a service manufacturer corresponding to the application server may also customize the NST and the NSST. In the case that the NST is customized by a service manufacturer corresponding to the application server, the customized NST may be associated with the NSST customized by the manufacturer corresponding to the application server, or may be associated with the system defaulted NSST. However, in the case that the application server 30 is a third-party server, the slice template deletion request from the application server 30 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, if the application server 30 is a third-party server, before the corresponding NSST is deleted, whether the NSST is a customized NSST or a system defaulted NSST may be determined. If the NSST is a customized NSST, an identifier of the customization manufacturer is acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST and the subsequent operation of deleting the mapping relationship between the NST and the NSST are performed. If the two do not match, the deletion error message is outputted. Of course, if the NSST is a system defaulted NSST, only the mapping relationship between the NSST and the NST needs to be deleted. The system defaulted NSST needs to be kept. Refer to the previous embodiments for the mapping between the identifier of the application server and the identifier of the customization manufacturer.

47g. After receiving the first deletion confirmation message returned by the NSSMF, the NSMF deletes the mapping relationship between the NST and the NSST, deletes the NST, and returns a second deletion confirmation message to the CSMF, as shown in step 48g.

It should be noted that the operation of determining whether the identifier of the application server and the identifier of the customization manufacturer match may be performed by the NSSMF in the process of deleting the NSST, or by the NSMF in the process of deleting the NST. Alternatively, after receiving the template ID indicating the slice template to be deleted, the NSMF may first perform a determination. That is, before the NSST and the NSST are deleted, the NSMF may determine whether the NST to be deleted is a customized NST according to the template ID indicating the slice template to be deleted. If the NST to be deleted is a customized NST, an identifier of the customization manufacturer may be acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST, the NST, and the mapping relationship between the NST and the NSST is performed. If the two do not match, a deletion error message is outputted, and the operation of deleting the template ends.

491g. After receiving the second deletion confirmation message returned by the NSMF, the CSMF returns a slice template deletion request confirmation message to the application server through the slice management exposure function entity.

492g. After determining that the operation of deleting the slice template is completed, the CSMF sends a notification message indicating that the operation of deleting the slice template is completed to the application server through the slice management exposure function entity.

For example, if the operation of deleting the slice template fails, the CSMF may send to the application server a slice template deletion request error message; and the error message includes a cause or cause code for the slice template deletion error.

In the embodiment shown in FIG. 4g, an indication of deleting the NST and the NSST associated with the NST is used as an example to illustrate the process of deleting the template. In the process of deleting the template, deleting the NST or the NSST first is not limited. FIG. 4g shows an illustration of the NSST being deleted first by the NSSMF, the NSMF deleting the mapping relationship between the NST and the NSST later, then the NST being further deleted as an example. In addition, the NSMF may also delete the NST first. Afterwards, the NSSMF is instructed to delete the NSST. After the NST and the NSST are deleted, the NSMF deletes the mapping relationship between the NST and the NSST. Alternatively, the NSMF may delete the mapping relationship between the NST and the NSST first, then delete the NST, and further instruct the NSSMF to delete the NSST. Alternatively, the NSMF and the NSSMF may also perform the deletion operation in parallel. The NSMF finally deletes the mapping relationship between the NST and the NSST.

In an example embodiment, the template ID indicating the slice template to be deleted may be the NSST ID for instructing the deletion of the NSST. Then in the embodiment shown in FIG. 4g, after receiving the NSST ID, the NSMF can directly send the NSST ID to the selected NSSMF to enable the NSSMF to delete the corresponding NSST, for example, deleting NSSTA_1; the first deletion confirmation message is returned to the NSMF. After receiving the deletion confirmation message, the NSMF updates the mapping relationship between the NST and the NSST, which means that the ID of NSST A_1 corresponding to the NST in the mapping relationship is deleted. After deleting the mapping relationship corresponding to the deleted NSST, the NSMF returns a second deletion confirmation message to the CSMF, such that the CSMF returns a slice template deletion request confirmation message to the application server. Similarly, in the example embodiment, in the case that the application server is a third-party server, before deleting the NSST, whether the NSST to be deleted is a customized NSST may further be determined. If the NSST to be deleted is a customized NSST, an identifier of the customization manufacturer may be acquired. Whether the identifier of the application server and the identifier of the customization manufacturer match is determined. If the two match, the operation of deleting the customized NSST and the mapping relationship between the NST and the NSST is performed. If the two do not match, a modification error message is outputted.

In an example embodiment, the template ID indicating the slice template to be deleted may be the NST ID, used for indicating that the NST is to be deleted. For example, the NSSTs associated with the NST are all system defaulted NSSTs and/or NSSTs customized by other manufacturers. Then, in the embodiment shown in FIG. 4g, before deleting the NST, the NSSMF determines that the NSSTs are all system defaulted NSSTs and/or NSSTs customized by other manufacturers, which means that these NSSTs cannot be deleted. A notification message that the NSST cannot be deleted may be returned to the NSMF. After receiving the notification message returned by NSSMF that the NSST cannot be deleted, the NSMF may delete the mapping relationship between the NST and the NSST, delete the NST, and return a deletion confirmation message to the CSMF, such that the CSMF may return a slice template deletion request confirmation message to the application server.

Exemplary embodiment A8: the process of the application server 30 directly interfacing with the NSMF and requesting the service of deleting a slice template from the network slice management system 20 is shown in FIG. 4h, including the following steps.

41h. Two-way authentication between the application server and the network slice management system is completed using PSK and the like.

42h. The application server sends a slice template deleting request message to the NSMF in the network slice management system, wherein the request message comprises a template ID indicating the slice template to be deleted.

For example, the application server may also send to the slice management exposure function entity a slice template deleting request message, and the slice management exposure function entity sends the slice template deleting request message to the NSMF in the network slice management system.

The template ID indicating the slice template to be deleted may be the NST ID or the NSST ID, or may include both the NST ID and the NSST ID at the same time. In the case that the template ID is the NSST ID, the template ID may indicate that the NSST is to be deleted. In the case that the template ID includes both the NST ID and the NSST ID, or simply includes the NST ID, the template ID may indicate that the NST and the corresponding NSST are to be deleted simultaneously. In addition, in the case that the template ID includes only the NST ID, the template ID may only indicate that the NST is to be deleted. For example, in the case that all NSTs customized by a service manufacturer corresponding to the application server are associated with system defaulted NSSTs and/or NSSTs customized by other service manufacturers, the service manufacturer corresponding to application server does not have the permission to delete system defaulted NSSTs and/or NSSTs customized by other service manufacturers. In this case, only the NST customized by itself and the mapping relationship between the NST and the NSST may be deleted, falling into the scenario where only the NST may be deleted.

Further, in the case that the application server 30 is a third-party server, the slice template deletion request from the application server 30 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, the template ID indicating the slice template to be deleted may be a customized NST ID and/or a customized NSST ID.

In the embodiment, the NSST indicating to delete the NST and the NSST associated with the NST simultaneously is taken as the example to illustrate the deletion process. For example, the template ID indicating the slice template to be deleted may be the NST ID or may include both the NST ID and the NSST ID.

43h. The NSMF selects the NSSMF and sends an ID of the NSST to be deleted to the selected NSSMF to instruct the selected NSSMF to delete the corresponding NSST.

For example, the application server may need to delete the slice template in the designated area. In this case, the slice template deleting request message may also include the designated area information. Accordingly, the NSMF may select an NSSMF according to the designated area information in the request message.

For example, if the template ID indicating the slice template to be deleted contains the NSST ID, the contained NSST ID may be directly sent to the NSSMF as the ID of the NSST to be deleted. If the template ID indicating the slice template to be deleted only contains the NST ID, the maintained mapping relationship between the NST and the NSST may be queried according to the contained NST ID, so as to acquire the ID of the NSST to be deleted. The ID is then sent to the NSSMF.

44h. The NSSMF deletes the corresponding NSST according to the received ID of the NSST to be deleted, and returns a deletion confirmation message to the NSMF, as shown in step 45h.

In the embodiment, the network slice management system may provide a default NSST; and a service manufacturer corresponding to the application server may also customize the NST and the NSST. In the case that the NST is customized by a service manufacturer corresponding to the application server, the customized NST may be associated with the NSST customized by the service manufacturer, or may be associated with the system defaulted NSST. However, in the case that the application server 30 is a third-party server, the slice template deletion request from the application server 30 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, before the corresponding NSST is deleted, whether the NSST is a customized NSST or a system defaulted NSST may be determined. If the NSST is a customized NSST, an identifier of the customization manufacturer is acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST and the subsequent operation of deleting the mapping relationship between the NST and the NSST are performed. If the two do not match, the deletion error message is outputted. If the NSST is a system defaulted NSST, only the mapping relationship between the NSST and the NST needs to be deleted. The system defaulted NSST needs to be kept. Refer to the previous embodiments for the mapping between the identifier of the application server and the identifier of the customization manufacturer.

46h. After receiving the deletion confirmation message returned by the NSSMF, the NSMF deletes the mapping relationship between the NST and the NSST, deletes the NST, and returns a slice template deletion request confirmation message to the application server, as shown in step 47h.

It should be noted that the operation of determining whether the identifier of the application server and the identifier of the customization manufacturer match may be performed by the NSSMF in the process of deleting the NSST, or by the NSMF in the process of deleting the NST. Alternatively, the NSMF may also perform the determination first. That is, after receiving the slice template deletion request message and before deleting the NST and the NSST, the NSMF performs the determination; and the execution process is the same, which will not be described again herein. For example, in each embodiment, in the process of deleting the NSST, the NSSMF may determine whether a manufacturer identifier of the customized NSST matches with the ID of the application server. In the process of deleting the NST, the NSMF may determine whether a manufacturer identifier of the customized NST matches with the ID of the application server.

48h. After determining that the operation of deleting the slice template is completed, the NSMF sends a notification message indicating that the operation of deleting the slice template is completed to the application server.

For example, if the operation of deleting the slice template fails, the NSMF may send to the application server a slice template deletion request error message; and the error message includes a cause or cause code for the slice template deletion error.

In the embodiment shown in FIG. 4h, an indication of deleting the NST and the NSST associated with the NST is used as an example to illustrate the process of deleting the template. In the process of deleting the template, deleting the NST or the NSST first is not limited. FIG. 4h shows an illustration of the NSST being deleted first by the NSSMF, the NSMF deleting the mapping relationship between the NST and the NSST later, then the NST being further deleted as an example. In addition, the NSMF may also delete the NST first. Afterwards, the NSSMF is instructed to delete the NSST. After the NST and the NSST are deleted, the NSMF deletes the mapping relationship between the NST and the NSST. Alternatively, the NSMF may delete the mapping relationship between the NST and the NSST first, then delete the NST, and further instruct the NSSMF to delete the NSST. Alternatively, the NSMF and the NSSMF may also perform the deletion operation in parallel. The NSMF finally deletes the mapping relationship between the NST and the NSST.

In an example embodiment, the template ID indicating the slice template to be deleted may be the NSST ID for instructing the deletion of the NSST. Then in the embodiment shown in FIG. 4h, after receiving the slice template deleting request message, the NSMF can directly send the NSST ID to the selected NSSMF to enable the NSSMF to delete the corresponding NSST, for example, deleting NSST A_1; the deletion confirmation message is returned to the NSMF. After receiving the deletion confirmation message, the NSMF updates the mapping relationship between the NST and the NSST, which means that the ID of NSST A_1 corresponding to the NST in the mapping relationship is deleted. After deleting the mapping relationship corresponding to the deleted NSST, the NSMF returns a slice template deletion request confirmation message to the application server. Similarly, in the example embodiment, in the case that the application server is a third-party server, before deleting the NSST, whether the NSST to be deleted is a customized NSST may further be determined. If the NSST to be deleted is a customized NSST, an identifier of the customization manufacturer may be acquired. Whether the identifier of the application server and the identifier of the customization manufacturer match is determined. If the two match, the operation of deleting the customized NSST and the mapping relationship between the NST and the NSST is performed. If the two do not match, a modification error message is outputted.

In an example embodiment, the template ID indicating the slice template to be deleted may be the NST ID, used for indicating that the NST is to be deleted. For example, the NSSTs associated with the NST are all system defaulted NSSTs and/or NSSTs customized by other manufacturers. Then, in the embodiment shown in FIG. 4h, before deleting the NST, the NSSMF determines that the NSSTs are all system defaulted NSSTs and/or NSSTs customized by other manufacturers, which means that these NSSTs cannot be deleted. A notification message that the NSST cannot be deleted may be returned to the NSMF. After receiving the notification message returned by NSSMF that the NSST cannot be deleted, the NSMF may delete the mapping relationship between the NST and the NSST, delete the NST, and return a slice template deletion request confirmation message to the application server.

Exemplary embodiment A9: the process of the application server 30 directly interfacing with the NSSMF and requesting the service of deleting a slice template from the network slice management system 20 is shown in FIG. 4i, including the following steps.

41i. Two-way authentication between the application server and the network slice management system is completed using PSK and the like.

42i. The application server sends a slice template deleting request message to the NSMF in the network slice management system, wherein the request message comprises a template ID indicating the slice template to be deleted.

For example, the application server may also send to the slice management exposure function entity a slice template deleting request message, and the slice management exposure function entity sends the slice template deleting request message to the NSSMF in the network slice management system.

The template ID indicating the slice template to be deleted may be the NST ID or the NSST ID, or may include both the NST ID and the NSST ID at the same time. In the case that the template ID is the NSST ID, the template ID may indicate that the NSST is to be deleted. In the case that the template ID includes both the NST ID and the NSST ID, or simply includes the NST ID, the template ID may indicate that the NST and the corresponding NSST are to be deleted simultaneously. In addition, in the case that the template ID includes only the NST ID, the template ID may only indicate that the NST is to be deleted. For example, in the case that all NSTs customized by a service manufacturer corresponding to the application server are associated with system defaulted NSSTs and/or NSSTs customized by other service manufacturers, the service manufacturer corresponding to application server does not have the permission to delete system defaulted NSSTs and/or NSSTs customized by other service manufacturers. In this case, only the NST customized by itself and the mapping relationship between the NST and the NSST may be deleted, falling into the scenario where only the NST may be deleted.

Further, in the case that the application server 30 is a third-party server, the slice template deletion request from the application server 30 may only request to delete the NST and the NSST customized by the service manufacturer corresponding to the application server, but cannot delete the system defaulted NST nor the default NSST. In such case, NST and NSST customized by other service manufacturers cannot be deleted, either. In such case, the template ID indicating the slice template to be deleted may be a customized NST ID and/or a customized NSST ID.

In the embodiment, the NSST indicating to delete the NST and the NSST associated with the NST simultaneously is taken as the example to illustrate the deletion process. For example, the template ID indicating the slice template to be deleted may be the NST ID or may include both the NST ID and the NSST ID.

43i. The NSSMF deletes the corresponding NSST according to the template ID indicating the slice template to be deleted.

44i. The NSSMF reports an ID indicating the NST to be deleted to the corresponding NSMF.

45i. The NSMF deletes the corresponding NST and the mapping relationship between the NST and the NSST according to the ID indicating the NST to be deleted, and returns a deletion confirmation message to the NSSMF, as shown in step 46i.

For example, if the template ID indicating the slice template to be deleted contains the NSST ID, the NSSMF may directly delete the NSST corresponding to the ID, and send the NSST ID to the NSMF as the ID indicating the NST to be deleted, such that the NSMF may query the maintained mapping relationship between the NST and the NSST according to the ID and acquire the ID of the NST to be deleted. The NST corresponding to the ID and the mapping relationship between the NST and the NSST are deleted. If the template ID indicating the slice template to be deleted contains the NST ID, the NSSMF may report the NST ID to the NSMF as the ID indicating the NST to be deleted. The NSMF may query the maintained mapping relationship between the NST and the NSST to acquire the ID of the NSST to be deleted and returns the ID to the NSSMF. The NSSMF deletes the corresponding NSST accordingly. The NSMF deletes the corresponding NST and the mapping relationship between the NST and the NSST according to the ID of the NST reported by the NSSMF.

Further for example, the fact that the customized NST of a service manufacturer corresponding to the application server may be associated with the NSST customized by the manufacturer, may be associated with the system defaulted NSST, and may possibly be associated with NSSTs customized by other manufacturers needs to be considered. However, in the case that the application server 30 is a third-party server, the slice template deletion request from the application server 30 may only request to delete the NST and the NSST customized by the service manufacturer corresponding to the application server, but cannot delete the system defaulted NST nor the default NSST. In such case, NST and NSST customized by other service manufacturers cannot be deleted, either. In view of this, before deleting the corresponding NSST, the NSSMF may determine whether the NSST is a customized NSST or a system defaulted NSST. If the NSST is a customized NSST, an identifier of the customization manufacturer is acquired from the template ID indicating the slice template to be deleted; or the identifier of the corresponding customization manufacturer may be acquired according to the maintained corresponding relationship between the ID of the customized slice template and the identifier of the customization manufacturer. Further, whether the identifier of the application server and the identifier of the customization manufacturer match is determined. If the two match, the operation of deleting the NSST and the subsequent operation of deleting the mapping relationship between the NST and the NSST are performed. If the two do not match, the deletion error message is outputted. If the NSST is a system defaulted NSST, only the mapping relationship between the NSST and the NST needs to be deleted. The system defaulted NSST needs to be kept. Refer to the previous embodiments for the mapping between the identifier of the application server and the identifier of the customization manufacturer.

It should be noted that the operation of determining whether the identifier of the application server and the identifier of the customization manufacturer match may be performed by the NSSMF in the process of deleting the NSST, or by the NSMF in the process of deleting the NST. Alternatively, the two deletion processes are performed by the NSSMF or NSMF respectively. As the execution processes are the same, details will not be elaborated further herein.

47*i*. After receiving the deletion confirmation message returned by the NSMF, the NSSMF returns a slice template deletion request confirmation message to the application server.

48*i*. After determining that the operation of deleting the slice template is completed, the NSMF sends a notification message indicating that the operation of deleting the slice template is completed to the application server.

For example, if the operation of deleting the slice template fails, the NSSMF may send to the application server a slice template deletion request error message; and the error message includes a cause or cause code for the slice template deletion error.

In the embodiment shown in FIG. 4*i*, an indication of deleting the NST and the NSST associated with the NST is used as an example to illustrate the process of deleting the template. In the process of deleting the template, deleting the NST or the NSST first is not limited. FIG. 4*i* shows an illustration of the NSST being deleted first by the NSSMF, the NSMF deleting the mapping relationship between the NST and the NSST later, then the NST being further deleted as an example. In addition, the NSMF may also request the NSMF to delete the NST first. Afterwards, the NSSMF deletes the NSST. After the NST and the NSST are deleted, the NSMF deletes the mapping relationship between the NST and the NSST. Alternatively, the NSMF may first delete the mapping relationship between the NST and the NSST according to the request of the NSSMF, then delete the NST. Afterwards, the NSSMF deletes the NSST. Alternatively, the NSMF and the NSSMF may also perform the deletion operation in parallel. The NSMF finally deletes the mapping relationship between the NST and the NSST.

In an example embodiment, the template ID indicating the slice template to be deleted may be the NSST ID for instructing the deletion of the NSST. Then in the embodiment shown in FIG. 4*i*, after receiving the slice template deleting request message, the NSSMF may directly delete the corresponding NSST according to the NSST ID, for example, deleting NSST A_1. The NSST ID is then reported to the NSMF. After receiving the deletion confirmation message, the NSMF updates the mapping relationship between the NST and the NSST, which means that the ID of NSST A_1 corresponding to the NST in the mapping relationship is deleted. After deleting the mapping relationship corresponding to the deleted NSST, the NSMF returns a deletion confirmation message to the NSSMF, such that the NSSMF returns a slice template deletion request confirmation message to the application server.

In an example embodiment, the template ID indicating the slice template to be deleted may be the NST ID, used for indicating that the NST is to be deleted. For example, the NSSTs associated with the NST are all system defaulted NSSTs and/or NSSTs customized by other manufacturers. Then, in the embodiment shown in FIG. 4*i*, after receiving the slice template deletion request message and before performing the operation of deleting the NSST, the NSSMF determines that the NSSTs are all system defaulted NSSTs and/or NSSTs customized by other manufacturers, which means that these NSSTs cannot be deleted. The NSSMF, on the one hand, sends to the NSMF a notification message that the NSST cannot be deleted, and on the other hand, sends to the NSMF an ID indicating the NST to be deleted. After receiving the notification message sent by the NSSMF that the NSST cannot be deleted, the NSMF may delete the mapping relationship between the NST and the NSST and delete the NST according to the ID indicating the NST to be deleted, and return the deletion confirmation message to the NSSMF, such that the NSSMF may return the slice template deletion request confirmation message to the application server.

It is to be noted that in the embodiment above, the slice template customization request message, the slice template modifying request message, and the slice template deleting request message may be carried using an HTTP message or HTTPs message, and may also be carried by a message format customized by the network slice management system, which is not limited thereby. In addition, titles of the messages are only examples. All message titles that can implement corresponding functions are applicable in the embodiments of the present disclosure. For example, the messages may also be simply named as a first request message, a second request message, a third request message, and the like.

Figure 5A:
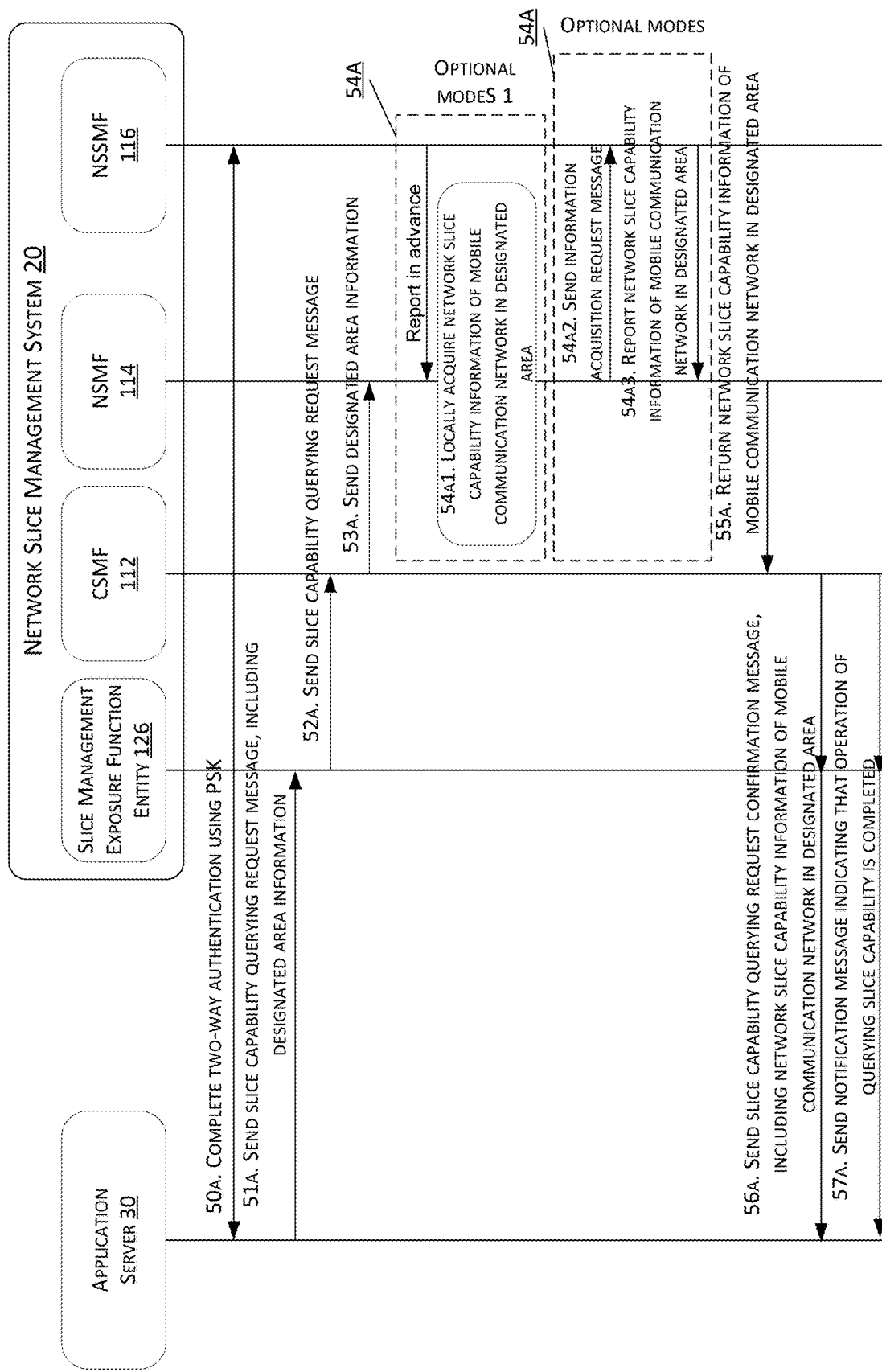
FIGS. 5a-5c show schematic flow diagrams of requesting a service of querying network slice capability information respectively through CSMF, NSMF, and NSSMF according to an embodiment of the present disclosure.
Figure 5B:
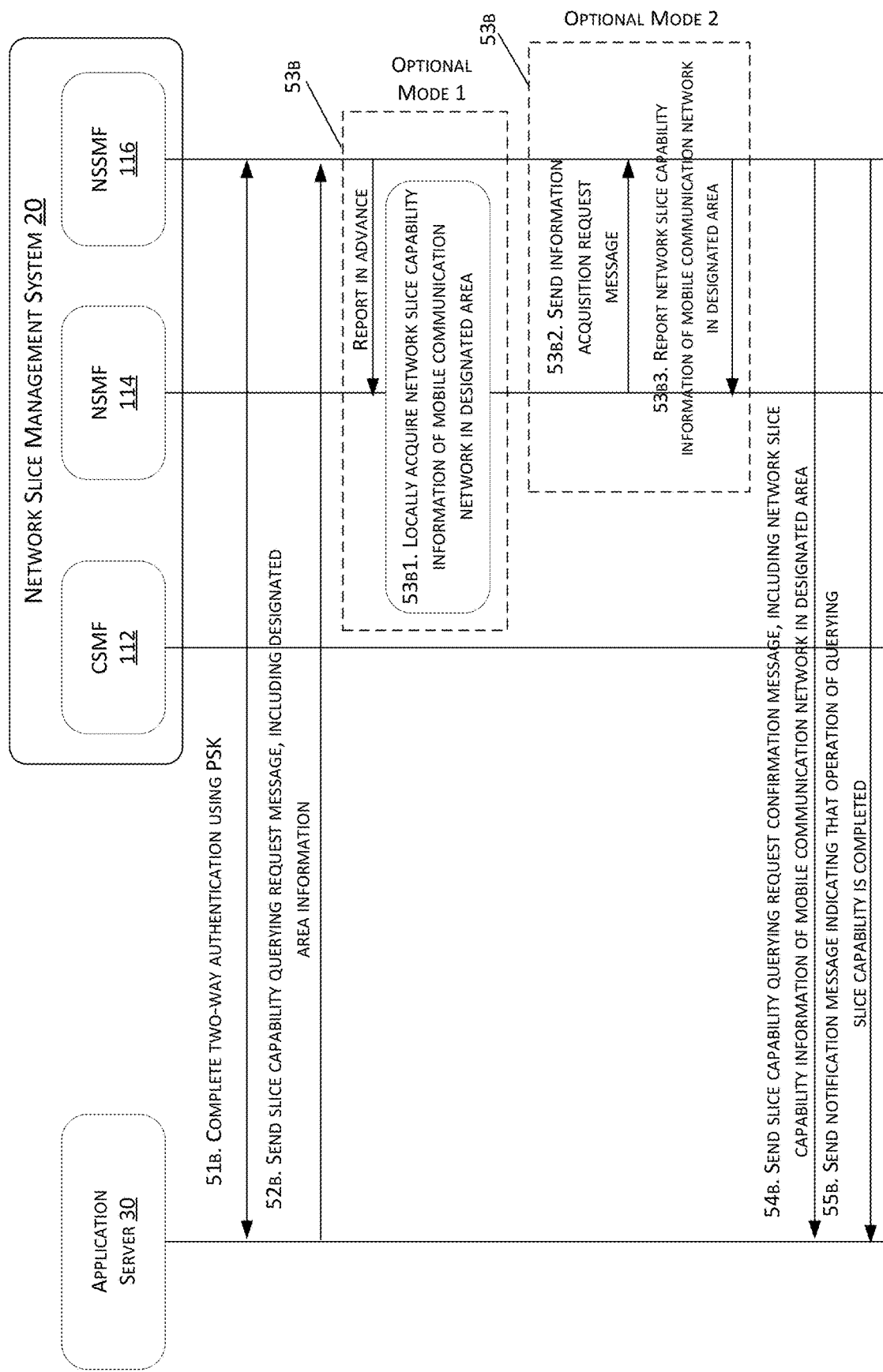
Figure 5C:
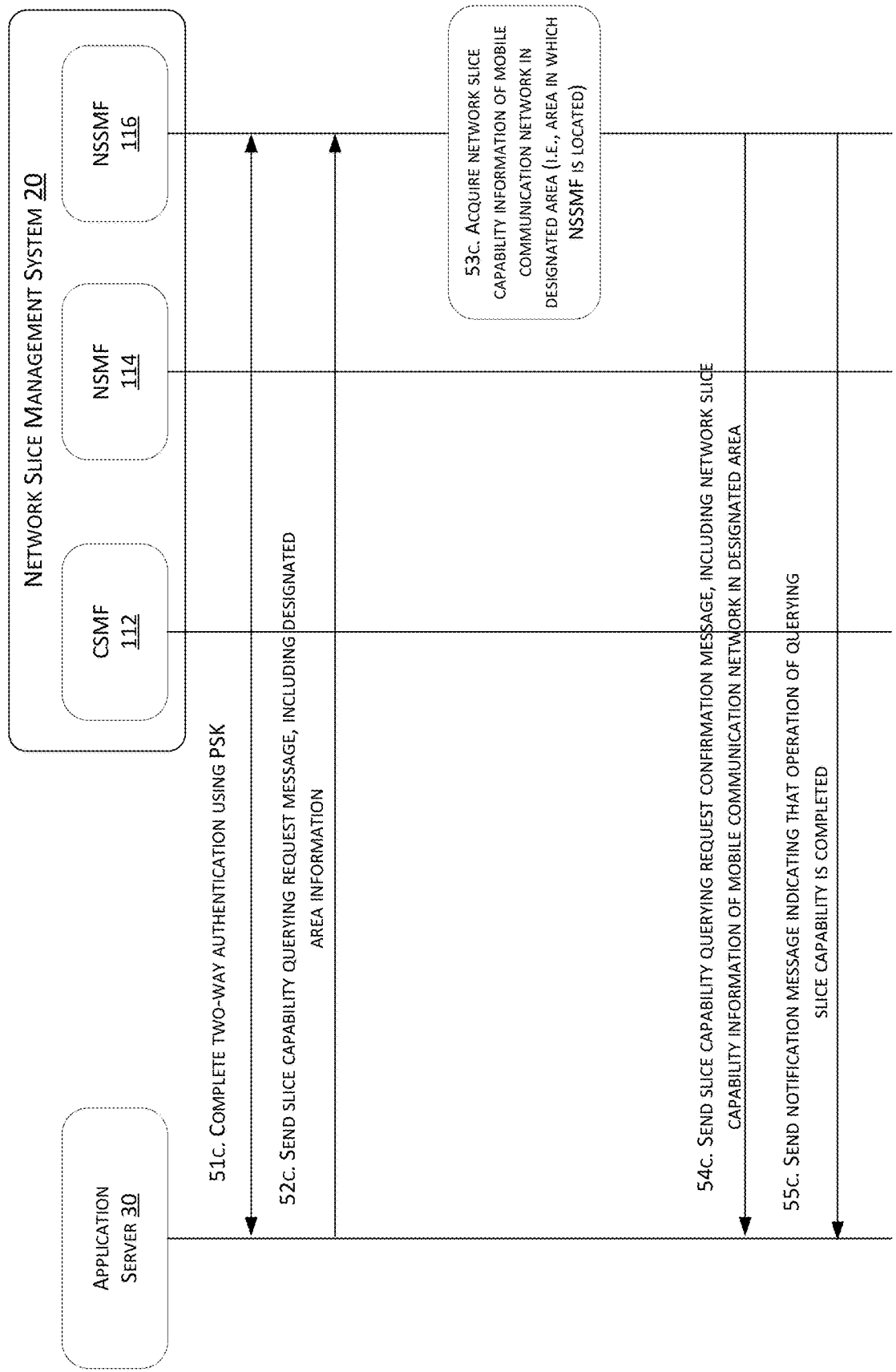

FIGS. 5a-5c show the process of requesting the service of querying network slice capability information:

Exemplary embodiment B1: the process of the application server 30 interfacing with the CSMF through the slice management exposure function entity and requesting the service of querying the network slice capability information from the network slice management system 20 is shown in FIG. 5a, including the following steps.

- 50a. Two-way authentication between the application server and the network slice management system is completed using PSK and the like.
- 51a. The application server sends a slice capability querying request message to the slice management exposure function entity to request the slice management exposure function entity to send the request message to the CSMF in the network slice management system.
- 52a. The slice management exposure function entity sends the slice capability querying request message from the application server to the CSMF in the network slice management system, wherein the request message comprises designated area information.
- 53a. After receiving the slice capability querying request message, the CSMF sends the designated area information to the NSMF.

For example, the CSMF may select an NSMF covering the area information according to the designated area information, and send the area information to the selected NSMF.

- 54a. The NSMF cooperates with the NSSMF corresponding to the designated area information, so as to acquire the network slice capability information of the mobile communication network in the designated area.

In an example embodiment, as shown in step 54a1, the NSSMF in each area may report to the NSMF in real time the network slice capability information of the mobile communication network in the area of the NSSMF. The NSMF locally maintains the network slice capability information of the mobile communication network in areas covered by the NSMF. On such basis, after receiving the designated area information sent by the CSMF, the NSMF may directly acquire the network slice capability information of the mobile communication network in the designated area locally. The designated area information points to the designated area.

In another example embodiment, the NSSMF in each area does not report to the NSMF in real time the network slice capability information of the mobile communication network in the area of the NSSMF. Instead, the NSMF acquires in real time, from the NSSMF, the network slice capability information of the mobile communication network in the area of the NSSMF according to demands. On such basis, as shown in steps 54a2 and 54a3, after receiving the designated area information sent by the CSMF, the NSMF may select the NSSMF according to the area information, and send an information acquisition request message to the selected NSSMF to request the NSSMF to report the network slice capability information of the mobile communication network in the designated area. The NSMF then receives the network slice capability information of the mobile communication network in the designated area reported by the NSSMF.

- 55a. The NSMF sends the network slice capability information of the mobile communication network in the designated area to the CSMF.
- 56a. After receiving the network slice capability information of the mobile communication network in the designated area returned by the NSMF, the CSMF returns a slice capability querying request confirmation message to the application server through the slice management exposure function entity, wherein the confirmation message contains the network slice capability information of the mobile communication network in the designated area.
- 57a. After determining that the operation of querying the slice capability is completed, the CSMF sends a notification message indicating that the operation of querying the slice capability is completed to the application server through the slice management exposure function entity.

For example, if the operation of querying the slice capability fails, the CSMF may send to the application server a slice capability querying request error message; and the error message includes a cause or cause code for the slice capability querying error.

Exemplary embodiment B2: the process of the application server 30 directly interfacing with the NSMF and requesting the service of querying the network slice capability information from the network slice management system 20 is shown in FIG. 5b, including the following steps.

- 51b. Two-way authentication between the application server and the network slice management system is completed using PSK and the like.
- 52b. The application server sends a slice capability querying request message to the NSMF in the network slice management system, wherein the request message comprises designated area information.

For example, the application server may also send to the slice management exposure function entity the slice capability querying request message, and the slice management exposure function entity sends the slice capability querying request message to the NSMF in the network slice management system.

- 53b. The NSMF cooperates with the NSSMF corresponding to the designated area information, so as to acquire the network slice capability information of the mobile communication network in the designated area.

In an example embodiment, as shown in step 53b1, the NSSMF in each area may report to the NSMF in real time the network slice capability information of the mobile communication network in the area of the NSSMF. The NSMF locally maintains the network slice capability information of the mobile communication network in areas covered by the NSMF. On such basis, after receiving the designated area information sent by the CSMF, the NSMF may directly acquire the network slice capability information of the mobile communication network in the designated area locally. The designated area information points to the designated area.

In another example embodiment, the NSSMF in each area does not report to the NSMF in real time the network slice capability information of the mobile communication network in the area of the NSSMF. Instead, the NSMF acquires in real time, from the NSSMF, the network slice capability information of the mobile communication network in the area of the NSSMF according to demands. On such basis, as shown in steps 53b2 and 53b3, after receiving the designated area information sent by the CSMF, the NSMF may select the NSSMF according to the area information, and send an information acquisition request message to the selected NSSMF to request the NSSMF to report the network slice capability information of the mobile communication network in the designated area. The NSMF then receives the network slice capability information of the mobile communication network in the designated area reported by the NSSMF.

54b. The NSMF returns a slice capability querying request confirmation message to the application server, wherein the confirmation message contains the network slice capability information of the mobile communication network in the designated area.

55b. After determining that the operation of querying the slice capability is completed, the NSMF sends a notification message indicating that the operation of querying the slice capability is completed to the application server.

For example, if the operation of querying the slice capability fails, the NSMF may send to the application server a slice capability querying request error message; and the error message includes a cause or cause code for the slice capability querying error.

Exemplary embodiment B3: the process of the application server 30 directly interfacing with the NSSMF and requesting the service of querying the network slice capability information from the network slice management system 20 is shown in FIG. 5c, including the following steps.

51c. Two-way authentication between the application server and the network slice management system is completed using PSK and the like.

52c. The application server sends a slice capability querying request message to the NSMF in the network slice management system, wherein the request message comprises designated area information.

For example, the application server may also send to the slice management exposure function entity the slice capability querying request message, and the slice management exposure function entity sends the slice capability querying request message to the NSSMF in the network slice management system.

53c. The NSSMF acquires the network slice capability information of the mobile communication network in the designated area according to the designated area information.

54c. The NSMF returns a slice capability querying request confirmation message to the application server, wherein the confirmation message contains the network slice capability information of the mobile communication network in the designated area.

55c. After determining that the operation of querying the slice capability is completed, the NSMF sends a notification message indicating that the operation of querying the slice capability is completed to the application server.

For example, if the operation of querying the slice capability fails, the NSSMF may send to the application server a slice capability querying request error message; and the error message includes a cause or cause code for the slice capability querying error.

Figure 5D:
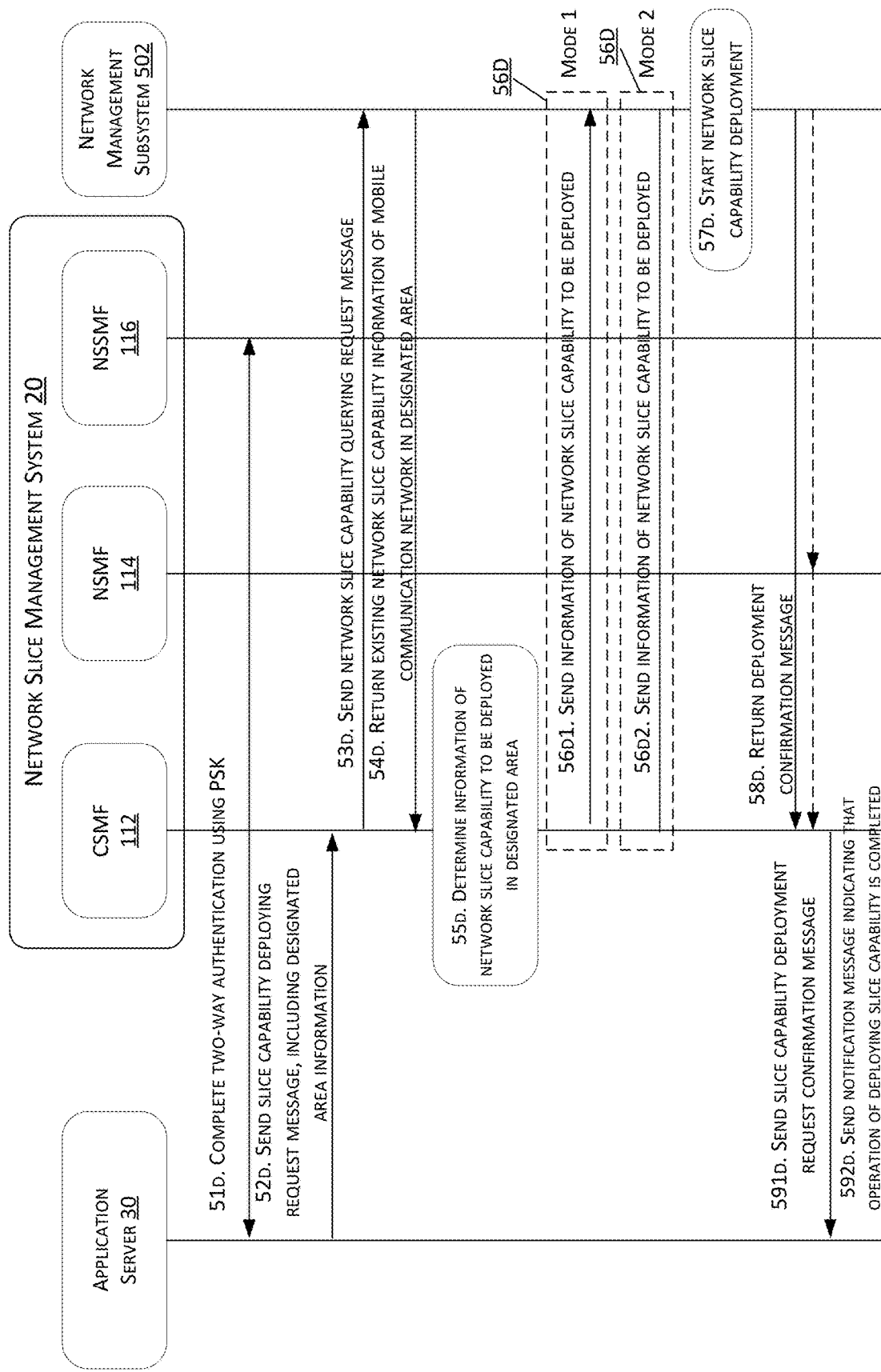
FIGS. 5d-5f show schematic flow diagrams of requesting a service of deploying network slice capability respectively through CSMF, NSMF, and NSSMF according to an embodiment of the present disclosure.
Figure 5E:
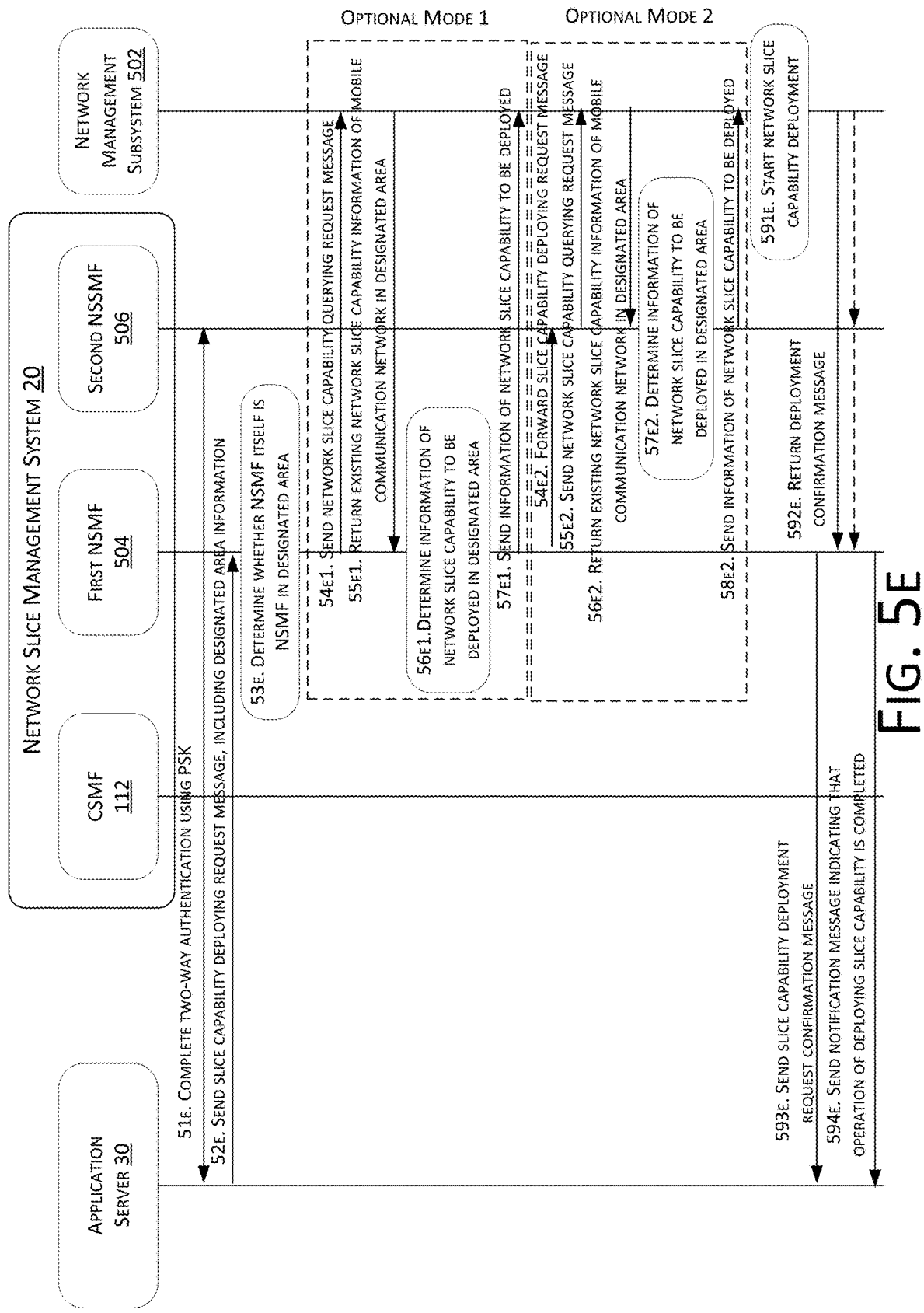
Figure 5F:
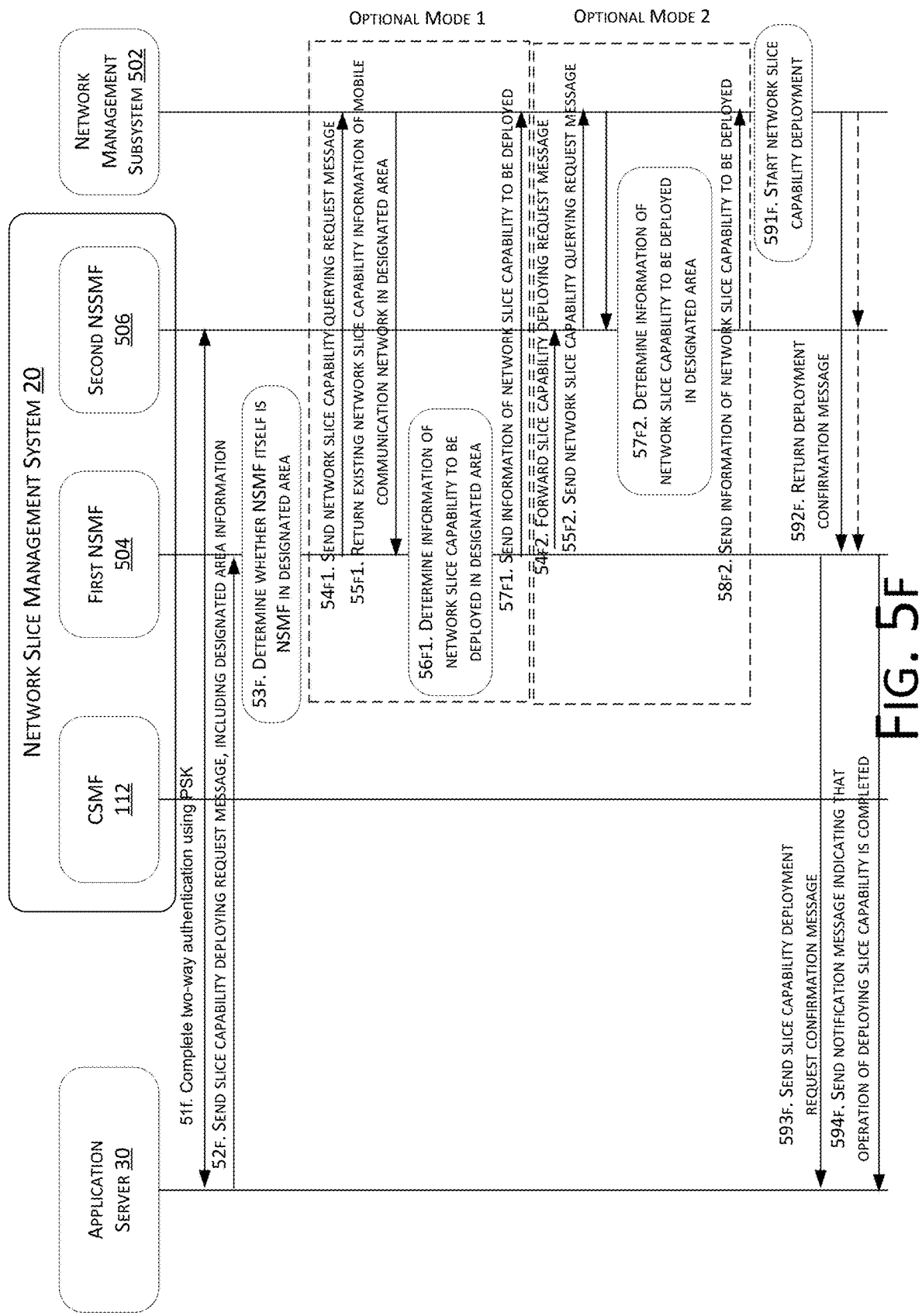

FIGS. 5d-5f show the process of requesting a service of deploying a network slice capability:

Exemplary embodiment B4: the process of the application server 30 directly interfacing with the CSMF and requesting, from the network slice management system 20, the service of deploying the network slice capability therefor is shown in FIG. 5d, including the following steps.

51d. Two-way authentication between the application server and the network slice management system is completed using PSK and the like.

52d. The application server sends a slice capability deploying request message to the CSMF in the network slice management system, wherein the request message comprises designed area information.

For example, the application server may also send to the slice management exposure function entity the slice capability deploying request message, and the slice management exposure function entity sends the slice capability deploying request message to the CSMF in the network slice management system.

53d. After receiving the slice capability deploying request message, the CSMF sends a network slice capability querying request message to a corresponding network management subsystem 502 according to the designated area information, such as the secondary network slice management system 138, so as to query existing network slice capability information of the mobile communication network in the designated area.

The designated area information points to the designated area. The network management subsystem 502 is a network management system of the designated area, which may manage various information of a mobile communication network in the designated area.

54d. The CSMF receives the existing network slice capability information of the mobile communication network in the designated area returned by the network management subsystem 502.

55d. The CSMF determines information of the network slice capability to be deployed in the designated area according to the existing network slice capability information of the mobile communication network in the designated area.

It is to be noted that the CSMF may use the method described in steps 53d and 54d, i.e., querying the existing network slice capability information of the mobile communication network, to determine the network slice capability information to be deployed in the designated area, which is not limited thereto. The network slice capability information to be deployed in the designated area may also be determined using other methods.

56d. The CSMF sends the information of the network slice capability to be deployed to the network management subsystem 502, such that the network management subsystem 502 deploys the network slice capability to be deployed in the designated area accordingly.

The CSMF may query the network management subsystem 502 whether the NSMF and the NSSMF of corresponding levels exist in the designated area, and may also query whether the NSSF exists in the core network of the designated area.

Scenario 1: if the NSMF and the NSSMF are not present in the designated area, and the NSSF is not present in the core network of the designated area, the NSMF and the NSSMF of corresponding levels need to be deployed in the designated area. The NSSF needs to be deployed in the core network of the designated area. The NSMF, the NSSMF, and the NSSF are the network slice capability information to be deployed. In such case, as shown in step 56d1, the CSMF directly sends the network slice capability information to be deployed to the network management subsystem 502.

Scenario 2: if the NSMF, but not the NSSMF, is present in the designated area, and the NSSF is not present in the core network of the designated area, the NSSMF of a corresponding level need to be deployed in the designated area. The NSSF needs to be deployed in the core network of the designated area. In this case, the NSSMF and the NSSF are the network slice capability information to be deployed.

Scenario 3: if the NSMF, but not the NSSMF, is present in the designated area, and the NSSF is present in the core network of the designated area, the NSSMF of a corresponding level needs to be deployed in the designated area. In this case, the NSSMF is the network slice capability information to be deployed.

For scenarios 2 and 3, as shown in step 56*d*2, the CSMF may send the network slice capability information to be deployed to the network management subsystem 502 through the NSMF.

For example, the CSMF may select an NSMF covering the area information according to the designated area information in the request message, and send the designated area information to the selected NSMF.

- 57*d*. After receiving the information of the network slice capability to be deployed, the network management subsystem 502 starts network slice capability deployment.
- 58*d*. The network management subsystem 502 returns a deployment confirmation message to the CSMF directly or to the CSMF through the NSMF.
- 591*d*. After receiving the deployment confirmation message, the CSMF returns a slice capability deployment request confirmation message to the application server through the slice management exposure function entity.
- 592*d*. After determining that the operation of deploying the slice capability is completed, the CSMF sends a notification message indicating that the operation of deploying the slice capability is completed to the application server through the slice management exposure function entity.

For example, if the operation of deploying the slice capability fails, the CSMF may send to the application server a slice capability deploying request error message; and the error message includes a cause or cause code for the slice capability deployment error.

Exemplary embodiment B5: the process of the application server 30 directly interfacing with the NSMF and requesting, from the network slice management system 20, the service of deploying the network slice capability therefor is shown in FIG. 5*e*, including the following steps.

- 51*e*. Two-way authentication between the application server and the network slice management system is completed using PSK and the like.
- 52*e*. The application server sends a slice capability deploying request message to a first NSMF 504 in the network slice management system, wherein the request message comprises designed area information. The designated area information points to the designated area.

For example, the application server may also send to the slice management exposure function entity the slice capability deploying request message, and the slice management exposure function entity sends the slice capability deploying request message to the first NSMF 504 in the network slice management system.

- 53*e*. After receiving the slice capability deploying request message, the first NSMF 504 determines whether it is an NSMF in the designated area; if so, steps 54*e*1-57*e*1 are executed; if not, and the first NSMF 504 is an NSMF of a previous or next level, steps 54*e*2-58*e*2 are executed.
- 54*e*1. The first NSMF 504 sends a network slice capability querying request message to a network management subsystem 502 to query existing network slice capability information of the mobile communication network in the designated area.
- 55*e*1. The first NSMF 504 receives the existing network slice capability information of the mobile communication network in the designated area returned by the network management subsystem 502.
- 56*e*1. The first NSMF 504 determines information of the network slice capability to be deployed in the designated area according to the existing network slice capability information of the mobile communication network in the designated area.
- 57*e*1. The first NSMF 504 sends the information of the network slice capability to be deployed to the network management subsystem 502, such that the network management subsystem 502 deploys the network slice capability to be deployed accordingly.
- 54*e*2. The first NSMF 504 forwards the slice capability deploying request message to a second NSMF in the designated area to enable the second NSMF to cooperate with a corresponding network management subsystem 502 to complete the deployment of the network slice capability in the designated area.
- 55*e*2. The second NSMF sends the network slice capability querying request message to the network management subsystem 502 according to the slice capability deploying request message, so as to query existing network slice capability information of the mobile communication network in the designated area.
- 56*e*2. The second NSMF receives the existing network slice capability information of the mobile communication network in the designated area returned by the network management subsystem 502.
- 57*e*2. The second NSMF determines the information of the network slice capability to be deployed in the designated area according to the existing network slice capability information of the mobile communication network in the designated area.
- 58*e*2. The second NSMF sends the information of the network slice capability to be deployed to the network management subsystem 502, such that the network management subsystem 502 deploys the network slice capability to be deployed accordingly.

In the process above, it is indicated that the NSMF is included in the existing network slice capability in the designated area; and the network slice capability to be deployed may include the NSSMF and/or the NSSF.

It is to be noted that the first NSMF 504 or the second NSMF may query the existing network slice capability information of the mobile communication network to determine the network slice capability information to be deployed in the designated area, which is not limited thereto. The network slice capability information to be deployed in the designated area may also be determined using other methods.

- 591*e*. After receiving the information of the network slice capability to be deployed, the network management subsystem 502 starts network slice capability deployment.
- 592*e*. The network management subsystem 502 returns a deployment confirmation message to the first NSMF 504 directly or to the first NSMF 504 through the second NSMF.
- 593*e*. After receiving the deployment confirmation message, the first NSMF 504 returns a slice capability deployment request confirmation message to the application server.
- 594*e*. After determining that the operation of deploying the slice capability is completed, the first NSMF 504 sends a notification message indicating that the operation of deploying the slice capability is completed to the application server.

For example, if the operation of deploying the slice capability fails, the first NSMF 504 may send to the application server a slice capability deploying request error message; and the error message includes a cause or cause code for the slice capability deployment error.

Exemplary embodiment B6: the process of the application server 30 directly interfacing with the NSSMF and requesting, from the network slice management system 20, the service of deploying the network slice capability therefor is shown in FIG. 5*f*, including the following steps.

51*f*. Two-way authentication between the application server and the network slice management system is completed using PSK and the like.

52*f*. The application server sends a slice capability deploying request message to a first NSSMF in the network slice management system, wherein the request message comprises designed area information.

For example, the application server may also send to the slice management exposure function entity the slice capability deploying request message, and the slice management exposure function entity sends the slice capability deploying request message to the first NSSMF in the network slice management system.

53*f*. After receiving the slice capability deploying request message, the first NSSMF determines whether it is an NSSMF in the designated area; if so, steps 54/1-57/1 are executed; and if not, steps 54/2-58/2 are executed.

54/1. The first NSSMF sends a network slice capability querying request message to a network management subsystem 502 in the designated area to query existing network slice capability information of the mobile communication network in the designated area.

55/1. The first NSMF 504 receives the existing network slice capability information of the mobile communication network in the designated area returned by the network management subsystem 502.

56/1. The first NSSMF determines information of the network slice capability to be deployed in the designated area according to the existing network slice capability information of the mobile communication network in the designated area.

57/1. The first NSSMF sends the information of the network slice capability to be deployed to the network management subsystem 502, such that the network management subsystem 502 deploys the network slice capability to be deployed accordingly.

54/2. The first NSSMF forwards a slice capability deploying request message to the second NSSMF 506 in the designated area through the corresponding first NSMF 504 and second NSMF.

The first NSMF 504 is the NSMF corresponding to the first NSSMF, and the second NSMF is the NSMF corresponding to the second NSSMF 506.

55/2. The second NSSMF 506 sends the network slice capability querying request message to the network management subsystem 502 to query the existing network slice capability information of the mobile communication network in the designated area.

56/2. The second NSSMF 506 receives the existing network slice capability information of the mobile communication network in the designated area returned by the network management subsystem 502.

57/2. The second NSSMF 506 determines the information of the network slice capability to be deployed in the designated area according to the existing network slice capability information of the mobile communication network in the designated area.

58/2. The second NSSMF 506 sends the information of the network slice capability to be deployed to the network management subsystem 502, such that the network management subsystem 502 deploys the network slice capability to be deployed accordingly.

It is to be noted that the first NSSMF or the second NSSMF 506 may query the existing network slice capability information of the mobile communication network to determine the network slice capability information to be deployed in the designated area, which is not limited thereto. The network slice capability information to be deployed in the designated area may also be determined using other methods.

591*f*. After receiving the information of the network slice capability to be deployed, the network management subsystem 502 starts network slice capability deployment.

592*f*. The network management subsystem 502 returns a deployment confirmation message to the first NSSMF directly or to the first NSSMF through the second NSSMF 506.

593*f*. After receiving the deployment confirmation message, the first NSSMF returns a slice capability deployment request confirmation message to the application server.

594*f*. After determining that the operation of deploying the slice capability is completed, the first NSSMF sends a notification message indicating that the operation of deploying the slice capability is completed to the application server.

For example, if the operation of deploying the slice capability fails, the first NSSMF may send to the application server a slice capability deploying request error message; and the error message includes a cause or cause code for the slice capability deployment error.

Figure 5G:
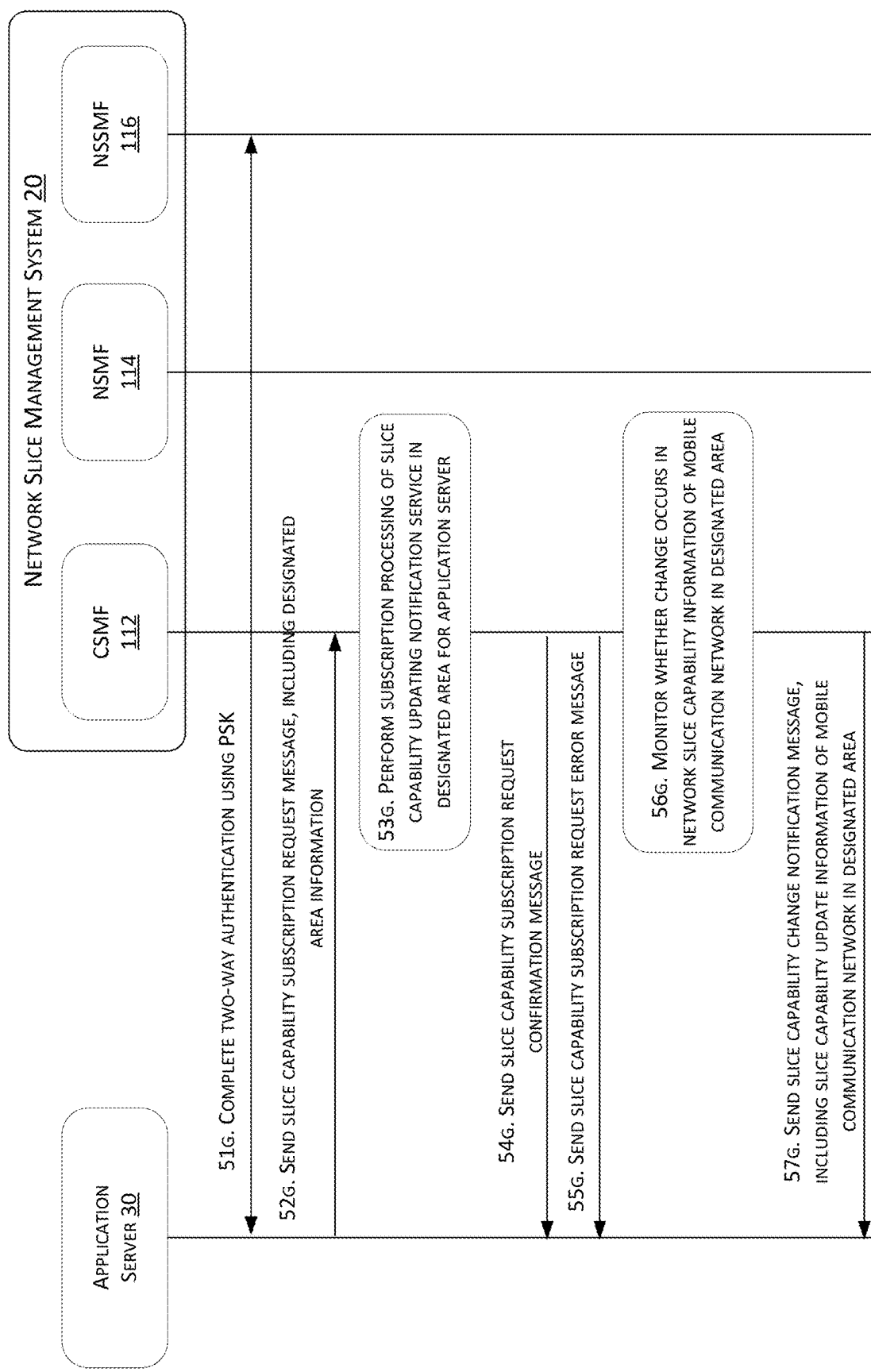
FIGS. 5g-5i show schematic flow diagrams of requesting to subscribe a network slice capability information updating notification service respectively through CSMF, NSMF, and NSSMF according to an embodiment of the present disclosure.
Figure 5H:
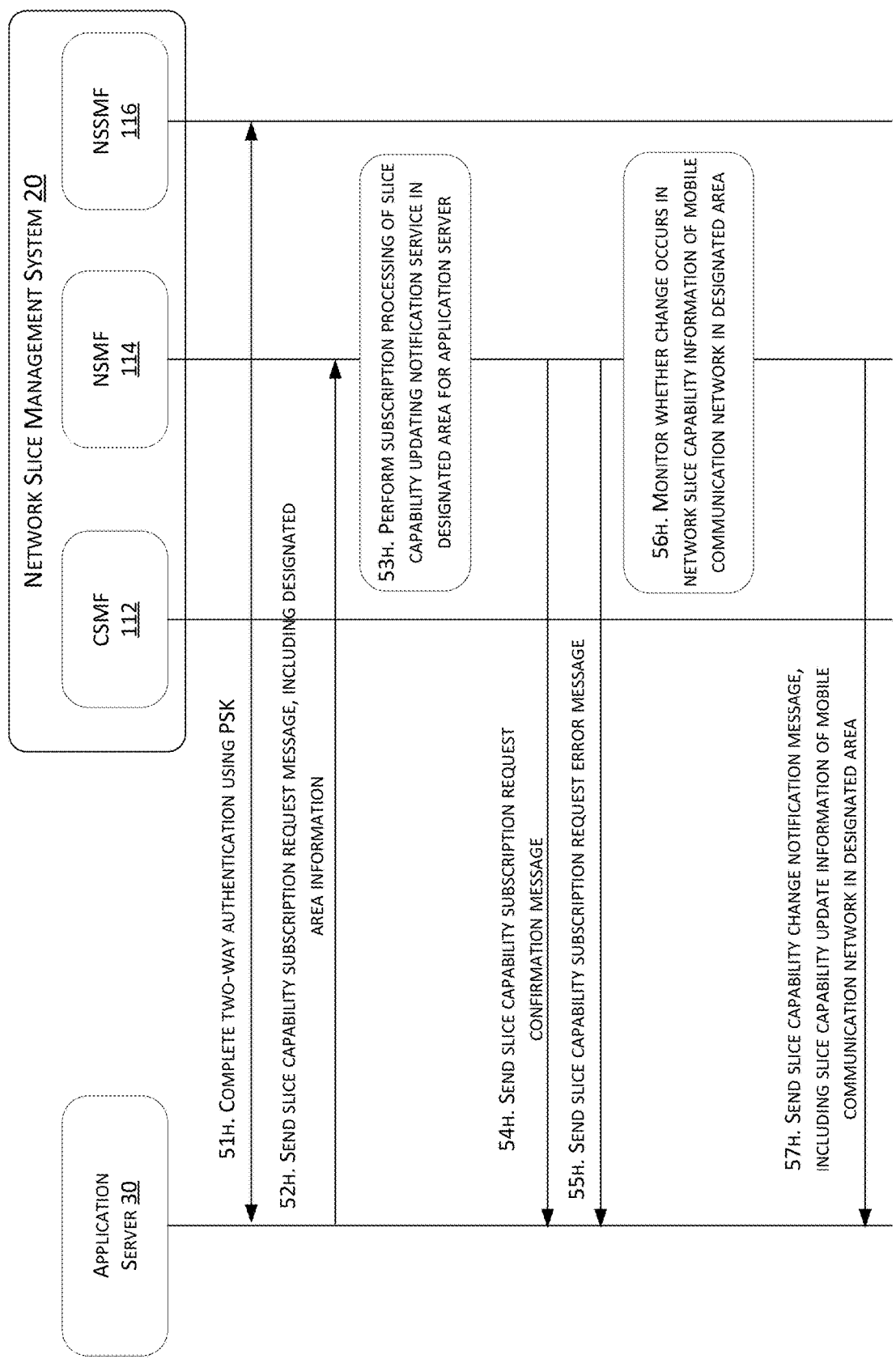
Figure 5I:
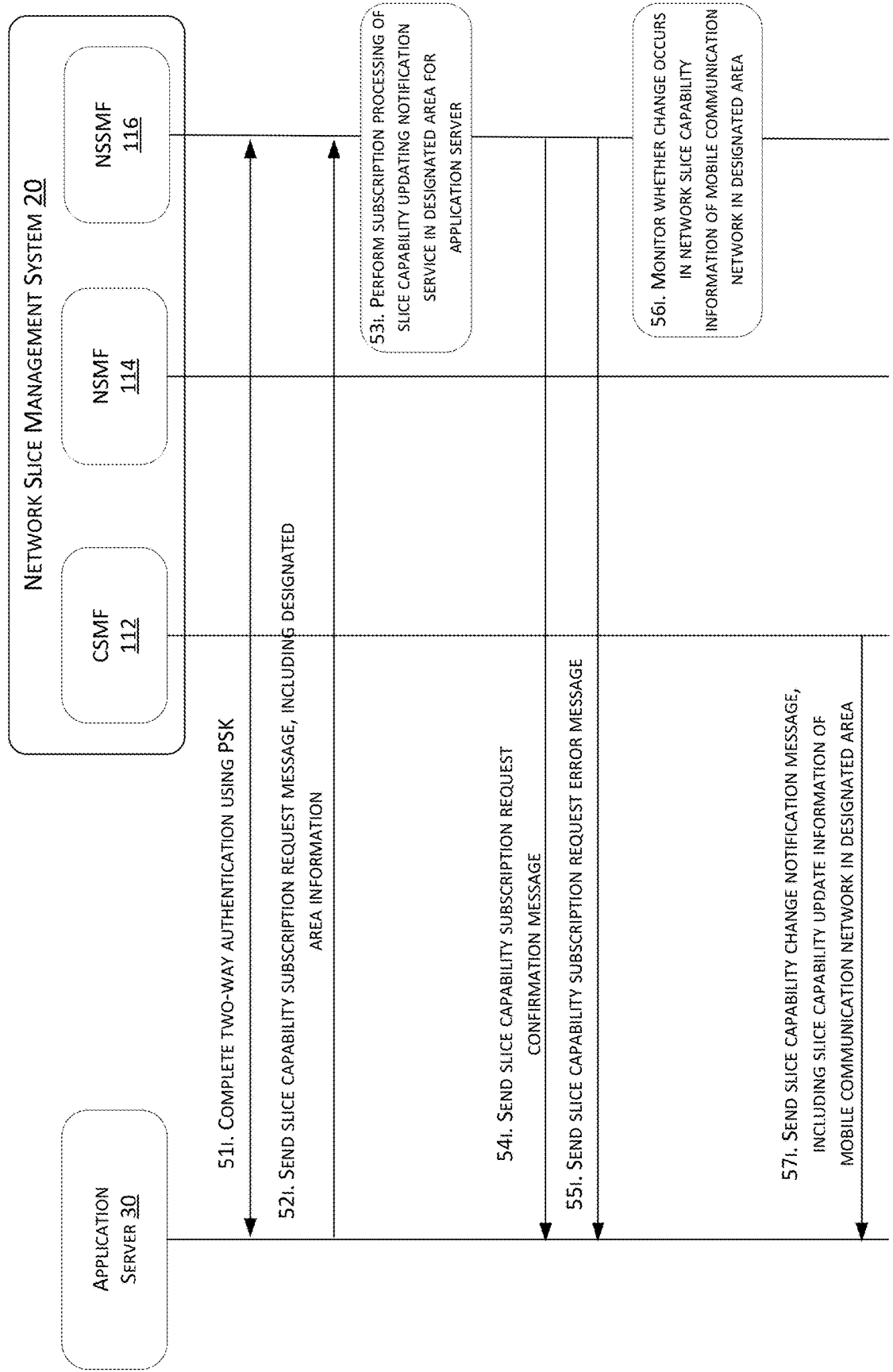

FIGS. 5*g*-5*i* show the process of subscribing a network slice capability information updating notification service:

Exemplary embodiment B7: the process of the application server 30 directly interfacing with the CSMF and requesting subscribing the network slice capability information updating notification service from the network slice management system 20 is shown in FIG. 5*g*, including the following steps.

51*g*. Two-way authentication between the application server and the network slice management system is completed using PSK and the like.

52*g*. The application server sends a slice capability subscription request message to the CSMF in the network slice management system, wherein the request message comprises designed area information. The designated area information points to the designated area.

For example, the application server may also send to the slice management exposure function entity the slice capability subscription request message, and the slice management exposure function entity sends the slice capability subscribing request message to the CSMF in the network slice management system.

53*g*. After receiving the slice capability subscription request message, the CSMF performs subscription processing of the slice capability updating notification service in the designated area for the application server.

54*g*. If the subscription processing of the slice capability updating notification service is successful, the CSMF sends a slice capability subscription request confirmation message to the application server.

55*g*. If the subscription processing of the slice capability updating notification service fails, the CSMF sends a slice capability subscription request error message to the application server; and the error message comprises a cause or cause code for the slice capability subscription error.

56g. In the case that the subscription processing of the slice capability updating notification service is successful, the CSMF cooperates with the NSMF and NSSMF corresponding to the designated area to monitor whether a change occurs in the network slice capability information of the mobile communication network in the designated area.

57g. In the case that it is monitored that a change occurs in the network slice capability information, the CSMF sends a slice capability change notification message to the application server through the slice management exposure function entity, wherein the notification message comprises slice capability updating information of the mobile communication network in the designated area.

Exemplary embodiment B8: the process of the application server 30 directly interfacing with the NSMF and requesting subscribing the network slice capability information updating notification service from the network slice management system 20 is shown in FIG. 5h, including the following steps.

51h. Two-way authentication between the application server and the network slice management system is completed using PSK and the like.

52h. The application server sends a slice capability subscription request message to the NSMF in the network slice management system, wherein the request message comprises designed area information. The designated area information points to the designated area.

For example, the application server may also send to the slice management exposure function entity the slice capability subscription request message, and the slice management exposure function entity sends the slice capability subscribing request message to the NSMF in the network slice management system.

53h. After receiving the slice capability subscription request message, the NSMF performs subscription processing of the slice capability updating notification service for the application server.

54h. If the subscription processing of the slice capability updating notification service is successful, the NSMF sends a slice capability subscription request confirmation message to the application server.

55h. If the subscription processing of the slice capability updating notification service fails, the NSMF sends a slice capability subscription request error message to the application server; and the error message comprises a cause or cause code for the slice capability subscription error.

56h. In the case that the subscription processing of the slice capability updating notification service is successful, the NSMF cooperates with the NSSMF corresponding to the designated area to monitor whether a change occurs in the network slice capability information of the mobile communication network in the designated area.

57h. In the case that it is monitored that a change occurs in the network slice capability information, the NSMF sends a slice capability change notification message to the application server, wherein the notification message comprises the slice capability updating information of the mobile communication network in the designated area.

Exemplary embodiment B9: the process of the application server 30 directly interfacing with the NSSMF and requesting subscribing the network slice capability information updating notification service from the network slice management system 20 is shown in FIG. 5i, including the following steps.

Mi. Two-way authentication between the application server and the network slice management system is completed using PSK and the like.

52i. The application server sends a slice capability subscription request message to the NSSMF in the network slice management system, wherein the request message comprises designed area information. The designated area information points to an area where the NSSMF is located.

For example, the application server may also send to the slice management exposure function entity the slice capability subscription request message, and the slice management exposure function entity sends the slice capability subscribing request message to the NSSMF in the network slice management system.

53i. After receiving the slice capability subscription request message, the NSSMF performs subscription processing of the slice capability updating notification service for the application server.

54i. If the subscription processing of the slice capability updating notification service is successful, the NSSMF sends a slice capability subscription request confirmation message to the application server.

55i. If the subscription processing of the slice capability updating notification service fails, the NSSMF sends a slice capability subscription request error message to the application server; and the error message comprises a cause or cause code for the slice capability subscription error.

56i. In the case that the subscription processing of the slice capability updating notification service is successful, the NSSMF monitors whether a change occurs in the network slice capability information of the mobile communication network in the designated area.

57i. In the case that it is monitored that a change occurs in the network slice capability information, the NSSMF sends a slice capability change notification message to the application server, wherein the notification message comprises the slice capability updating information of the mobile communication network in the designated area.

It is to be noted that in the embodiment above, the slice capability querying request message, the slice capability deploying request message, and the slice capability subscription request message may be carried using an HTTP message or HTTPs message, and may also be carried by a message format customized by the network slice management system, which is not limited thereby. In addition, titles of the messages are only examples. All message titles that can implement corresponding functions are applicable in the embodiments of the present disclosure. For example, the messages may also be simply named as a fourth request message, a fifth request message, a sixth request message, and the like.

In the above embodiments, the processes of performing capability exposure on the network slice management system 20 and exposing the network slice management capability to the third-party application server are mainly introduced, so that the third-party application server can acquire the network slice management services comprising the network slice template service and the network slice capability service. In the process of exposing the network slice management capability, the third-party application server 30 can be used as a network slice management service user, that is, a party that needs to use the network slice management capability service provided by the operator network; accordingly, the network entity in the network slice management system 20, such as a CSMF or an NSMF or an NSSMF, can be used as a network slice management service provider, that is, a party that can provide network slice management services.

Further, in some example embodiments of the present disclosure, in order to expose the network slice management capability to the network slice management service user more reasonably, the network slice management service provider may configure the permission access policy for the network slice management service user, so as to limit the permission of the network slice management capability services that the network slice management service user can use.

For example, when a network slice management service user signs with an operator offline, an exposure permission for the network slice management capability that the network slice management service user can expose can be agreed through offline negotiation and written in the signing information. Based on this, the network slice management service provider can generate the permission access policy for the network slice management service user according to the signing information between the network slice management service provider and the network slice management service user, and configure the permission access policy to exposure governance management function (EGMF) network elements in the 3GPP network slice management system, and the EMGF network elements are responsible for providing the management capability of the network slice management system to external users of the operator. For example, the permission access policy can be configured on different management function network elements, such as a CSMF, an NSMF, or an NSSMF.

For another example, the network slice management service user selects the network slice management capability exposure permission that needs to be obtained through an exposure capability permission interface provided by the operator, for example, the permission can be selected by checking, clicking, etc.; the operator determines the network slice management capability exposure permission selected by the network slice management service user according to the selecting operation of the network slice management service user, generates the permission access policy corresponding to the network slice management service user accordingly, and configures the permission access policy to the network slice management service provider. Among them, the network slice management service provider can be an EMGF, a CSMF, an NSMF, or an NSSMF in the network slice management system.

Based on the above description, a method for providing a network slice management capability service for a network slice management service user comprises: sending, by a network slice management service user, a service request message to a network slice management service provider in a network slice management system; receiving, by the network slice management service provider, a service request message, wherein the service request message comprises a service parameter and is used to request a target service from the network slice management system, and the target service in the present embodiment comprises a network slice management capability service, for example, the target service can be the network slice template service or the network slice capability service mentioned above; determining, by the network slice management service provider, whether the permission access policy corresponding to the network slice management service user has an access permission adapted to the target service; if so, indicating that the network slice management service user has an permission to acquire the target service, and therefore, the network slice management service provider provides the target service for the network slice management service user according to the service parameters in the service request message, such as the network slice template service or the network slice capability service; and returning a response message to the network slice management service user, wherein the response message carries information of whether the network management system is capable to successfully provide the target service for the network management service user.

Further, in embodiments of the present disclosure, the implementation of the permission access policy is not limited, and may be any implementation that can reflect the use permission of the network slice management service user for the network slice management capability service. In an example embodiment, the permission access policy comprises a first meta-data collection and first permission access information. As shown in Table 1 below, the first meta-data collection comprises: an identifier of the network management service provider, a type of an information object class IOC, and at least one of a type and an identifier of the network management service user. Correspondingly, the first permission access information is permission access information corresponding to the type of the IOC in the first meta-data collection, and is used to limit the access permission situation of the network slice management service user for each attribute corresponding to the type of the IOC. For example, the permission access information corresponding to the type of the IOC refers to the permission access information related to the attribute of the IOC. The permission access information may also comprise permission access information for a sub-attribute under the attribute of the IOC. Access information can have basic permission information indications such as read, write, alarm, and notification.

TABLE 1

| First meta-data collection | Network management service provider ID | Type of network management service user | Network management service user ID | Type of IOC |
|---|---|---|---|---|
| | Network slice management service provider | Internal user of operator; or, external user of the operator; Further, for external network slice management service users, the users can be | If permission access control is of a coarse-grained type, only the user type is required; if the | For example, the permission access control can be a network slice |

TABLE 1-continued

| distinguished by different levels, such as a gold level, a silver level, and a copper level | permission access control is of a fine-grained type, the user ID is required |

In the embodiment, the network slice management service user may be not only an external third-party user of the operator such as an application server of the third party, but also an internal user of the operator such as an application or device of the operator itself. The type of the network slice management service user can be used for differentiation. For example, if a value of the type field is 1, it is represented as an internal user of the operator; if the value of the type field is 0, it is represented as an external third-party user of the operator. The value of the type field here is only an example and is not limited to this. Further, for external network slice management service users, further classification can be performed, for example, these users are classified into VIP users and ordinary users, and different permission access information can be configured for the VIP users and the ordinary users; alternatively, these users can also be classified by three levels of a gold level, a silver level, and a copper level, and different permission access information can be configured for different levels of users. Further, each network slice management service user may also have its own identifier for uniquely identifying a network slice management service user, such as its IP address, name, or other types of user identities.

If the permission access control is of a coarse-grained type, the above first meta-data collection may only contain a type of the external network slice management service user (external MnS user), and the same permission access control is performed for the same type of external network management service user; if the permission access control is of a fine-grained type, the above first meta-data collection may only contain an identifier of the external network slice management service user, and may also comprise a type and an identifier of the external network slice management service user, which are used to perform permission access control for each network slice management service user from a user dimension, respectively.

Further for example, in a case where the network slice management service user is an external third-party user of an operator, the network slice management service user may access an operator network slice management system through a business support system (BSS).

In this embodiment, an implementation of the first permission access information is not limited, and a list, a bitmap, or the like may be used. In an example embodiment, the first permission access information is implemented by using a bitmap, and in order to facilitate differentiation, the bitmap corresponding to the first permission access information is referred to as a first bitmap. In the first bitmap, at least one attribute of a type of an IOC and at least one permission type corresponding to each attribute are comprised, wherein a value of a bit in the first bitmap represents whether the network slice management service user obtains an access permission under a permission type corresponding to the bit on the attribute corresponding to the bit.

According to different types of the IOC, the corresponding attributes and the permission types corresponding to the attribute will be different. Table 2 below shows the permission access information of the network slice IOC, that is, in Table 2 below, taking the type of the IOC being a network slice as an example, the corresponding attributes and the permission types thereof, and the access permissions obtained by the network slice management service user are illustrated:

TABLE 2

| | First bitmap | | | | | | | |
|---|---|---|---|---|---|---|---|---|
| Attribute | Read | All readable | Write | All Writeable | Alarm | All Alarmable | Notification | All Notifiable |
| OperationalState | 1 | 0 | 0 | N/A | 0 | N/A | 0 | N/A |
| administrativeState | 0 | N/A | 0 | N/A | 0 | N/A | 0 | N/A |
| ServiceProfileList | 1 | 0 | 1 | 0 | 1 | 0 | 1 | 0 |

In the above Table 2, the attributes of the network slice shown comprise OperationalState, AdministrativeState, and ServiceProfileList. The OperationalState represents OperationalState of a slice or a network slice subnet, which describes whether a resource is physically installed and works properly; the AdministrativeState represents AdministrativeState of a network slice or a network slice subnet, which describes a permission to allow or prohibit a use of an administrative object instance applied by an OAM service; and the ServiceProfileList represents ServiceProfileList that a network slice can support. Correspondingly, in the above Table 2, the permission types corresponding to the three attributes shown include, but are not limited to: Read, All readable, Write, All Writeable, Alarm, All Alarmable, Notification, and All Notifiable. For example, permission rules may also not comprise All Writeable, All Alarmable, and All Notifiable. Further, in Table 2, a value of a bit being 1 represents that the network slice management service user has obtained an access permission under a permission type corresponding to the bit on the attribute corresponding to the bit. For example, the network slice management service user has a read permission for the OperationalState attribute, and has Read permission, Write permission, Alarm permission, and Notification permission for the ServiceProfileList attribute.

Further, for some types of IOCs, the attributes they have may comprise a single attribute or a composite attribute. Among them, the single attribute refers to that the attribute itself is already the smallest component, and can no longer be divided into sub-attributes; relative to the single attribute, the composite attribute refers to that an attribute that can be subdivided into smaller components, i.e., sub-attributes. Taking a network slice as an example, its ServiceProfileList is a composite attribute, that is, the attribute also comprises some sub-attributes, as shown in Table 4 below. In this case, if a composite attribute is present in at least one attribute corresponding to the type of the IOC, the permission access policy in this embodiment may further comprise: a second meta-data collection and second permission access information. Among them, as shown in Table 3, the second meta-data collection comprises a type of the composite attribute, and the type field is used to uniquely identify the composite attribute. Correspondingly, the second permission access information refers to permission access information corresponding to the composite attribute, which, for example, limits an access permission situation of a network slice management service user for each sub-attribute contained in the composite attribute. For example, the permission access policy of the sub-attribute under the attribute corresponding to the type of the IOC may also not comprise the second meta-data collection.

Similarly, in this embodiment, an implementation of the second permission access information is not limited, and a list, a bitmap, or the like may be used. In an example embodiment, the second permission access information is implemented by using a bitmap, and in order to facilitate differentiation, the bitmap corresponding to the second permission access information is referred to as a second bitmap. In the second bitmap, at least one sub-attribute comprised in the composite attribute and at least one permission type corresponding to each sub-attribute are comprised. A value of a bit in the second bitmap represents whether the network slice management service user obtains an access permission under a permission type corresponding to the bit on the sub-attribute corresponding to the bit.

Among them, according to different composite attributes, sub-attributes contained in the composite attributes and the permission types corresponding to the sub-attributes will be different. In Table 4 below, taking the type of the IOC being the network slice and the composite attribute being the ServiceProfileList attribute of the network slice as an example, the sub-attributes, the permission types, and the access permissions obtained by the network slice management service user for the sub-attribute under the composite attribute are illustrated:

TABLE 3

| Second meta-data collection | Type of composite attribute of the IOC Taking the ServiceProfileList attribute of network slice as an example |
|---|---|

TABLE 4

| | Second bitmap | | | | |
|---|---|---|---|---|---|
| Attribute | Read | Write | Alarm | All Alarm service | Notification |
| ServiceProfile | 1 | 0 | 0 | 0 | 0 |
| sNSSAIList | 1 | 0 | 1 | 1 | 1 |
| KPIMonitoring | 1 | 0 | 1 | 1 | 1 |
| . | . | . | . | . | . |
| . | . | . | . | . | . |
| . | . | . | . | . | . |

In Table 4 above, the ServiceProfileList attribute shown comprises sub-attributes such as ServiceProfile, S-S-NSSAI List (sNSSAIList), and KPIMonitoring. The ServiceProfile represent an attribute of network slice-related requirements that a network slice instance in a 5G network should support; the sNSSAIList represents the single network slice selection auxiliary information S-NSSAI List that will be supported by a new network slice to be created or an existing network slice to be reused. KPIMonitoring represents a list of names of key quality indicators (KQI) and key performance indicators (KPIs) that can be used for performance monitoring. Accordingly, in the above Table 4, the permission types corresponding to these sub-attributes shown include, but are not limited to, Read, Write, Alarm, All Alarm service, and Notification. For example, the second bitmap may only comprise Read, Write, Alarm, and Notification, that is, not comprise All Alarm service. Further, in Table 3, a value of a bit being 1 represents that the network slice management service user has obtained an access permission under a permission type corresponding to the bit on the sub-attribute corresponding to the bit. For example, the network slice management service user has Read permission for the ServiceProfile sub-attribute, and Read permission, Alarm permission, All Alarm services, and Notification permission for the KPIMonitoring sub-attribute.

It should be noted that the above composite attributes may comprise one-layer composite attributes, that is, only one-layer sub-attributes, or multi-layer composite attributes, that is, multi-layer sub-attributes; for a case of multi-layer sub-attributes being comprised, each one-layer sub-attribute may also has its own corresponding permission access information downward, and the permission access information can be realized by a bitmap, and the bitmap form is similar to that shown in Table 4, the only difference being that the sub-attribute, the corresponding permission type, and the value of the bit will be different. The permission access information of the multi-layer sub-attributes can be reused in formats comprising Read, Write, Alarm, and Notification.

Further, for the last-layer sub-attributes, the sub-attributes can expose at least one network slice management capability service. Based on this, the permission access policy in the embodiments of the present disclosure also comprises: a third meta-data collection and third permission access information. As shown in Table 5, the third meta-data collection comprises an identifier of a sub-attribute, which is used to uniquely identify a sub-attribute. Accordingly, the third permission access information is permission access information of the network slice management capability service that the sub-attribute can expose, and is used to limit an access permission situation of each network slice management capability service that a network slice management service user exposes for the sub-attribute.

Similarly, in this embodiment, an implementation of the third permission access information is not limited, and a list, a bitmap, or the like may be used. In an example embodiment, the third permission access information is implemented by using a bitmap, and in order to facilitate differentiation, the bitmap corresponding to the third permission access information is referred to as a third bitmap. In the third bitmap, a sub-attribute and at least one network slice management capability service that the sub-attribute exposes are comprised, wherein a value of a bit in the third bitmap represents whether the network slice management service user obtains an access permission of the network slice management capability service corresponding to the bit on the sub-attribute.

Among them, according to the different sub-attributes, at least one network slice management capability service that the sub-attribute exposes will be different. In Table 6 below, taking a type of an IOC being a network slice and a sub-attribute KPIMonitoring under a composite attribute ServiceProfileList of the network slice as an example, at least one network slice management capability service that the sub-attribute exposes and the access permission obtained by the network slice management service user for these network slice management capability services are illustrated:

TABLE 5

| | |
|---|---|
| Second meta-data collection | Type of the sub-attribute of the composite attribute Taking the sub-attribute KPIMonitoring under the composite attribute ServiceProfileList of network slices as an example |

TABLE 6

| | Third bitmap | | | |
|---|---|---|---|---|
| Attribute | FM service1-FS Data Report for NSI | FM service2-FS Control for NSI | FM Service3-FS Data Report for NSSI | FM service4-FS Control for NSSI |
| KPIMonitoring | 1 | 1 | 0 | 0 |

In the above Table 6, the network slice management capability services that the shown KPIMonitoring sub-attribute exposes comprises: FM service1-FS Data Report for NSI, FM service2-FS Control for NSI, FM service3-FS Data Report for NSSI, and FM service4-FS Control for NSSI, wherein the Data Report for NSI is used to enable the network slice management service user to acquire NSI-related alarm data; Control for NSI is used to enable the network slice management service user to control NSI-related alarm data; Data Report for NSSI is used to enable the network slice management service user to acquire NSSI-related alarm data; and Control for NSSI is used to enable the network slice management service user to control NSSI-related alarm data. Correspondingly, in the above Table 6, a value of a bit being 1 represents that the network slice management service user has obtained an access permission of the network slice management capability service corresponding to the bit. For example, the network slice management service user obtained the FM service1-FS Data Report for NSI and the FM service1-FS Data Report for NSI.

In the above embodiment, the network slice management system can expose the network slice management capability service, so that the network slice management service user can easily and quickly acquire the network slice management capability service, such as the network slice template service or the network slice capability service; at the same time, the permission access policy for the network slice management service user is set, so that the network management service user can only use a network management capability service with an access permission, which is favorable for reasonably exposing the network management service capability, so as to safely and efficiently provide the network management capability service, and improve the utilization efficiency of the network management capability in the operator network.

Figure 5J:
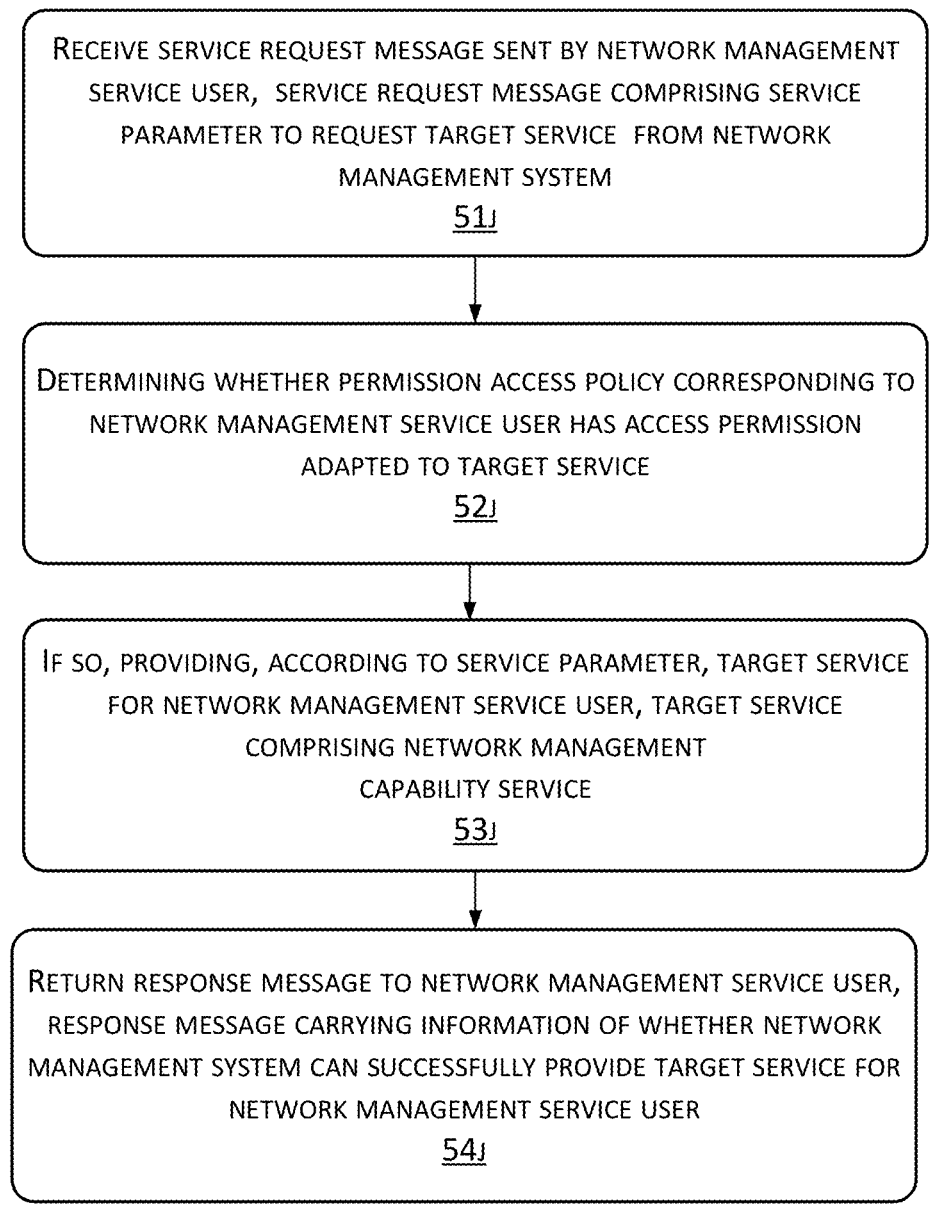
FIG. 5j shows a schematic flow diagram of a service provision method according to an embodiment of the present disclosure.

It should be noted that the operator network not only can expose the network slice management capability service, but also can expose other network management capability services, including but not limited to wireless access network management capability services and core network management capability services. For example, the network resources that the wireless access network management capability service can expose through the network management exposure capability can be a 5G base station distributed unit function (GNBDUFunction), a 5G base station centralized unit function (GNBCUFunction), etc. The network resources that the core network management capability service can expose through the network exposure capability can be a set of predefined policies and charge control rules (PredefinedPccRuleSet). It should be noted that the operator network can include a network slice management system, a wireless access network management system, and a core network management system, wherein a network slice management capability is exposed by the network slice management system, a wireless access network management capability is exposed by the wireless access network management system, and a core network management capability is exposed by the core network management system, which are not limited to these. Or, the operator network comprises a unified network management system, and the network slice management capability, the wireless access network management capability, and the core network management capability can be exposed in a unified manner by the network management system, or the network management system can also comprise different sub-management systems, and the network slice management capability, the wireless access network management capability, and the core network management capability can be exposed by the corresponding sub-management systems, respectively. In the following embodiments, a network management system is taken as an example for description, the network management system may be a unified network management system, a sub-management system in a unified network management system, or any one of the network slice management system, the wireless access network management system, and the core network management system. Based on this, the embodiments of the present disclosure also provide a service provision method, and the method is applicable to a network management service provider in the network management system in the operator network, as shown in FIG. 5j, and comprises the following steps:

51j. Receiving a service request message sent by a network management service user, the service request message comprising a service parameter to request a target service from the network management system;

52j determining whether a permission access policy corresponding to the network management service user has an access permission adapted to the target service;

53j. if so, providing, according to the service parameter, the target service for the network management service user, the target service comprising a network management capability service; and 54j. returning a response message to the network management service user, the response message carrying information of whether the network management system is capable to successfully provide the target service for the network management service user.

In this embodiment, the operator network may be a 4G network, a 5G network, etc. The operator network has some network management systems, such as a network slice management system, a wireless access network management system, and a core network management system. These network management systems have network management capabilities, and external users can obtain a network management capability service provided by the network management systems by exposing these network management systems.

In this embodiment, users who can obtain the network management capability services that the network management system exposes are referred to as network management service users, that is, users who can use the network management capability services that the network management system exposes; these users may be internal users of the operator such as applications or servers deployed by the operator itself, or external third-party users of the operator such as third-party application servers.

Among them, the network management system of this embodiment comprises an EMGF, which is responsible for providing the management capability of the network management system to external network management service users of the operator, and may also comprise various management function network elements (or referred to as network entities) that can provide network management capability services; according to different network management systems, the management function network elements in the network management system that can provide network management capability services will be different, and the management function network elements that can provide network management capability services are referred to as network management service providers. Taking the network management system being a network slice management system as an example, the network management service provider can be an EMGF, a CSMF, an NSMF, or an NSSMF.

In this embodiment, in order to expose the network management service capability to the network management service user more reasonably, the network management service provider may configure the permission access policy for the network management service user, so as to limit the permission of the network management capability service that the network management service user can use.

For example, when a network management service user signs with an operator offline, an exposure permission for the network management capability that the network slice management service user can expose is agreed through offline negotiation and written in signing information. Based on this, the network management service provider can generate a permission access policy for the network management service user based on the signing information between the network management service provider and the network management service user.

For another example, the network management service user selects the network management capability exposure permission that needs to be obtained through an exposure capability permission interface provided by the operator, for example, the permission can be selected by checking, clicking, etc.; the operator determines the network management capability exposure permission selected by the network management service user according to the selecting operation of the network management service user, generates the permission access policy corresponding to the network management service user accordingly, and configures the permission access policy to the network management service provider.

Figure 5K:
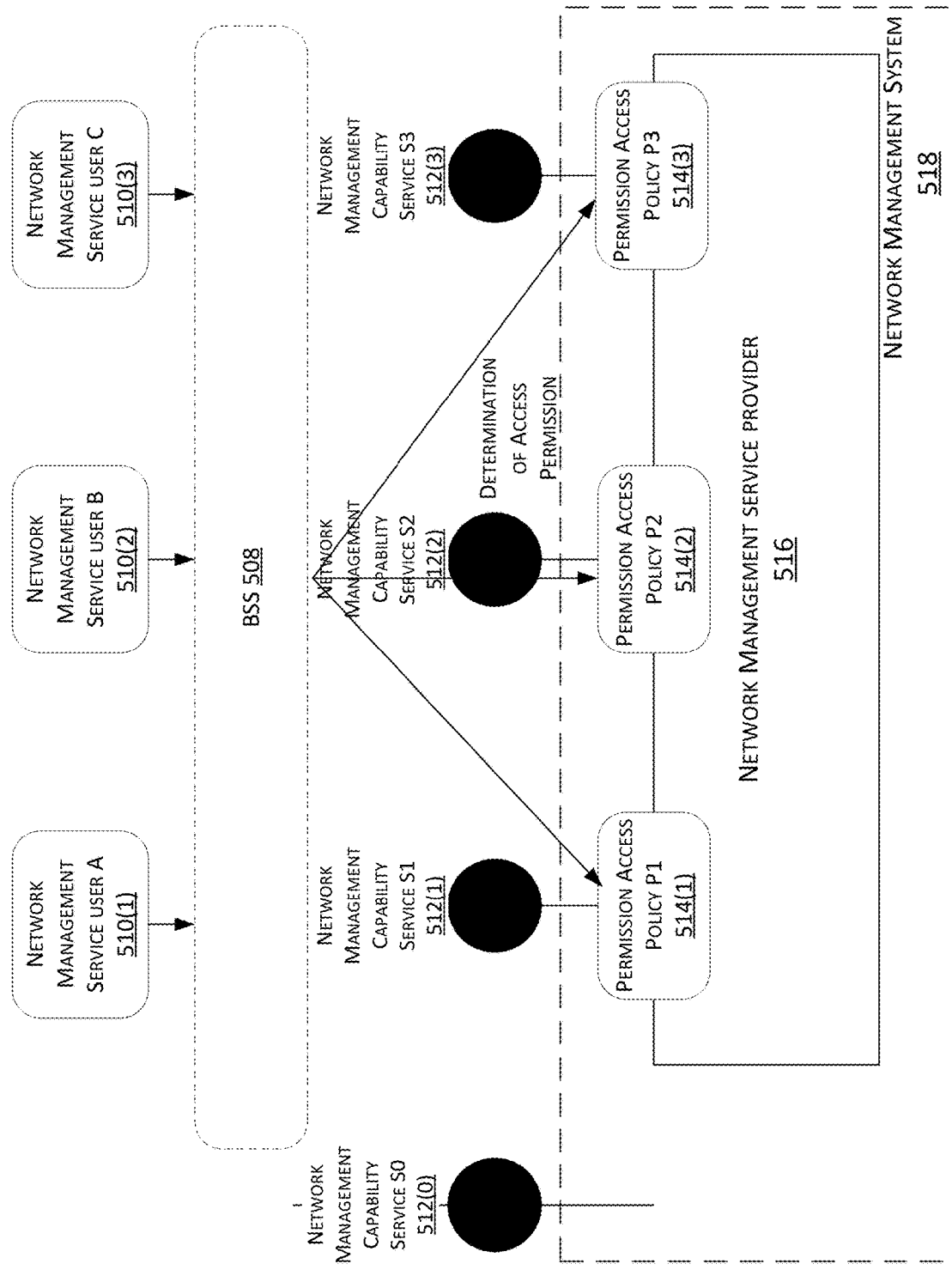
FIG. 5k shows a schematic diagram of a system framework for a network management service user requesting a network management capability service through a BSS according to an exemplary embodiment of the present disclosure.

In an example embodiment, the network management service user may be an external user of the operator network, and in this case, as shown in FIG. 5k, the network management service user may send a service request message to the network management service provider in the network management system through a BSS system 508 to request a target service.

After receiving the service request message, the network management service provider determines, according to a permission access policy corresponding to the network management service user, whether the policy has an access permission adapted to the target service; if so, provides the target service for the network management service user according to service parameters, wherein, in this embodiment, the target service comprises a network management capability service; and returns a response message to the network management service user to inform whether the network management service users can successfully provide the target services for them. According to different network management systems, different target services requested by service request messages, and different network management service providers, the process of network management service providers providing target services to network management service users according to the service parameters will be different.

Taking the target service being a network slice management capability service as an example, the foregoing embodiments can be referred to for different implementation processes of providing network slice management capability services for network management service users, which are not described herein. The above service request messages can be a request to control or modify a parameter of the network slice, or a request to acquire running KPI information related to the network slice, a subscription of fault information related to the network slice, or the like. If it is determined that the network management service user has a relevant access permission, the parameters of a relevant network slice are controlled or modified, or the running KPI information related to the network slice is acquired and fed back to the network management service user through a BSS, or the fault information related to the network slice is acquired and fed back to the network management service user through a BSS. If it is determined that the network management service user does not have a relevant access permission, an error message can be fed back to the network management service user, and an error cause in the error message can be "the user does not have a permission to perform this operation."

In addition, the above service request messages may also be a relevant parameter of a request wireless side, for example, the network management service user requests to acquire information such as the number of users accessing a base station or a wireless resource management policy ratio. According to the received service request message, the network management service provider inquires whether the network management service user has a permission to acquire the number of users accessing the base station, and if so, the network management service provider acquires the number of users accessing the base station or the wireless resource management policy ratio and returns the information to the network management service user through a BSS.

In embodiments of the present disclosure, the implementation of the permission access policy is not limited, and may be any implementation that can reflect the use permission of the network management service user for the network management capability service. In an example embodiment, the permission access policy comprises a first meta-data collection and first permission access information. Examples of the first meta-data collection are shown in Table 1, comprising an identifier of a network slice management service provider, a type of an information object class (IOC), and at least one of a type and an identifier of the network management service user. Correspondingly, the first permission access information is permission access information corresponding to the type of the IOC in the first meta-data collection, and is used to limit the access permission situation of the network slice management service user for each attribute corresponding to the type of the IOC.

In the embodiment, the network management service user may be not only an external third-party user of the operator such as an application server of the third party, but also an internal user of the operator such as an application or device of the operator itself. The type of the network management service user can be distinguished. For example, if a value of the type field is 1, it is represented as an internal user of the operator; if the value of the type field is 0, it is represented as an external third-party user of the operator. The value of the type field here is only an example and is not limited to this. Further, for external network management service users, further classification can be performed, for example, these users are classified into VIP users and ordinary users, and different permission access information can be configured for the VIP users and the ordinary users; alternatively, these users can also be classified by three levels of a gold level, a silver level, and a copper level, and different permission access information can be configured for different levels of users. Further, each network management service user may also have its own identifier for uniquely identifying a network management service user, such as its IP address, name, or other types of user identities.

If the permission access control is of a coarse-grained type, the above first meta-data collection may only contain a type of the external network management service user, and the same permission access control is performed for the same type of external network management service user; if the permission access control is of a fine-grained type, the above first meta-data collection may only contain an identifier of the external network management service user, and may also comprise a type and an identifier of the external network management service user, which are used to perform permission access control for each network management service user from a user dimension, respectively.

In this embodiment, an implementation of the first permission access information is not limited, and a list, a bitmap, or the like may be used. In an example embodiment, the first permission access information is implemented by using a bitmap, and in order to facilitate differentiation, the bitmap corresponding to the first permission access information is referred to as a first bitmap. In the first bitmap, at least one attribute of a type of an IOC and at least one permission type corresponding to each attribute are comprised. A value of a bit in the first bitmap represents whether the network management service user obtains an access permission under a permission type corresponding to the bit on the attribute corresponding to the bit. An example of the first bitmap can be shown in Table 2 above.

Further, for some types of IOCs, the attributes they have may comprise a single attribute or a composite attribute. Among them, the single attribute refers to that the attribute itself is already the smallest component, and can no longer be divided into sub-attributes; relative to the single attribute, the composite attribute refers to that an attribute that can be subdivided into smaller components, i.e., sub-attributes. Taking the network slice as an example, its ServiceProfileList is a composite attribute, that is, the attribute also comprises some sub-attributes, as shown in the above Table 4. In this case, if the composite attribute is present in at least one attribute corresponding to the type of the IOC, the permission access policy in this embodiment may further comprise: a second meta-data collection and second permission access information. Among them, as shown in the above Table 3, the second meta-data collection comprises a type of the composite attribute, and the type field is used to uniquely identify the composite attribute. Correspondingly, the second permission access information refers to permission access information corresponding to the composite attribute, which, for example, limits an access permission situation of a network management service user for each sub-attribute contained in the composite attribute. For example, the permission access policy of the sub-attribute under the attribute corresponding to the type of the IOC may also not comprise the second meta-data collection.

Similarly, in this embodiment, an implementation of the second permission access information is not limited, and a list, a bitmap, or the like may be used. In an example embodiment, the second permission access information is implemented by using a bitmap, and in order to facilitate differentiation, the bitmap corresponding to the second permission access information is referred to as a second bitmap. In the second bitmap, at least one sub-attribute comprised in the composite attribute and at least one permission type corresponding to each sub-attribute are comprised. A value of a bit in the second bitmap represents whether the network management service user obtains an access permission under a permission type corresponding to the bit on the sub-attribute corresponding to the bit. An example of the second bitmap can be shown in Table 4 above.

Further, for the last-layer sub-attributes, the sub-attributes can expose at least one network management capability service. Based on this, the permission access policy in the embodiments of the present disclosure also comprises: a third meta-data collection and third permission access information. As shown in the above Table 5, the third meta-data collection comprises an identifier of a sub-attribute, which is used to uniquely identify a sub-attribute. Accordingly, the third permission access information is permission access information of the network management capability service that the sub-attribute can expose, and is used to limit an access permission situation of each network slice management capability service that the network management service user exposes for the sub-attribute.

Similarly, in this embodiment, an implementation of the third permission access information is not limited, and a list, a bitmap, or the like may be used. In an example embodiment, the third permission access information is implemented by using a bitmap, and in order to facilitate differentiation, the bitmap corresponding to the third permission access information is referred to as a third bitmap. In the third bitmap, a sub-attribute and at least one network management capability service that the sub-attribute exposes are comprised. A value of a bit in the third bitmap represents whether the network management service user obtains an access permission of the network management capability service corresponding to the bit on the sub-attribute. In FIG. 5k, network management service users A 510 (1), B 510(2), and C 510(3) and network management capability services S0 512(0), S1 512(1), S2 512(2), and S3 (512(3)) that can be exposed are taken as examples, and permission access policies P1 514(1), P2 514(2), and P3 514(3) are taken as examples for illustration; among them, the permission access policies P1 514(1), P2 514(2), and P3 514(3) respectively comprise first, second, and third permission access information, which are not shown. The network management service provider 516 of the network management system 518 conducts the determination of access permission to the request from the network management service users 510 for corresponding network management capability services 512 based on the corresponding permission access policies 514.

In the embodiments of the present disclosure, a network management service user (such as a third-party server) can easily and quickly acquire a service related to a network management capability by performing capability exposure on a network management system in an operator network; further, in the process of exposing the network management capability, a permission access policy is added, so that the network management service user can only use a network management capability service with an access permission, which is favorable for reasonably exposing the network management service capability, so as to safely and efficiently provide the network management capability service, and improve the utilization efficiency of the network management capability in the operator network.

It should be noted that the execution body in each step of the method provided in the embodiment may be the same device, or the method may use different devices as execution bodies. For example, the execution body of step 201 to step 204 can be a device A. For another example, the execution body of step 201 can be a device A, the execution body of step 202 can be a device B, etc.

In addition, in some of the processes described in the embodiments and accompany drawings, multiple operations shown in a specific order are included. It is to be understood that these operations may be performed not in the order in which they occur herein or may be performed in parallel. Step numbers of the operations, such as 201 and 202, are merely used to distinguish different operations. The numbers themselves do not represent any execution order. In addition, these processes may include more or fewer operations, and these operations may be performed sequentially or in parallel. It should be noted that the description of "first," "second," and the like herein is configured to distinguish different messages, devices, modules, and the like, and does not represent a sequence, nor does it define that "first" and "second" are different types.

Figure 6:
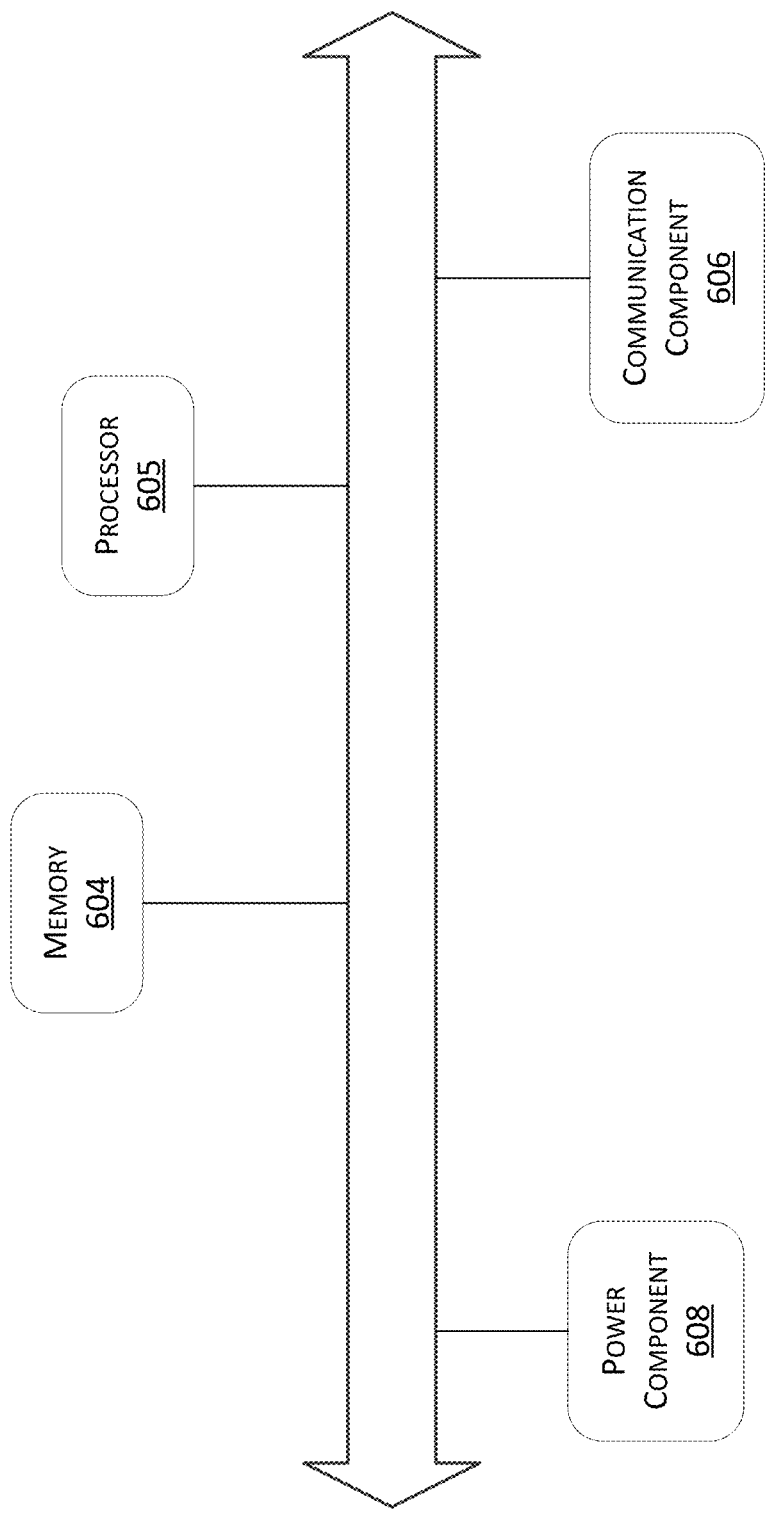
FIG. 6 shows a structural schematic diagram of an application server according to an embodiment of the present disclosure.

FIG. 6 shows a structural schematic diagram of the application server according to an embodiment of the present disclosure. As shown in FIG. 6, the application server includes: a memory 604 and a processor 605,
wherein the memory 604 is configured to store a computer program and configured to store other various data so as to support operations on the application server. Examples of these data include instructions for any applications or methods configured to operate on the application server.

The memory 604 may be implemented by any type of volatile or non-volatile memory device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The processor 605 is coupled with the memory 604 and is configured to execute the computer program in the memory 604 to: send to a network entity in a network slice management system a service request message, wherein the service request message comprises a service parameter to request the network slice management system to provide a target service therefor; the target service comprises a slice template service or a network slice capability service; and receive a response message returned by the network entity for the service request message, the response message carrying information of whether the network slice management system is capable of successfully providing the target service for the application server.

In an example embodiment, in the case that the result message is a positive result message, the processor 605 is further configured to: receive a notification message returned by the network entity indicating that the target service is completed.

In an example embodiment, when sending the service request message to the network entity in the network slice management system, the processor 605 is, for example, configured to: send to a slice management exposure function entity the service request message to enable an exposure network entity to send the service request message to the network entity in the network slice management system.

In an example embodiment, in the case that the target service is the network slice template service, the service parameter at least comprises one of a first parameter set and a template identifier to enable the network slice management system to perform a creating, modifying, or deleting operation on a slice template.

In an example embodiment, when the service request message is a slice template customization request message, then the service parameter includes the first parameter set; or when the service request message is a slice template modifying request message, then the service parameter includes the first parameter set and a template identifier; or when the service request message is a slice template deleting request message, then the service parameter includes the template identifier. The first parameter set includes: at least one of the service quality parameter, the network element configuration parameter, the application-related parameter, the geographic location of the data network DN, the deployment manner of the user plane function UPF, and the network capacity parameter.

In an example embodiment, in the case that the target service is the network slice capability service, the service parameter comprises a second parameter set to enable the network slice management system to perform a querying, subscribing, or deploying operation on network slice capability of a mobile communication network.

In an example embodiment, the service request message is a slice capability querying request message, a slice capability deploying request message, or a slice capability subscription request message. The second parameter set includes: designated area information.

Further, as shown in FIG. 6, the application server further includes: a communication component 606, a power supply component 608, and other components. Only some components are shown schematically in FIG. 6, which does not mean that the application server only includes the components shown in FIG. 6.

Correspondingly, the embodiment of the present disclosure further provides a computer-readable storage medium having a computer program stored therein. When the computer program is executed, the steps executable by the application server in the service request method embodiments may be implemented.

Correspondingly, the embodiment of the present disclosure further provides a computer program product, comprising a computer program or an instruction. When the computer program or the instruction is executed by a processor, the steps executable by the application server in the service request method embodiments may be implemented.

Figure 7:
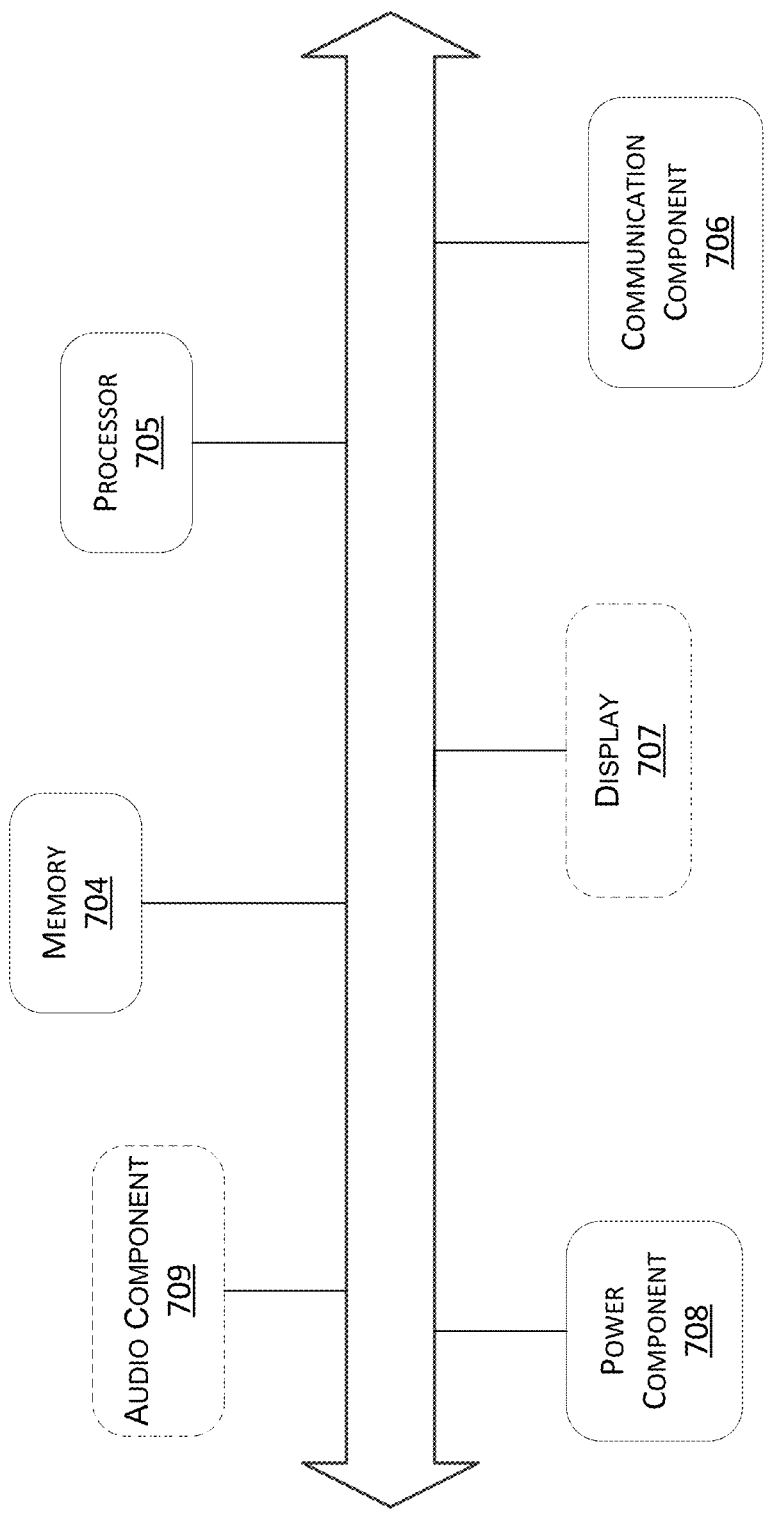
FIG. 7 shows a structural schematic diagram of a network entity according to an embodiment of the present disclosure.

FIG. 7 shows a structural schematic diagram of a network entity according to an embodiment of the present disclosure. As shown in FIG. 7, the network entity includes: a memory 704 and a processor 705, wherein the memory 704 is configured to store a computer program and configured to store other various data so as to support operations on the network entity. Examples of these data include instructions for any applications or methods configured to operate on the network entity.

The memory 704 may be implemented by any type of volatile or non-volatile memory device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The processor 705 is coupled with the memory 704 and is configured to execute the computer program in the memory 704 to: receive a service request message sent by an application server, wherein the service request message comprises a service parameter to request a target service from the network slice management system; provide the target service for the application server according to the service parameter, wherein the target service comprises a network slice template service or a network slice capability service; and return a response message to the application server, the response message carrying information of whether the network slice management system is capable of successfully providing the target service for the application server.

In an example embodiment, the processor 705 is further configured to: return to the application server the notification message indicating that the target service is completed in the case that the result message is a positive result message.

In an example embodiment, when receiving the service request message sent by the application server, the processor 705 is, for example, configured to: receive the service request message from the application server sent by the slice management exposure function entity.

In an example embodiment, in the case that the target service is the network slice template service, the service parameter includes at least one of the first parameter set and the template identifier. When providing the target service for the application server according to the service parameter, the processor 705 is, for example, configured to: perform the operation of creating, changing, or deleting the slice template according to one of the first parameter set and the template identifier at least included in the service parameter.

In an example embodiment, when the service request message is a slice template customization request message, and the service parameter includes the first parameter set, then when performing the operation of creating, modifying, or deleting the slice template according to one of the first parameter set and the template identifier at least included in the service parameter, the processor 705 is, for example, configured to: perform the operation of creating the slice template according to the first parameter set; or when the service request message is the slice template modifying request message, and the service parameter includes the first parameter set and the template identifier, then the performing the operation of creating, modifying, or deleting the slice template according to one of the first parameter set and the template identifier at least included in the service parameter, for example, comprises: performing the operation of modifying the network slice template according to the template identifier and the first parameter set; or when the service request message is the slice template deleting request message, and the service parameter includes the template identifier, then the performing the operation of creating, modifying, or deleting the slice template according to one of the first parameter set and the template identifier at least included in the service parameter, for example, comprises: performing the operation of deleting the slice template according to the template identifier. The first parameter set includes: at least one of the service quality parameter, the network element configuration parameter, the application-related parameter, the geographic location of a data network DN, the deployment manner of a user plane function UPF, and the network capacity parameter. The template identifier includes at least one of the NST identifier and the NSST identifier.

In an example embodiment, when the network entity is an SMF in the network slice management system, then when performing the operation of creating the slice template according to the first parameter set, the processor 705 is, for example, configured to: send the first parameter set to the corresponding NSMF to enable the NSMF to send to the selected NSSMF the subnet slice template parameter required for generating the NSST according to the first parameter set, and generate the NST associated with the NSST; and receive the identifier of at least one template of the NST and the NSST sent by the NSMF, wherein the identifier of the NSST is returned by the NSSMF after the NSST is generated according to the subnet slice template parameter. The response message is the slice template customization request confirmation message and is returned to the application server by the CSMF. The slice template customization request confirmation message includes an identifier of at least one template of the NST and the NSST.

In an example embodiment, when the network entity is the NSMF in the network slice management system, then when performing the operation of creating the slice template according to the first parameter set, the processor 705 is, for example, configured to: send to the selected NSSMF the subnet slice template parameter required for generating the NSST according to the first parameter set and generate the NST associated with the NSST; and receive the identifier of the NSST returned by the NSSMF after the NSST is generated according to the subnet slice template parameter, wherein the response message is the slice template customization request confirmation message and is returned to the application server by the NSMF. The slice template customization request confirmation message includes the identifier of at least one template of the NST and the NSST.

In an example embodiment, when the network entity is the NSSMF in the network slice management system, then when performing the operation of creating the slice template according to the first parameter set, the processor 705 is, for example, configured to: generate the NSST according to the first parameter set, and report the identifier of the NSST to the corresponding NSMF to enable the NSMF to generate the NST corresponding to the NSST; and receive the identifier of the NST returned by the NSMF after generating the NST, wherein the response message is the slice template customization request confirmation message and is returned to the application server by NSSMF. The slice template customization request confirmation message includes the identifier of at least one template of the NST and the NSST.

In an example embodiment, the generated NST is a customized NST, and the NSST includes at least one customized NSST. Further, an identifier of the customized NST or the customized NSST contains an identifier field of a customization manufacturer; or the identifier of the customized NST or the customized NSST is associated with an identifier of the customization manufacturer.

Further for example, the slice template customization request message comprises a customization identifier, or the application server belongs to a set of pre-maintained third-party servers having a permission to customize the slice template.

In an example embodiment, when the network entity is the CSMF in the network slice management system, then when performing the operation of modifying the slice template according to the template identifier and the first parameter set, the processor 705 is, for example, configured to: send the first parameter set and template identifier to the corresponding NSMF to enable the NSMF to modify the NST according to the first parameter set and the template identifier and/or send the subnet slice template parameter to the selected NSSMF to enable the selected NSSMF to modify the NSST accordingly; update the mapping relationship between the NST and the NSST after the NST and/or the NSST are modified; and receive the modification confirmation message returned by the NSMF, wherein the response message is the slice template modifying request confirmation message and is returned to the application server by the CSMF.

In an example embodiment, when the network entity is the NSMF in the network slice management system, then when performing the operation of modifying the slice template according to the template identifier and the first parameter set, the processor 705 is, for example, configured to: modify the NST according to the first parameter set and the template identifier and/or send the subnet slice template parameter to the selected NSSMF to enable the selected NSSMF to modify the NSST accordingly; and update the mapping relationship between the NST and the NSST after the NST and/or NSST are modified, wherein the response message is the slice template modifying request confirmation message and is returned to the application server by the NSMF.

In an example embodiment, in the case that the template identifier is the NST identifier and the network entity is embodied as the NSMF, the processor 705 is, for example, configured to: modify the NST corresponding to the NST identifier according to the first parameter set, and update the mapping relationship between the NST and the NSST after the NST is modified;

or in the case that the template identifier is the NST identifier and the network entity is embodied as the NSMF, the processor 705 is, for example, configured to: modify the NST according to the first parameter set, send to the selected NSSMF the subnet slice template parameter to enable the NSSMF to modify the NSST, and update the mapping relationship between the NST and the NSST after the NST and the NSST are modified.

In an example embodiment, in the case that the template identifier is the NSST identifier and the network entity is embodied as the NSMF, the processor 705 is, for example, configured to: send to the selected NSSMF the subnet slice template parameter and the NSST identifier to enable the NSSMF to modify the NSST, and update the mapping relationship between the NST and the NSST after the NSST is modified.

In an example embodiment, when the network entity is the NSSMF in the network slice management system, then when performing the operation of modifying the slice template according to the template identifier and the first parameter set, the processor 705 is, for example, configured to: in the case that the template identifier is the NSST identifier, modify the NSST according to the first parameter set and the template identifier, and report an identifier of the modified NSST to the corresponding NSMF for the NSMF to update the mapping relationship between the NST and the NSST, wherein the response message is the slice template modifying request confirmation message and is returned to the application server by the NSSMF.

In an example embodiment, in the case that the template identifier is the NST identifier, the processor 705 is, for example, configured to: report the first parameter set and the NST identifier to the corresponding NSMF for the NSMF to modify the NST and update the mapping relationship between the NST and the NSST;

or in the case that the template identifier is the NST identifier, the processor 705 is, for example, configured to: modify the NSST according to the first parameter set and the template identifier, and report the first parameter set and the NST identifier to the corresponding NSMF for the NSMF to| modify the NST and update the mapping relationship between the NST and the NSST.

In an example embodiment, in the case that the network entity is the CSMF, the NSMF, or the NSSMF in the network slice management system, the processor 705 is further configured to: if the template identifier identifies a customized NST and/or a customized NSST, acquire an identifier of the customization manufacturer corresponding to the customized NST according to the template identifier. If the identifier of the application server matches with the identifier of the customization manufacturer, the operation of modifying the customized NST and/or customized NSST and the mapping relationship between the NST and the NSST is performed.

Further for example, the processor 705 is further configured to: if the template identifier identifies a system defaulted NST and/or a system defaulted NSST, or the identifier of the application server and the identifier of the customization manufacturer do not match, output modification error information.

In an example embodiment, the first parameter set further includes: designated area information for the CSMF to determine the corresponding NSMF or for the NSMF to select the NSSMF.

In an example embodiment, when the network entity is the CSMF in the network slice management system, then when performing the operation of deleting the slice template according to the template identifier, the processor 705 is, for example, configured to: send the template identifier to the corresponding NSMF for the NSMF to delete the corresponding NST and/or instruct the selected NSSMF to delete the corresponding NSST accordingly, and delete the mapping relationship corresponding to the deleted NST and/or NSST in the mapping relationship between the NST and the NSST; and receive the first deletion confirmation message returned by the NSMF, wherein the response message is the slice template deletion request confirmation message and is returned to the application server by the CSMF.

In an example embodiment, when the network entity is the NSMF in the network slice management system, then when performing the operation of deleting the slice template according to the template identifier, the processor 705 is, for example, configured to: delete the NST and/or instruct the NSSMF to delete the corresponding NSST according to the template identifier; and delete the mapping relationship corresponding to the deleted NST and/or NSST in the mapping relationship between the NST and the NSST, wherein the response message is the slice template deletion request confirmation message and is returned to the application server by the NSMF.

In an example embodiment, in the case that the template identifier is the NSST identifier and the network entity is embodied as the NSMF, the processor 702 is, for example, configured to: send to the selected NSSMF the NSST identifier corresponding to the NST identifier for the NSSMF to delete the corresponding NSST; and delete the NST corresponding to the NST identifier and the mapping relationship between the NST and the NSST; or in the case that the template identifier is the NSST identifier and the network entity is embodied as the NSMF, the processor 702 is, for example, configured to: send to the selected NSSMF the NSST identifier for the NSSMF to delete the corresponding NSST, and delete the mapping relationship corresponding to the deleted NSST in the mapping relationship between the NST and the NSST corresponding to the NSST identifier.

In an example embodiment, when the network entity is the NSSMF in the network slice management system, then when performing the operation of deleting the slice template according to the template identifier, the processor 705 is, for example, configured to: delete the corresponding NSST according to the template identifier; report the template identifier to the corresponding NSMF for the NSMF to delete the mapping relationship corresponding to the deleted NSST in the mapping relationship between the NST and the NSST; and receive a third deletion confirmation message returned by the NSMF, wherein the response message is the slice template deletion request confirmation message and is returned to the application server by the NNSMF.

Further for example, before deleting the mapping relationship corresponding to the deleted NST and/or NSST, the processor 705 is further configured to: if the template identifier identifies a customized NST and/or a customized NSST, acquire an identifier of the customization manufacturer corresponding to the customized NST according to the template identifier. If the identifier of the application server matches with the identifier of the customization manufacturer, then delete the customized NST and/or customized NSST and the mapping relationship between the NST and the NSST corresponding to the deleted customized NST and/or customized NSST.

Further for example, the processor 705 is further configured to: if the template identifier identifies a system defaulted NST and/or a system defaulted NSST, or the identifier of the application server and the identifier of the customization manufacturer do not match, output deletion error information.

In an example embodiment, in the case that the target service is the network slice capability service, the service parameter includes the second parameter set. Accordingly, when providing the target service for the application server according to the service parameter, the processor 705 is, for example, configured to: perform the operation of querying, subscribing, or deploying the network slice capability of the mobile communication network according to the second parameter set.

In an example embodiment, the second parameter set includes: designated area information. When the service request message is the slice capability querying request message, then when performing the operation of querying, subscribing, or deploying the network slice capability of the mobile communication network according to the second parameter set, the processor 705 is, for example, configured to: perform the operation of querying the network slice capability of the mobile communication network according to the designated area information; or when the service request message is the slice capability deploying request message, then when performing the operation of querying, subscribing, or deploying the network slice capability of the mobile communication network according to the second parameter set, the processor 705 is, for example, configured to: perform the operation of deploying the network slice capability of the mobile communication network according to the designated area information; or when the service request message is the slice capability subscription request message, then when performing the operation of querying, subscribing, or deploying the network slice capability of the mobile communication network according to the second parameter set, the processor 705 is, for example, configured to: perform the operation of subscribing the network slice capability of the mobile communication network according to the designated area information.

In an example embodiment, when the network entity is the CSMF in the network slice management system, then when performing the operation of querying the network slice capability of the mobile communication network according to the designated area information, the processor 705 is, for example, configured to: send the designated area information to the corresponding NSMF for the NSMF to acquire the network slice capability information of the mobile communication network in the designated area locally or from the NSSMF corresponding to the designated area information, and return the network slice capability information to the CSMF; and receive the network slice capability information of the mobile communication network in the designated area returned by the NSMF, wherein the response message is the slice capability querying request confirmation message and is returned to the application server by the CSMF. The slice capability querying request confirmation message includes the network slice capability information of the mobile communication network in the designated area.

In an example embodiment, when the network entity is the NSMF in the network slice management system, then when performing the operation of querying the network slice capability of the mobile communication network according to the designated area information, the processor 705 is, for example, configured to: acquire the network slice capability information of the mobile communication network in the designated area locally or from the NSSMF corresponding to the designated area information. The response message is the slice capability querying request confirmation message and is returned to the application server by the NSMF. The slice capability querying request confirmation message includes the network slice capability information of the mobile communication network in the designated area.

In an example embodiment, when the network entity is the NSSMF in the network slice management system, then when performing the operation of querying the network slice capability of the mobile communication network according to the designated area information, the processor 705 is, for example, configured to: acquire the network slice capability information of the mobile communication network in the designated area according to the designated area information. The response message is the slice capability querying request confirmation message and is returned to the application server by the NSSMF. The slice capability querying request confirmation message includes the network slice capability information of the mobile communication network in the designated area.

In an example embodiment, when the network entity is the CSMF in the network slice management system, then when performing the operation of deploying the network slice capability of the mobile communication network according to the designated area information, the processor 705 is, for example, configured to: determine the network slice capability information to be deployed in the designated area according to the designated area information; send the network slice capability information to be deployed to the network management subsystem 502 to enable the network management subsystem 502 to deploy the network slice capability to be deployed in the designated area; and receive the deployment confirmation message returned by the network management subsystem 502. The response message is the slice capability deployment request confirmation message and is returned to the application server by the CSMF.

In an example embodiment, when the network entity is the first NSMF 504 in the network slice management system, then when performing the operation of deploying the network slice capability of the mobile communication network according to the designated area information, the processor 705 is, for example, configured to: in the case that the first NSMF 504 is an NSMF in the designated area, determine the network slice capability information to be deployed in the designated area according to the designated area information, and send the network slice capability information to the network management subsystem 502 to enable the network management subsystem 502 to deploy the network slice capability to be deployed in the designated area accordingly; and receive the deployment confirmation message returned by the network management subsystem 502; and in the case that the first NSMF 504 is not an NSMF in the designated area, forward the slice capability deploying request message to the second NSMF in the designated area to enable the second NSMF to cooperate with the corresponding network management subsystem 502 to complete the deployment of the network slice capability in the designated area; and receive the deployment confirmation message returned by the network management subsystem 502 through the second NSMF. The response message is the slice capability deployment request confirmation message and is returned to the application server by the CSMF.

In an example embodiment, when the network entity is the first NSSMF in the network slice management system, then when performing the operation of deploying the network slice capability of the mobile communication network according to the designated area information, the processor 705 is, for example, configured to: in the case that the first NSSMF is an NSSMF in the designated area, determine the network slice capability information to be deployed in the designated area according to the designated area information, and send the network slice capability information to the network management subsystem 502 to enable the network management subsystem 502 to deploy the network slice capability to be deployed in the designated area accordingly; and receive the deployment confirmation message returned by the network management subsystem 502; and in the case that the first NSSMF is not an NSSMF in the designated area, forward the slice capability deploying request message to the second NSSSMF in the designated area to enable the second NSMF to cooperate with the corresponding network management subsystem 502 to complete the deployment of the network slice capability in the designated area; and receive the deployment confirmation message returned by the network management subsystem 502 through the second NSSMF 506. The response message is the slice capability deployment request confirmation message and is returned to the application server by the CSMF.

In an example embodiment, when the network entity is the CSMF, the NSMF, or the NSSMF in the network slice management system, then when performing the operation of subscribing the network slice capability of the mobile communication network according to the designated area information, the processor 705 is, for example, configured to: perform subscription processing on the network slice capability updating notification service in the designated area for the application server according to the designated area information; and return the slice capability change notification message to the application server in the case that the subscription is successful and a change occurs in the network slice capability information of the mobile communication network in the designated area, wherein the notification message includes the slice capability updating information of the mobile communication network in the designated area.

Further, as shown in FIG. 7, the network entity further includes: other components such as a communication component 706, a display 707, a power supply component 708, and an audio component 709. Only some components are shown schematically in FIG. 7, which does not mean that the network entity only includes the components shown in FIG. 7.

Embodiments of the present disclosure further provide a network entity that can be implemented as a network management service provider in a network management system, and the network entity comprises: a memory configured to store a computer program, and a processor coupled to the memory and configured to execute the computer program to implement the steps in the method embodiment shown in FIG. 5j.

Correspondingly, the embodiment of the present disclosure further provides a computer-readable storage medium having a computer program stored therein. When the computer program is executed, the steps executable by the network entity in the network slice management system in the above service provision method embodiments may be implemented.

Correspondingly, the embodiment of the present disclosure further provides a computer program product, comprising a computer program or an instruction. When the computer program or the instruction is executed by a processor, the steps executable by the network entity in the network slice management system in the above service provision method embodiments may be implemented.

Communication components shown in FIG. 6 and FIG. 7 are configured to facilitate wired or radio communications between devices on which the communication components are arranged with other devices. The device on which the communication components are arranged may access radio networks based on communication standards, such as mobile communication networks like WiFi, 2G, 3G, 4G/LTE, and 5G, or combinations thereof. In an exemplary embodiment, the communication components receive, through a broadcast channel, broadcast signals or broadcast-related information from an external broadcast management system. In an exemplary embodiment, the communication components further comprise a near field communication (NFC) module to facilitate short range communications. For example, the NFC module can be implemented based on the radio frequency identifier (RFID) technology, the infrared data association (IrDA) technology, the ultra-wideband (UWB) technology, the Bluetooth (BT) technology, and other technologies.

The display shown in FIG. 7 includes a screen, which may include a liquid crystal display (LCD) and a touch panel (TP). If the screen includes the touch panel, the screen may be implemented as a touch screen to receive input signals from a user. The touch panel includes one or more touch sensors to sense touch, swipe, and gestures on the touch panel. The touch sensor may not only sense the boundary of a touch or swipe action, but also detect the duration and pressure related to the touch or swipe operation.

In FIG. 6 and FIG. 7, the power supply components, which are arranged on the device, provide power for various components of the device. The power supply components may include a power management system, one or more power supplies, and other components associated with generating, managing, and distributing power for the device on which the power supply components are arranged.

An audio component shown in FIG. 7 may be configured to output and/or input audio signals. For example, the audio component includes a microphone (MIC) configured to receive an external audio signal when the device on which the audio component is arranged is in an operating mode, for example, in a call mode, a recording mode, and a voice recognition mode. The received audio signal may be further stored in a memory or sent through a communication component. In some embodiments, the audio component further includes a speaker for outputting an audio signal.

Those skilled in the art should understand that the embodiments of the present disclosure may be provided as a method, a system, or a computer program product. Therefore, the present disclosure may take a form of an entirely hardware embodiment, an entirely software embodiment, or an embodiment combining software and hardware elements. Furthermore, the present disclosure may take the form of a computer program product which is embodied on one or more computer-usable storage media (including, but not limited to, disk storage, CD-ROM, optical storage, and so forth) having computer-usable program code included therein.

The present disclosure is described with reference to flow charts and/or block diagrams of methods, devices (systems) and computer program products according to embodiments of the present disclosure. It should be understood that computer program instructions may be used to implement each process and/or each block in the flow charts and/or the block diagrams and a combination of a process and/or a block in the flow charts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or another programmable device to generate computer-implemented processing. Therefore, the instructions executed on the computer or another programmable device are used to provide steps for implementing a specific function in one or more processes in the flowcharts and/or in one or more blocks in the block diagrams.

In a typical configuration, a computing device includes one or more processors (CPU), an input/output interface, a network interface, and a memory. The memory may include a volatile memory on a computer-readable medium, a random-access memory (RAM) and/or a non-volatile memory, and the like, such as a read-only memory (ROM) or a flash random access memory (flash RAM). The memory is an example of the computer-readable media. Computer-readable media further include nonvolatile and volatile, removable and non-removable media employing any method or technique to achieve information storage. The information may be computer readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices or any other non-transmission medium, which may be used to store information that can be accessed by a computing device. As defined herein, the computer-readable media do not include transitory media, such as modulated data signals and carriers The above are only embodiments of the present disclosure and are not intended to limit the present disclosure. For those skilled in the art, there may be various modifications and changes to the present disclosure. Any modification, equivalent substitution, improvement, etc. made within the spirit and principle of the application shall be included in the scope of the claims of the present disclosure.

The present disclosure may further be understood with clauses as follows:

Clause 1. A service provision method, applicable to a network management service provider in a network management system, comprising the following steps:
  receiving a service request message sent by a network management service user, the service request message comprising a service parameter to request a target service from the network management system;
  determining whether a permission access policy corresponding to the network management service user has an access permission adapted to the target service;
  if so, providing, according to the service parameter, the target service for the network management service user, the target service comprising a network management capability service; and
  returning a response message to the network management service user, the response message carrying information of whether the network management system is capable to successfully provide the target service for the network management service user.

Clause 2. The method according to clause 1, wherein the permission access policy comprises a first meta-data collection and first permission access information;
wherein the first meta-data collection comprises an identifier of the network management service provider, a type of an information object class IOC, and at least one of a type and an identifier of the network management service user; and the first permission access information is permission access information corresponding to the type of the IOC.

Clause 3. The method according to clause 2, wherein the first permission access information is a first bitmap; the first bitmap comprises at least one attribute of the type of the IOC and at least one permission type corresponding to each attribute;
wherein a value of a bit in the first bitmap represents whether the network management service user obtains an access permission under a permission type corresponding to the bit on the attribute corresponding to the bit.

Clause 4. The method according to clause 3, wherein, in a case where a composite attribute is present in the at least one attribute, the permission access policy further comprises: a second meta-data collection and second permission access information;
wherein the second meta-data collection comprises a type of the composite attribute, and the second permission access information is permission access information corresponding to the composite attribute.

Clause 5. The method according to clause 4, wherein the second permission access information is a second bitmap; the second bitmap comprises at least one sub-attribute contained in the composite attribute and at least one permission type corresponding to each sub-attribute;
wherein a value of a bit in the second bitmap represents whether the network management service user obtains an access permission under a permission type corresponding to the bit on the sub-attribute corresponding to the bit.

Clause 6. The method according to clause 5, wherein the permission access policy further comprises: a third meta-data collection and third permission access information; and
the third meta-data collection comprises an identifier of a sub-attribute, and the third permission access information is permission access information of a network management capability service that the sub-attribute can expose.

Clause 7. The method according to clause 6, wherein the third permission access information is a third bitmap; the third bitmap comprises the sub-attribute and at least one network management capability service that the sub-attribute can expose;
wherein a value of a bit in the third bitmap represents whether the network management service user obtains an access permission of the network management capability service corresponding to the bit on the sub-attribute.

Clause 8. The method according to any one of clauses 1-7, wherein the method further comprises:
configuring, according to signing information between the network management service user and the network management service provider, the permission access policy corresponding to the network management service user.

Clause 9. The method according to any one of clauses 1-7, wherein the network management capability service comprises: a network slice management capability service, a wireless access network management capability service, or a core network management capability service, wherein the network slice management capability service at least comprises a network slice template service and/or a network slice capability service.

Clause 10. The method according to any one of clauses 1-7, wherein the type of the IOC is a network slice capability, the network management system is a network slice management system, and the network management service provider is a communication service management function CSMF, a network slice management function NSMF, or a network slice subnet management function NSSMF in the network slice management system.

Clause 11. A network entity, implemented as a network management service provider in a network management system, comprising: a memory and a processor, wherein the memory is configured to store a computer program; and the processor is coupled to the memory and configured to execute the computer program to implement the steps in the method according to any one of clauses 1-10.

Clause 12. A computer-readable storage medium storing therein a computer program, wherein when the computer program is executed by a processor, the processor is enabled to implement steps of the methods in any one of clauses 1-10.

What is claimed is:

1. A method comprising:
receiving a service request message sent by a network management service user, the service request message comprising a service parameter to request a target service from a network management system, the service parameter including at least one of a network KPI parameter and a deployment mode of a User Plane Function (UPF);
determining that a permission access policy corresponding to the network management service user has an access permission adapted to the target service;
providing, according to the service parameter, the target service to the network management service user, the target service comprising a network management capability service, the network management capability service including network slice management capability service, the network slice management capability service including a network slice template service based on a default slice template provided by an operator and a customized slice template triggered and generated by a third-party server;
establishing an association relationship among an identifier of the customized slice template, an identifier of the third-party server, and an identifier of a customization manufacturer that requests the customized slice template and maintaining the association relationship; and
maintaining a default template library that stores the default slice template and a customized template library that stores the customized slice template.

2. The method according to claim 1, further comprising:
returning a response message to the network management service user.

3. The method according to claim 2, wherein the response message comprises information of whether the network management system is capable to successfully provide the target service for the network management service user.

4. The method according to claim 1, wherein the permission access policy comprises a first meta-data collection and first permission access information.

5. The method according to claim 4, wherein the first meta-data collection comprises an identifier of a network management service provider, a type of an information object class (IOC), and at least one of a type and an identifier of the network management service user.

6. The method according to claim 5, wherein the first permission access information is permission access information corresponding to the type of the IOC.

7. The method according to claim 5, wherein:
the type of the IOC is a network slice capability;
the network management system is a network slice management system; and
the network management service provider provides a communication service management function (CSMF), a network slice management function (NSMF), or a network slice subnet management function (NSSMF) in the network slice management system.

8. The method according to claim 5, wherein:
the first permission access information is a first bitmap; and
the first bitmap comprises at least one attribute of the type of the IOC and at least one permission type corresponding to each attribute.

9. The method according to claim 8, wherein a value of a bit in the first bitmap represents whether the network management service user obtains an access permission under a permission type corresponding to the bit on an attribute corresponding to the bit.

10. The method according to claim 9, wherein:
a composite attribute is present in the at least one attribute; and
the permission access policy further comprises a second meta-data collection and second permission access information;
wherein the second meta-data collection comprises a type of the composite attribute, and the second permission access information is permission access information corresponding to the composite attribute.

11. The method according to claim 10, wherein:
the second permission access information is a second bitmap; and
the second bitmap comprises at least one sub-attribute contained in the composite attribute and at least one permission type corresponding to each sub-attribute.

12. The method according to claim 11, wherein a value of a bit in the second bitmap represents whether the network management service user obtains an access permission under a permission type corresponding to the bit on a sub-attribute corresponding to the bit.

13. The method according to claim 12, wherein:
the permission access policy further comprises a third meta-data collection and third permission access information; and
the third meta-data collection comprises an identifier of the sub-attribute, and the third permission access information is permission access information of a network management capability service that the sub-attribute can expose.

14. The method according to claim 13, wherein:
the third permission access information includes a third bitmap; and
the third bitmap comprises the sub-attribute and at least one network management capability service that the sub-attribute can expose.

15. The method according to claim 14, wherein a value of a bit in the third bitmap represents whether the network management service user obtains an access permission of the network management capability service corresponding to the bit on the sub-attribute.

16. The method according to claim 1, further comprising configuring, according to signing information between the network management service user and a network management service provider, the permission access policy corresponding to the network management service user.

17. The method according to claim 1, wherein the network management capability service further comprises:
a wireless access network management capability service; or
a core network management capability service.

18. The method according to claim 1, wherein the network slice management capability service further comprises a network slice capability service.

19. A system comprising: one or more processors; and one or more memories storing thereon computer-readable instructions that, when executed by the one or more processors, cause the one or more processors to perform acts comprising:
receiving a service request message sent by a network management service user, the service request message comprising a service parameter to request a target service from a network management system, the service parameter including at least one of a network KPI parameter and a deployment mode of a User Plane Function (UPF);
determining that a permission access policy corresponding to the network management service user has an access permission adapted to the target service; and
providing, according to the service parameter, the target service to the network management service user, the target service comprising a network management capability service, the network management capability service including network slice management capability service, the network slice management capability service including a network slice template service based on a default slice template provided by an operator and a customized slice template triggered and generated by a third-party server from a customization manufacturer that requests the customized slice template, an identifier of the customized slice template including an identification field of the customization manufacturer, the identification field of the customization manufacturer including an identifier of the third-party server.

20. One or more memories storing thereon computer-readable instructions that, when executed by one or more processors, cause the one or more processors to perform acts comprising:
receiving a service request message sent by a network management service user, the service request message comprising a service parameter to request a target service from a network management system, the service parameter including at least one of a network KPI parameter and a deployment mode of a User Plane Function (UPF);
determining that a permission access policy corresponding to the network management service user has an access permission adapted to the target service; and
providing, according to the service parameter, the target service to the network management service user, the target service comprising a network management capability service, the network management capability service including network slice management capability service, the network slice management capability service including a network slice template service based on a default slice template provided by an operator and a customized slice template triggered and generated by a third-party server, an identifier of the customized slice template carrying an identifier of the third-party server.

\* \* \* \* \*